(12) United States Patent
Holles

(10) Patent No.: US 7,371,362 B2
(45) Date of Patent: May 13, 2008

(54) CATALYTIC WET OXIDATION OF LACTOSE

(75) Inventor: Joseph Holles, Houghton, MI (US)

(73) Assignee: Michigan Technological University, Houghton, MI (US)

(*) Notice: Subject to any disclaimer, the term of this patent is extended or adjusted under 35 U.S.C. 154(b) by 0 days.

(21) Appl. No.: 11/677,436

(22) Filed: Feb. 21, 2007

(65) Prior Publication Data

US 2007/0197825 A1 Aug. 23, 2007

Related U.S. Application Data

(60) Provisional application No. 60/775,089, filed on Feb. 21, 2006.

(51) Int. Cl.
  *C01B 31/20* (2006.01)
  *C07C 55/00* (2006.01)
(52) U.S. Cl. .................................. 423/437.1; 562/590
(58) Field of Classification Search ...................... None
  See application file for complete search history.

(56) References Cited

U.S. PATENT DOCUMENTS 3,279,950 A * 10/1966 Kordesch et al. ............. 429/17
4,845,208 A   7/1989 Fuertes et al.
4,985,553 A   1/1991 Fuertes et al.

OTHER PUBLICATIONS

Palit et al, Journal of Physical Chemistry, Catalytic and Induced Oxidation of Some Carbohydrates, Uric Acid, and Inorganic Substances, 1926, 30, pp. 939-953.*
Besson, M., Lahmer, F., Gallezot, P., Fuertes, P. and Fleche, G., "Catalytic Oxidation of Glucose on Bismuth-Promoted Palladium Catalysts," Journal of Catalysis 1995, 152, p. 116-121.
Brons, C. and Olieman, C., "Study of the High-Performance Liquid Chromatographic Separation of Reducing Sugars, Applied to the Determination of Lactose in Milk," Journal of Chromatography 1983, 259, p. 79-86.
Bulusu, S., Mills, G.A. and Walker, V., "Analysis of Organic Acids in Physiological Fluids by High Performance Liquid Chromatography," J. Liq. Chromatogr. 1991, 14(9), p. 1757-1777.
Copa, W.M. and Momont, J.A., Wet Oxidation In Standard Handbook of Hazardous Waste Treatment and Disposal, Freemean, H.M., Ed.; McGraw-Hill, New York, 1989, Section 8.6.
Cunha, S.C., Fernandes, J.O., Faria, M.A., Ferreira, I.M.P.L.V.O. and Ferreira, M.A., "Quantification of Organic Acids in Grape Musts and Port Wines," Cienc. Tecnol. Aliment 2002, 3(4), p. 212-216.
Dirkx, J.M.H. and van der Baan, H.S., "The Oxidation of Glucose with Platinum on Carbon as Catalyst," Journal of Catalysis 1981, 67, p. 1-13.
Doner, L.W. and Hicks, K.B., "High-Performance Liquid Chromatographic Separation of Ascorbic Acid, Erythorbic Acid, Dehydroascorbic Acid, Dehydroerythorbic Acid, Diketogulonic Acid, and Diketogluconic Acid," Analytical Biochemistry 1981, 115(1), p. 225-230.

Fortuny, A., Ferrer, C., Bengoa, C. Font, J. and Fabregat, A., "Catalytic Removal of Phenol from Aqueous Phase Using Oxygen or Air as Oxidant," Catal. Today 1995, 24, p. 79-83.
Fortuny, A., Miro, C., Font, J. and Fabregat, A., "Three-Phase Reactors for Environmental Remediation: Catalytic Wet Oxidation of Phenol Using Active Carbon," Catal. Today 1999, 48, p. 323-328.
Fortuny, A., Font, J. and Fabregat, A., "Wet Air Oxidation of Phenol Using Active Carbon as Catalyst," Appl. Catal. B: Environmental 1998, 19, p. 165-173.
Fortuny, A., Bengoa, C., Font, J. and Fabregat, A., "Bimetallic Catalysts for Continuous Catalytic Wet Air Oxidation of Phenol," J. Hazard Mater. 1999, 64(2), p. 181-93.
Gallezot, P., Laurain N. and Isnard, P., "Catalytic Wet-Air Oxidation of Carboxylic Acids on Carbon-Supported Platinum Catalysts," Appl. Catal. B: Environmental 1996, 9, L11-17.
Gallezot, P., "Selective Oxidation with Air on Metal Catalysts," Catal. Today 1997, 37, p. 405-418.
Green, J.W., in W. Pigman and D. Horton (Eds), The Carbohydrates, Chemistry and Biochemistry 1980, vol. 1B, Academic Press, Chapter 24.
Hamoudi, S., Belkacemi, K. and Larachi, F., "Catalytic Oxidation of Aqueous Phenolic Solutions Catalyst Deactivation and Kinetics," Chemical Engineering Science 1999, 54, p. 3569-3576.
Hendriks, H. E. J., Kuster, B. F. M. and Martin, G. B., "The Effect of Bismuth on the Selective Oxidation of Lactose on Supported Palladium Catalysts," Carbohydr. Res. 1990, 204, p. 121-129.
Hendriks, H. E. J., Ph. D. Thesis, Selective Catalytic Oxidations of Lactose and Related Carbohydrates, Eindhoven University of Technology, 1991.
Heyns, K. and Paulsen, H., "Selective Catalytic Oxidation of Carbohydrates, Employing Platinum Catalysts," Adv. Carbohydr. Chem. 1962, 17, p. 169-211.
Hicks, K.B., Sondey, S.M. and Doner, L.W., "Preparative Liquid Chromatography of Carbohydrates: Mono- and Di-Saccharides, Uronic Acids, and Related Derivatives," Carbohydr. Res. 1987, 168, p. 33-45.
Hicks, K.B., Symanski, E.V. and Pfeffer, P.E., "Synthesis and High-Performance Liquid Chromatography of Maltulose and Cellobiulose," Carbohyr. Res. 1983, 112, p. 37-50.

(Continued)

*Primary Examiner*—Paul A. Zucker
(74) *Attorney, Agent, or Firm*—Michael Best & Friedrich LLP

(57) ABSTRACT

A process for converting lactose into carbon dioxide and/or carbon monoxide using catalytic wet oxidation. Oxygen gas and an aqueous solution of lactose are fed to a reactor comprising a $Pt/Al_2O_3$ catalyst, a Mn/Ce catalyst or a Pt/Mn—Ce catalyst, and the lactose is oxidized in the reactor at elevated temperature and pressure to produce at least one of small organic acids, carbon dioxide, carbon monoxide, water and combinations thereof. The small organic acids may be further degraded by feeding the small organic acids and oxygen gas into a reactor containing a Mn/Ce catalyst and oxidizing the small organic acids to water and at least one of carbon dioxide, carbon monoxide and combinations thereof.

20 Claims, 29 Drawing Sheets

OTHER PUBLICATIONS

Hotchkiss, Jr, A.T. and Hicks, K.B., "Analysis of Oligogalacturonic Acids with 50 or Fewer Residues by High-Performance Anion-Exchange Chromatography and Pulsed Amperometric Detection," Anal. Biochem. 1990, 184, p. 200-206.

Hotchkiss, Jr, A.T. and Hicks, K.B., "Analysis of Pectate Lyase-Generated Oligogalacturonic Acids by High-Performance Anion-Exchange Chromatography with Pulsed Amperometric Detection," Carbohydr. Res. 1993, 247, p. 1-7.

Hotchkiss, Jr, A.T., Hicks, K.B., Doner, L.W. and Irwin, P.L., "Isolation of Oligogalacturonic Acids in Gram Quantities by Preparative H.P.L.C.," Carbohydr. Res. 1991, 215, p. 81-90.

Imamura, S., Nakamura, M., Kawabata, N., Yoshida, J. and Ishida, S., "Wet Oxidation of Poly(ethylene glycol) Catalyzed by Manganese-Cerium Composite Oxide," Industrial & Engineering Chemistry Product Research and Development 1986, 25, p. 34-37.

Imamura, S., "Catalytic and Noncatalytic Wet Oxidation," Ind. Eng. Chem. Res. 1999, 38, p. 1743-1753.

Imamura, S., Fukuda, I. and Ishida S., "Wet Oxidation Catalyzed by Ruthenium Supported on Cerium (IV) Oxides," Industrial & Engineering Chemistry Research 1988, 27, p. 718-721.

Ioffe, I.I. and Rubinskaya, E.V., "Reaction of Catalytic Oxidation by Liquid Water and Its Application to Waste Water Purification," Ind. Eng. Chem. Res. 1997, 36, p. 2483-2486.

Klinghoffer, A.A., Cerro, R.L. and Abraham, M.A.., "Catalytic Wet Oxidation of Acetic Acid Using Platinum on Alumina Monolith Catalyst," Catalysis Today 1998, 40, p. 59-71.

Koops, J. and Olieman, C., "Routine Testing of Farm Tank Milk with the Milko-Scan 203, 3. Comparative Evaluation of Polarimetry, HPLC, Enzymatic Assay and Reductometry for the Determination of Lactose. Calibration for Infra-Red Analysis of Lactose. Calculation of Total Solids from Infra-Red Measurements," Neth. Milk Dairy J. 1985, 39, p. 89-106.

Pintar, A. and Levec, J., "Catalytic Liquid-Phase Oxidation of Refractory Organics in Waste Water," Chem. Eng. Sci. 1992, 47, No. 9-11, p. 2395-2400.

Linko, P., (G.G. Birch & K. J. Parker, Eds), "Lactose and Lactitol," Appl. Sic. Publ. Ltd. 1982, London and New Jersey, Chapter 6.

McGinnis, G.D., Prince, S. and Lowrimore, J., "The Use of Reverse-Phase Columns for Separation of Unsubstituted Carbohydrates," J. Carbohydr. Chem. 1986, 5(1), p. 83-97.

Mishra, V. S., Mahajani, V. V. and Joshi, J. B., "Wet Air Oxidation," Ind. Eng. Chem. Res. 1995, 34, p. 2-48.

Nozal, M.J., Bernal, J.L., Diego, J.C., Gomex, L.A. and Higes, M., "HPLC Determination of Low Molecular Weight Organic Acids in Honey with Series-Coupled Ion-Exclusion Columns," Journal of Liquid Chromatography & Related Technologies 2003, 26(8), p. 1231-1253.

Palmer, J.K. and List, D.M., "Determination of Organic Acids in Foods by Liquid Chromatography," J. Agr. Food Chem. 1973, 21(5), p. 903-906.

Patrick, T.A. and Abraham, M.A., "Evaluation of a Monolith-Supported $Pt/Al_2O_3$ Catalyst for Wet Oxidation of Carbohydrate-Containing Waste Streams," Environment Science & Technology 2000, 34, p. 3480-3488.

Prabhu, S.V. and Baldwin, R.P., "High-pH Ion Exchange Separation and Electrochemical Detection of Alditols, Carbohydrates and Acidic Sugars," J. Chromatogr. 1990, 503, p. 227-235.

Pritzwald-Stegmann, B.F., "Lactose and Some of Its Derivatives," J. Soc. Dairy Technol. 1986, 39(3), p. 91-97.

Quigley, J., Primer No. 102- Structure and Function of Carbohydrates, CalfNotes.com, 2001, www.calfnotes.com/pdffiles/CN102.pdf, four pages.

Roelfsema, W.A. and Kuster, B.F.M., "Prospects in the Chemical Derivatisation of Lactose," Neth. Milk Dairy J. 1988, 42, p. 469-483.

Roelfsema, W.A., Kuster, B.F.M., Pluim, H. and Verhage, M., Lactose and Derivatives, Ullmann's Encyclopedia of Industrial Chemistry, Wiley-VCH, Weinheim, 1990, vol. A15, p. 107-114.

Rojas-Escudero, E., Alarcon-Jimenez, A. L., Elizalde-Galvan, P. and Rojo-Callejas, F., "Optimization of Carbohydrate Silylation for Gas Chromatography," Journal of Chromatography A 2004, 1027, p. 117-120.

Jianbo, S., Fusuo, Z. and Daru, M., "Determination of Organic Acids in Root Exudates by High Performance Liquid Chromatography: II. Influence of Several Testing Conditions," Pedosphere 1999, 9(1), p. 45-52.

Jianbo, S., Fusuo, Z., Qin, H. and Daru, M., "Determination of Organic Acids in Root Exudates by High Performance Liquid Chromatography: I. Development and Assessment of Chromatographic Conditions," Pedosphere 1998, 8(2), p. 97-104.

Short, J.L., "Prospects for the Utilization of Deproteinated Whey in New Zealand—A Review," N. Z. J. Dairy Sci. Technol. 1978, 13, p. 181-194.

Simms, P.J., Hicks, K.B., Haines, R.M., Hotchkiss, Jr., A.T. and Osman, S.F., "Separation of Lactose, Lactobionic Acid and Lactobionolactone by High-Performance Liquid Chromatography," Journal of Chromatography A 1994, 667, p. 67-73.

Thelwall, L.A.W, Development in Dairy Chemistry 3, Chapter 2, P.F. Fox (Ed), Elsevier Applied Science Publishers, London, New York, 1985.

Tsao, C.S. and Young, M., "Analysis of Ascorbic Acid Derivatives by High-Performance Liquid Chromatography with Electrochemical Detection," J. Chromatogr. 1985, 330, p. 408-411.

Turkelson, V.T. and Richards, M., "Separation of the Citric Acid Cycle Acids by Liquid Chromatography," Anal. Chem. 1978, 50(11), p. 1420-1423.

Van Bekkum, H., Carbohydrates as Organic Raw Materials, (F.W. Lichtenthaler, Ed.), Chapter 14, p. 289 VCH Verlag, Weinheim, 1991.

Verhaar, L.A.Th., Hendriks, H.E.J., Groenland, W.P.Th. and Kuster, B.F.M., "High-Performance Liquid Chromatography of Reaction Mixtures from the Oxidation and Degradation of Lactose," J. Chromatogr. 1991, 549, p. 113-125.

Vinke, P., de Wit, D., de Goede, A.T.J.W. and van Bekkum, H., New Developments in Selective Oxidation by Heterogeneous Catalysis (P. Ruiz and B. Delmon, Eds.), Studies in Surface Science and Catalysis, vol. 72, p. 1-20, Elsevier Science Publishers B.V., Amsterdam, 1992.

Voragen, A.G.J., Schols, H.A., DeVries, J.A. and Pilnik, W., "High-Performance Liquid Chromatographic Analysis of Uronic Acids and Oligogalacturonic Acids," Journal of Chromatography 1982, 244, p. 327-336.

Wei, Y. and Fang, J., "Studies of the Chromatographic Behavior of Some Uronic Acids and Neutral Sugars on an Amino-Bonded Phase Column," Journal of Chromatograhpy 1990, 513, p. 227-235.

Whittier, E.O., "Lactose and Its Utilization: A Review," J. Dairy Sci. 1944, 27(7), p. 505-537.

de Wit, G., de Vlieger, J.J., Kock-Van Dalen, A.C., Heus, R., Laroy, R., van Hengstrum, A.J., Kieboom, A.P.G. and van Bekkum, H., "Catalytic Dehydrogenation of Reducing Sugars in Alkaline Solution," Carbohydr. Res. 1981, 91, p. 125-138.

Zadow, J.G., "Lactose: Properties and Uses," J. Dairy Sci. 1984, 67, p. 2654-2679.

\* cited by examiner

CATALYTIC WET OXIDATION OF LACTOSE

CROSS-REFERENCE TO RELATED APPLICATIONS

This application claims priority under 35 U.S.C. §119(e) to U.S. Provisional Patent Application No. 60/775,089 filed Feb. 21, 2006, the entire content of which is hereby incorporated by reference.

BACKGROUND

The present invention relates to a process for converting lactose to small molecules and/or value added lactose derivatives. Lactose or milk sugar, a disaccharide carbohydrate, is the ingredient of whey, the main by-product of cheese production in the dairy industry. Several million pounds of lactose are available annually as a by-product of cheese production; however, the numbers of subsequent uses are limited. Most of the lactose is disposed of in wastewater which leads to additional environmental problems. Therefore, it is desirable to minimize some of those wastes, either by converting lactose to smaller molecules more appropriate for disposal, or preferably, to a value added lactose derivatives.

SUMMARY

The first objective is the application of CWO to degrade lactose to $CO_2$ and water. The ability of $Pt/Al_2O_3$ catalyst to decompose lactose to smaller carbon acids was examined. Literature results suggest that a Mn/Ce composite oxide catalyst would be capable of further degrading these carbon acids to $CO_2$ and $H_2O$. Thus, the ability of Mn/Ce catalyst to degrade lactose was investigated. However, a one step or one catalyst route to complete degradation is preferable. Therefore, a bifunctional $Pt/Ce/Mn/Al_2O_3$ catalyst was synthesized and investigated for converting lactose to $CO_2$ and water. These studies investigated design parameters such as reaction rates, flow, and temperature effects. The $Pt/Al_2O_3$ catalyst was capable of degrading lactose to smaller acids. The $Pt/Ce/Mn/Al_2O_3$ catalyst was also able to directly convert lactose to $CO_2$ and $H_2O$. Surprisingly the Mn/Ce catalyst was also capable of converting lactose to $CO_2$ and $H_2O$ and showed activity very similar to the $Pt/Ce/Mn/Al_2O_3$ catalyst.

The second objective is to convert lactose to a value added product—lactobionic acid. A Pd—Bi/C catalyst was synthesized and investigated for production of lactobionic acid. The effects of temperature, flow rate, and oxygen flow on reactivity were also determined. The Pd—Bi/C catalyst successfully converted lactose to lactobionic acid.

In one embodiment, the invention provides a process for degrading lactose by catalytic wet oxidation, the process comprising feeding oxygen gas and an aqueous solution of lactose to a reactor comprising a $Pt/Al_2O_3$ catalyst, and oxidizing the lactose in the reactor at elevated temperature and pressure to produce at least one of small organic acids, carbon dioxide, carbon monoxide, water and combinations thereof.

In another embodiment, the invention provides a process for degrading lactose by catalytic wet oxidation, the process comprising feeding oxygen gas and an aqueous solution of lactose to a reactor comprising a Mn/Ce catalyst, and oxidizing the lactose in the reactor at elevated temperature and pressure to produce water and at least one of carbon dioxide, carbon monoxide and combinations thereof.

In a further embodiment, the invention provides a process for degrading lactose by catalytic wet oxidation, the process comprising feeding oxygen gas and an aqueous solution of lactose to a reactor comprising a Pt/Mn—Ce catalyst, and oxidizing the lactose in the reactor at elevated temperature and pressure to produce water and at least one of carbon dioxide, carbon monoxide and combinations thereof.

Other aspects of the invention will become apparent by consideration of the detailed description and accompanying drawings.

DETAILED DESCRIPTION

Figure 1:
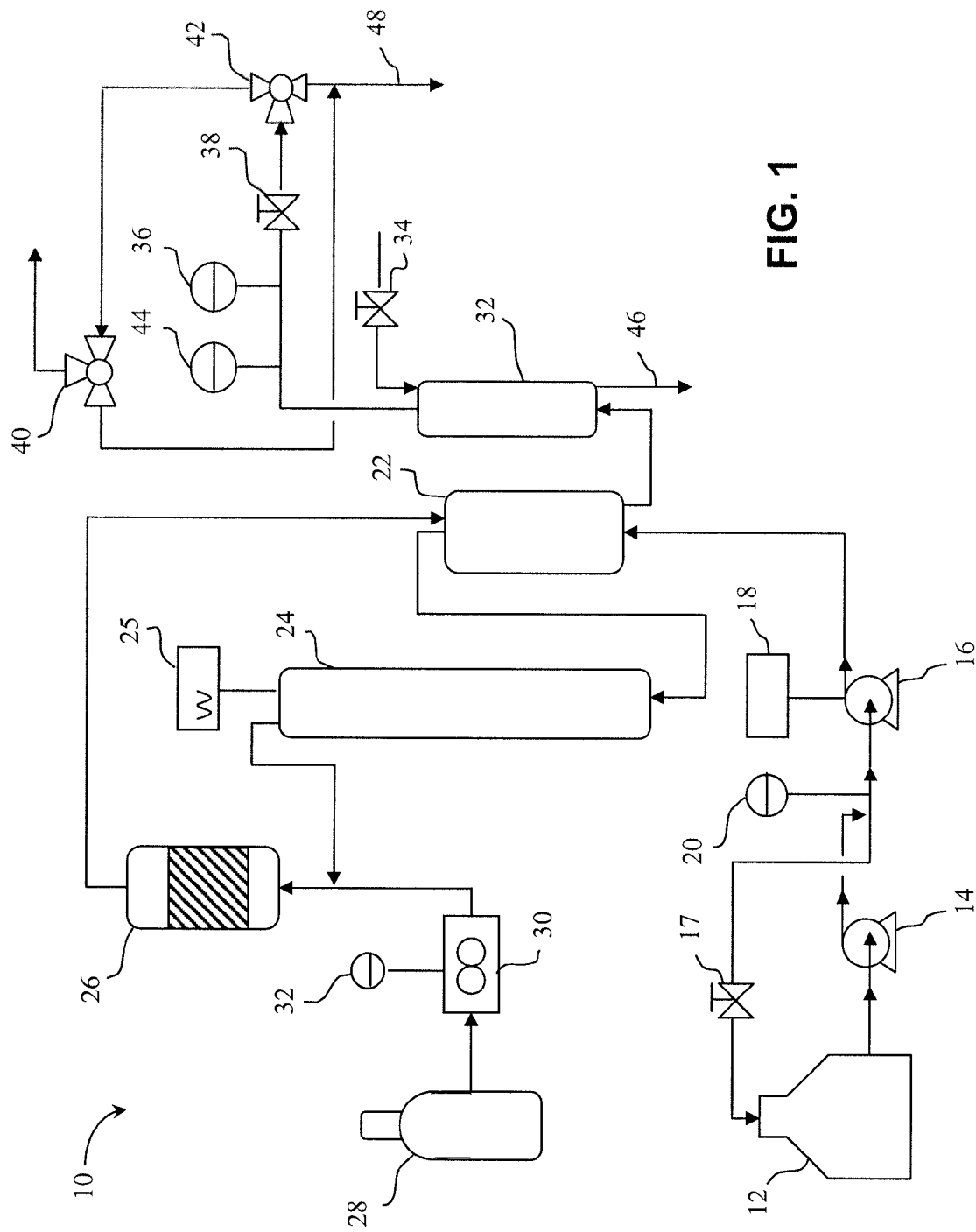
FIG. 1 is a schematic view of an exemplary flow system used for the catalytic wet oxidation of lactose.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Lactose or milk sugar, 4-O-β-D-galactopyranosyl-α-D-glucose, is the main carbohydrate constituent found almost exclusively in mammalian milk. It is also a low value by-product generated in large quantities from the dairy industry, primarily from cheese whey. Since only a small amount of cheese whey is further utilized, environmental concerns have arisen with respect to its disposal. In order to minimize the amount of waste entering the environment, it is desirable to convert lactose to carbon dioxide and water, the disposal of which will not result in air pollution or, preferably, to convert lactose to a value added product allowing for re-use of the material. Catalytic wet oxidation offers the possibility to recycle waste materials to value added products or to convert them to carbon dioxide. In addition, catalytic wet oxidation has comparatively low energy requirements, since water does not have to be evaporated.

Catalytic Wet Oxidation

Oxidation is one of the cheapest and simplest ways to introduce specific functionality into carbohydrate molecules. The mechanism of oxidations can generally be described as a dehydrogenation reaction, which involves the removal of hydrogen as from a molecule. Wet oxidation is then defined as an aqueous-phase oxidative dehydrogenation process brought about when an organic and/or oxidizable inorganic containing liquid is pre-mixed thoroughly with a source of pure oxygen or air at milder temperatures and pressures. Practically, wet oxidation processes can be operated in a wide range of temperatures and pressures. A wet oxidation reaction is generally performed at temperatures of 150-325° C. and the gauge pressures of the flow system are maintained at a range of 2000-20,000 KPa to promote the oxidation reaction in the reactor and to prevent water from evaporating when the temperature exceeds 100° C. Wet air oxidation (WAO), involving oxidation at high temperatures (125-320° C.) and operating pressure (0.5-20 MPa) conditions, is a useful method for the treatment of hazardous, toxic, and nonbiodegradable waste streams in industrial wastewater treatment. Some specific industrial applications of wet air oxidation (WAO) include distillery waste treatment, municipal sewage sludge treatment, cyanide and nitrile wastewater treatment, black liquor treatment, and spent carbon regeneration.

However, the high temperature and pressure necessary for oxidation without a catalyst is impractical for industrial use. Thus, to achieve a more efficient and economical oxidation process by increasing the rate of reaction at lower temperatures and pressures and decreasing the activation energy of the reaction, a catalyst may be used to enhance the desired reactant conversion. Such a reaction is called Catalytic Wet Oxidation (CWO).

The benefit of catalytic wet oxidation is that use of a catalyst reduces significantly the severity of conditions required to achieve the desired reaction. Thus, CWO may be conducted at milder temperatures and pressures (90-150° C.; 0.1-2 MPa $O_2$). Recent studies indicate a variety of catalysts for catalytic wet oxidation have been developed and tested. These catalysts can generally be grouped into three different categories, which are transition metal salts, noble metal catalysts, and activated carbon.

Transition metal salts comprise the first category. These catalysts may be used in both homogenous and heterogeneous conditions, in other words, they can be used either in solution or on a solid support. Transition metal catalysts exist, for the most part, as oxides on a gamma-alumina support. For example, catalytic wet oxidation has proved to be effective at eliminating hazardous organic compounds, such as phenol, from waste waters. The combinations of 2% of CoO, $Fe_2O_3$, MnO or ZnO with 10% CuO were supported on gamma-alumina by pore filling, calcined and then tested for their ability to oxidize aqueous phenol solutions using air as an oxidant. The highest residual phenol conversion was obtained for the ZnO—CuO catalyst (Fortuny, A., Bengoa, C., Font, J., Fabregat, A., Bimetallic catalysts for continuous catalytic wet air oxidation of phenol, *J. Hazard Mater.* 1999 Jan. 29, 64(2), p. 181-93). A recent review also suggests catalysts in this category allow for oxidation of phenol to occur at temperatures as low as 120° C. and oxygen partial pressures as low as 0.6 MPa (Fabregat, A., Fortuny, A., Ferrer, C., Bengoa, C and Font, J., Catalytic removal of phenol from aqueous phase using oxygen or air as oxidant, *Catal. Today* 1995, 24, p. 79-83).

In addition to the oxidation of phenol, the catalytic wet oxidation of acetic acid has been carried out over a $Pt/Al_2O_3$ catalyst at temperatures and pressures below the critical point of water. Catalytic enhancement on selectivity to two-carbon carboxylic acids was also observed for catalytic wet oxidation of glucose, a simple monosaccharide sugar and a source of energy in animals and plants, over a monolith-supported $Pt/Al_2O_3$ catalyst. In another example, the wet oxidation of ammonia was carried out in the presence of Cerium (Ce)-based composite oxide catalysts, i.e. Mn/Ce composite oxides. The addition of Ce increased the surface area of the Mn/Ce catalyst, and the apparent activity demonstrated that Mn/Ce catalysts are much more useful in the treatment of $NH_3$ than a Mn catalyst. It was found that no NO and a trace amount of $NO_2$ were detected in the vapor phase and only a small amount of $NO_3^-$ was present in the solution, indicating that most of the $NH_3$ was converted into $N_2$.

Noble metal catalyzed oxidations of carbohydrates and derivatives have received attention in the past 12 years. Noble metals have also been investigated as catalysts for treatment of industrial wastewater. These catalysts are often reacted in a heterogeneous manner from a solid support of $Al_2O_3$ or activated charcoal. For example, water solutions of glucose were oxidized with air at 313 K on palladium (Pd) catalysts supported on active charcoal. High gluconate yields were obtained in the presence of bismuth-promoted catalysis. A promoting effect of bismuth (Bi) on the activity of Pd catalysts was also observed in lactose oxidation.

Activated carbon makes up the third category of catalysts used in catalytic wet oxidation processes. As can be seen from above, active carbon has been used as support for other catalysts. Active carbon has also been used as a catalyst in the wet air oxidation of phenol. While use of active carbon produces high phenol conversion rates, loss of active carbon over continuous runs has been observed.

Lactose

Lactose is a commonly used material in a number of industries, and has major applications in food and pharmaceutical manufacturing. The physical properties of lactose enable it to function in a wide variety of applications. For instance, its widespread use in pharmaceutical dosage forms arises from the absence of any real toxicity or unacceptable taste, its favorable mechanical qualities, and good aqueous solubility.

Chemical Properties Lactose, or milk sugar, has the molecular formula $C_{12}H_{22}O_{11}$. It is a disaccharide consisting of two monosaccharide units, or carbohydrates, containing either a ketone or aldehyde functional group, formed by the union of one molecule of glucose and one of galactose through an ether linkage (β-1,4-galactosidic linkage) as shown below. The binding between the two monosaccharide units results in the loss of a hydrogen atom (H) from one molecule and a hydroxyl group (OH) from the other. A water molecule is extracted and a bond is formed, leaving an oxygen atom between the two monosaccharide units, and creating a disaccharide. Thus, it is simply the dehydration reaction between two sugar molecules.

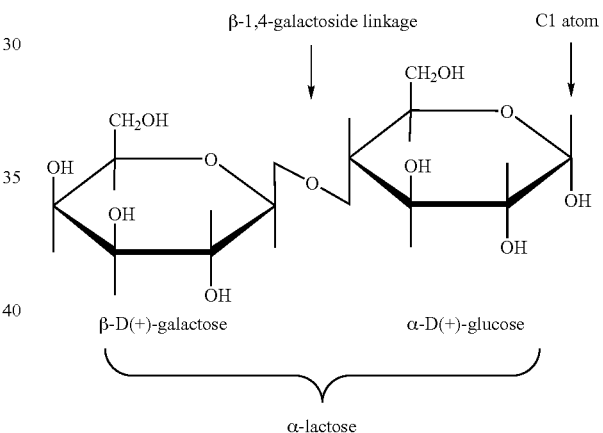

Lactose exists in two isomeric forms, α- and β-lactose. The only difference between these two is the relative position of the hydrogen and the hydroxyl group in the C1-atom of the pyranosidic glucose part. At room temperature (298 K), lactose in aqueous solution consists of 62.25% β-pyranose form and 37.25% α-pyranose form. Among the two, α-lactose is the most common form, having the more desirable physical characteristics. Lactose generally reacts the same way as the other reducing sugars that contain an aldehyde group which can be oxidized to form a carboxylic acid group, or in the presence of a base, a carboxylate ion group. The most active sites of reaction are the reducing end of the glucose moiety, the various hydroxyl groups and the bond between the glucose and the galactose moieties.

Reactions involving lactose include oxidation, dehydrogenation, hydrogenation, hydrolysis and the formation of nitrogen derivatives, esters and other unsaturated compounds. Most recent reviews focus mainly on oxidation, isomerization and hydrogenation products of lactose like lactobionic acid, lactulose and lactitol. In addition, many derivatization reactions of lactose have been performed in aqueous solution in such a way that the lactose molecule breaks down at the glycosidic bond into the building units of glucose and galactose. Several non-degradative oxidation reactions of lactose have been investigated in some detail such as the oxidation by halogen, by electrochemical processes, by oxygen and alkali in homogenous systems and by catalyst and oxygen in heterogenous systems.

Physical Properties Lactose normally crystallizes in its α-lactose monohydrate form; the anhydrous β-lactose can only be obtained at crystallization temperatures above 366 K. The structure of the lactose molecule makes it rather unique with regard to its properties, for instance, the relatively low solubility in water as compared with sucrose and maltose and the relatively lower sweetness as compared with glucose, galactose, or sucrose. The comparatively low solubility of lactose, coupled with its relatively low sweetness restricts the use of lactose in food systems, and therefore limits the consideration for lactose being a functional food ingredient, for instance, a sweetener. However, the relatively low sweetness of lactose may also be advantageous, depending on the application. Table 1 summarizes many of the physical properties of both α- and β-lactose (Hendriks, Henricus E. J., Ph.D. Thesis, Selective Catalytic Oxidation of Lactose and Other Carbohydrates, Eindhoven University of Technology, 1991).

TABLE 1

| Properties | α-Lactose Monohydrate | β-Lactose |
|---|---|---|
| Molecular weight (g/mol) | 360.34 | 342.31 |
| Melting Point (° C.) | 201–202 (Decomposed) | 253 |
| Crystalline form | Sphenoidal monoclinic | Monoclinic |
| Density at 293 K (g/cm$^3$) | 1.54 | 1.59 |
| Enthalpy of Formation at 298 K (kJ/mol) | −2481 | −2233 |
| Enthalpy of Combustion (J/g) | −16.1 | −16.5 |
| Specific Heat at 293 K (J/K · g) | 1.251 | 1.193 |
| Entropy at 298 K (J/K · mol) | 415 | 386 |
| Entropy of Formation at 298 K (J/K · mol) | −2453 | −2248 |
| Gibbs Free Energy at 298 K (kJ/mol) | −1750 | −1564 |
| Solubility, g/100 g in H$_2$O at 293 K | 7.4 | 48 |

Chemical Oxidation of Lactose Oxidation is one of the cheapest ways to introduce specific functionality into carbohydrate molecules yielding, for example, aldonic- and aldaric-acids. Glucose can be converted to 2- and 4-carbon organic acids and then subsequently oxidized to carbon dioxide and water, both with steps occurring in the presence of oxygen. For the initial decomposition of glucose to small organic acids, a typical catalyst such as alumina supported platinum (Pt/Al$_2$O$_3$) is used. The subsequent decomposition into CO$_2$ is catalyzed using a manganese oxide/cerium oxide catalyst (Mn/Ce). Alternatively, the glucose sub-unit can be further converted to a value added product, gluconic acid (shown below), via catalytic wet oxidation.

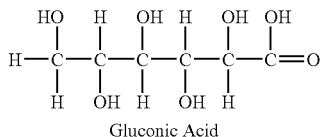

Gluconic Acid

Gluconic acid is formed by opening the ether linkage of the glucose ring and then hydrolyzing the open end to the acid. The typical catalyst for this reaction is palladium on activated carbon with a bismuth promoter denoted as Pd—Bi/C. Gluconic acid is used commercially as a biodegradable chelating agent and also as an intermediate in the food and pharmaceutical industries.

Lactose can undergo extensive oxidation reactions, depending on the conditions and the severity of the oxidizing agents. These reactions range from the simple oxidation of the reducing group of the glucose moiety to complete conversion to carbon dioxide and water. Similar to producing gluconic acid from glucose, lactobionic acid or 4-O-β-D-galactopyranosyl-D-gluconic acid (shown below) is a higher value sugar acid derived from lactose and can be formed similarly to gluconic acid via catalytic wet oxidation.

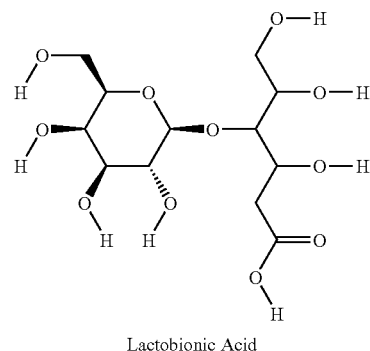

Lactobionic Acid

In this case, the ether linkage of the glucose is opened while the galactose and glucose unit are still linked the open glucose end is then hydrolyzed to the acid form. The catalyst used for the conversion of lactose to lactobionic acid is the same Pd—Bi/C catalyst used for making gluconic acid.

The oxidation of α-lactose monohydrate with molecular oxygen to lactobionic acid is shown below. Generally, to form lactobionic acid, the ring-form glucose is opened and one end of the —OH group is then oxidized to a carboxylic acid.

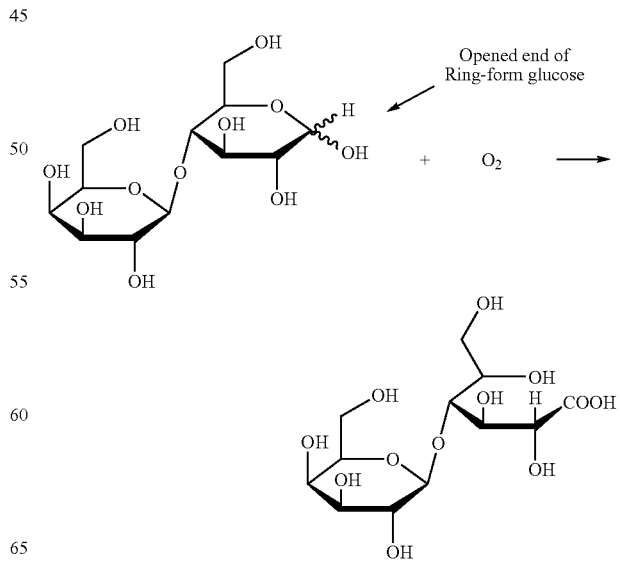

High yields of lactobionic acid or its salts may be produced from lactose by electrochemical, microbiological, or chemical oxidation. Chemical oxidations of lactose include homogeneous catalytic oxidation and heterogeneous catalytic oxidation. The heterogeneous catalytic oxidation is in fact a dehydrogenation. This is especially true in highly alkaline media where sugars dehydrogenate spontaneously to the acid lactones, which subsequently hydrolyses to the acids. Most of the catalytic oxidation reactions are operated under alkaline conditions in a batch reactor. It has been found that lactose and galactose are 1.7 times more reactive than glucose due to the ability of the galactose moiety to form a complex with metal Pt from the Pt-catalyst, by using 0.33 M KOH to obtain an alkaline reaction condition. Some homogeneous catalytic oxidations of aldose with several metal ions as catalyst and $O_2$, $H_2O_2$, halogens, or $HNO_3$ as oxidants have also been reported.

In addition, the heterogeneous, noble metal-catalyzed oxidation of aldoses to aldonic acids has been studied without mentioning lactose. However, several recent French patents have claimed the use of a bismuth-modified palladium-on-carbon catalyst for the oxidation of aldoses, including lactose, to aldonic acids (Fuertes, P., and Fleche, G., Eur. Pat. Office 0,232,202 A2 (1987); 108 (1988) 187,205j; Fuertes, P., and Fleche, G., Eur. Pat. Office 0,233,816 A1 (1987); 108 (1988) 187,206k).

The approaches to minimizing lactose disposal through the application of catalytic wet oxidation are provided below. The first approach involves the degradation of lactose to $CO_2$ and $H_2O$. The second approach involves the conversion of lactose to value added products.

Degradation of Lactose to $CO_2$ and $H_2O$

Glucose, a monosaccharide containing six carbon atoms and the molecular formula of $C_6H_{12}O_6$, is considered physically and chemically similar to lactose, which is a disaccharide formed by the union of one molecule of glucose and one molecule of galactose through an ether linkage. Literature results have shown that $Pt/Al_2O_3$ is capable of converting glucose to 2- and 4-carbon acids (oxalic, tartaric, malic, and succinic acids). Since there is no known literature demonstrating that lactose degrades similarly to glucose, the $Pt/Al_2O_3$ catalysts were synthesized and then investigated to determine if it could decompose lactose to 2- and 4-carbon acids similar to glucose. If the two and four carbon acids were formed similar to glucose, literature results suggested that a Mn/Ce composite oxide catalyst would be capable of further degrading the carbon acids to $CO_2$ and $H_2O$. If different products were formed, the ability of Mn/Ce catalyst to degrade them would need to be investigated.

One aspect of the present invention includes a two step process for the complete degradation of lactose to $CO_2$ and water. Another aspect of the present invention includes a one step or one catalyst process to degrade lactose to $CO_2$ and water using a $Pt/Al_2O_3$ catalyst, a Mn/Ce catalyst or a bifunctional $Pt/Ce/Mn/Al_2O_3$ catalyst.

Conversion of Lactose to Value Added Products

Pd—Bi/C catalysts have been shown to convert lactose to lactobionic acid in a batch process. From an industrial standpoint, the literature has shown that palladium-bismuth bimetallic catalyst is a very promising catalytic material for the production of gluconic acid from glucose by catalytic wet oxidation with air. The activity of palladium is so enhanced by bismuth that the reaction rates are rapidly limited by mass transfer of oxygen rather than by the activity of the catalyst. High gluconate yields are obtained and reducing sugars are the main residual side products in the gluconate solution. Therefore, the highly selective Pd—Bi/C catalyst does not generate highly oxidized products, which probably also accounts for its high stability.

The above work involved the conversion of lactose to lactobionic acid using a Pd—Bi/C catalyst carried out in a batch reactor. Since certain advantages adhere to flow processes, a further aspect of the present invention includes the conversion of lactose to lactobionic acid using a Pd—Bi/C catalyst in a flow reactor.

Apparatus

The experimental flow system used for catalytic wet oxidation of lactose consists of three separate systems: a feed system; a reactor system; and a separation system. A schematic representation of an exemplary flow system 10 is shown in FIG. 1.

The feed system comprises a liquid feed unit 12. A liquid or solution from the liquid feed unit 12 is charged into the reactor system using one or more pumps. In the embodiment shown in FIG. 1, the feed system comprises two pumps. A primary pump 14 raises the pressure of the liquid feed stream before it enters the reactor system. A secondary pump 16 is installed in series with the primary pump 14 and maintains the desired system pressure and flow rate. A pressure transducer 20 is located upstream of the secondary pump 16. A two-way valve 17 between the primary pump 14 and the secondary pump 16 may be used to adjusted the desired flow rate. The flow rate is monitored by a gear pump contoller/dispenser 18 which is attached to the secondary pump 16. From the secondary pump 16, the feed is heated in a counter current heat exchanger 22 and then further heated to the desired temperature in a feed heater 24. The heat exchanger 22 and feed heater 24 may be wrapped with heat tape and insulated from the environment by pipe insulation. A thermocouple (not shown) is inserted into the top of the feed heater 24 with a temperature controller 25 attached in order to monitor the temperature of the feed stream before it enters the reactor system. From the feed heater 24, the feed is routed to a flow reactor 26 packed with four different catalysts, one kind at a time, for reaction.

The feed system further comprises a gas feed unit 28 by which oxygen gas is charged into the reactor system. The oxygen gas flow rate is monitored by a mass flow meter 30 and mass flow controller 32. In one embodiment, the gas enters the flow reactor 26 via stainless steel tubing.

The oxygen gas from the gas feed unit 28 and the liquid from the liquid feed unit 12 undergo a catalytic reaction on passage through the flow reactor 26. Effluent from the flow reactor 26 is then charged to the separation system. In one embodiment, the flow reactor 26 is a flow reactor having dimensions of 5 cm in diameter by 10 cm in length and consisting of a section of 316 stainless steel tubing connected to the feed heater 24 and the counter current heat exchanger 22. The length of the catalyst packed bed is 7.1 cm.

In the separation unit, the effluent stream from the flow reactor 26 is cooled to ambient temperature by first passing through a counter-current heat exchanger 22, through which the feed stream flows in one direction as a cold stream and the effluent stream from the flow reactor 26 flows in the opposite direction as a hot stream. In one embodiment, the heat exchanger 22 consisting of a 5.72 cm ID by 122 cm length 304 stainless steel tube and the feed heater 24 were wrapped with heat tape and insulated from the environment by pipe insulation. A cooler 32 with tap water flowing through as a coolant is used to further cool the effluent stream down to room temperature. A two-way valve 34 may be used to adjust the flow of tap water through the cooler 32.

Tap water is drained from the cooler 32 via conduit 46. Once the effluent stream has cooled to room temperature, the system pressure is detected by a pressure transducer 36 and subsequently controlled by a back pressure regulator 38, which maintains the flow system at a desired constant pressure. The effluent stream is then directed through a tee 42. The gas mixture is purged out of the system to a vent through a tee 40. The liquid is discharged down a drain line or removed for sampling via conduit 48. A dissolved oxygen meter 44 records the dissolved oxygen content in the effluent stream.

The flow system 10 in FIG. 1 was used to carry out the examples in the Experimental section provided below. However, FIG. 1 serves merely as an example of the types of systems that may be used in the processes of the present invention and is in no way meant to be limiting. Other similar flow systems known to those skilled in the art may be employed as well.

The operating parameters of the flow system 10 may vary depending upon the tolerances of the components making up the flow system 10. For example, the system pressure may be limited by the maximum operating pressure of the back pressure regulator 38. However, it should be understood that the catalytic reaction can be run under any temperature and pressure conditions where water remains a liquid in the flow system 10.

In the flow system 10 used in the examples below, the feed solution was typically a 0.08 M aqueous lactose solution. This feed concentration was selected because it approximated the lactose concentration in waste from cheese factories. However, other feed concentrations could be used as well. The temperature of the feed heater 24 typically ranged from about 100-170° C. and more particularly from about 140-170° C. This included temperatures of about 140° C., 150° C., 160° C. and 170° C. The system pressure typically ranged from about 85 to about 100 psig. The maximum pressure controls of the back pressure gauge/controller and the pressure transducer were 150 psig and 100 psig, respectively, providing a flow system 10 operating at a maximum pressure of about 100 psig. As indicated above, the temperature and pressure conditions depend upon the components making up the flow system 10. In a flow system 10 designed to operate at higher temperatures and pressures, the catalytic reaction may be carried out at any temperature and pressure conditions in which water remains in the liquid phase. The oxygen flow rate was determined by the concentration of the lactose solution and liquid feed rate as outlined below. The molar ratio of oxygen and lactose in the flow reactor 26 was based upon reaction stoichiometry, wherein the molar ratio of oxygen to lactose was at or above the stoichiometric ratio of oxygen to lactose required to carry out the desired reaction. For example, in the catalytic oxidation of lactose to $CO_2$ and water, the molar ratio of oxygen to lactose in the flow reactor 26 was at least about 12:1.

EXPERIMENTAL

Procedure

A feed with a concentration of 0.08 M was prepared by dissolving about 317.1 g of α-D-lactose monohydrate in 11 liters of distilled water in a 19-L glass container. The lactose solution was charged from the glass container into a flow system 10 similar to that exemplified in FIG. 1. The pressure of the feed stream was first raised up by the primary pump 14, and the reactor assembly flow rate was set via the secondary pump 16 and the attached gear pump controller 18. Once the liquid reached the back pressure regulator, both the regulator and the two-way valve 17 between the two pumps 14, 16 were adjusted to achieve the desired flow rates, with the system pressure maintained at a range of 85 psig to 100 psig. While a small portion of feed solution was drawn by pump suction through the primary pump 14 into the secondary pump 16 and the gear pump controller 18 was calibrated to deliver approximately 20 ml/min of liquids at a pressure of 85 psig into the flow system 10, the rest of the solution from the primary pump 14 was recycled back to the liquid feed unit 12 (i.e., glass container). Therefore, in such a way, the pressure of the feed stream before entering the system was maintained at a pressure identical to the system pressure adjusted by the back pressure regulator.

When the flow system 10 was adjusted to a certain desired constant pressure, the feed heater 24 was set to either of these desired operating temperatures of 140° C., 150° C., 160° C. or 170° C. Oxygen gas was fed into the reactor 26 at a higher pressure of 105 psia to ensure the flow of oxygen gas into the system. Once several data points were collected to give a good statistical representation of the effluent concentrations at steady state at one temperature, the temperature was then increased to the next temperature while holding the flow rate constant at all time during each run. The amount of dissolved $O_2$ in the solution was also recorded when the effluent stream flowed through the dissolved oxygen meter 44 after cooling.

Four different types of catalysts were applied to convert lactose to either smaller organic acids, lactobionic acid or carbon dioxide/carbon monoxide and water, respectively. For the initial decomposition of lactose to small organic acid, a typical catalyst, alumina-supported platinum catalyst ($Pt/Al_2O_3$) was used. To further degrade the carbon acids to carbon dioxide, a manganese cerium catalyst (Mn/Ce) was employed. For direct conversion of lactose to $CO_2$, Mn/Ce supported Pt catalyst (Pt/MnCe) was applied. Finally, bismuth promoted palladium carbon catalyst (Pd—Bi/C) was used to convert lactose to lactobionic acid in a flow reactor 26.

The efficacy of each of the four catalysts mentioned above was individually examined at different experimental conditions by varying the temperature settings, flow rate settings, and the amount of pure oxygen gas fed into the system. To investigate the effects of temperature (140° C., 150° C., 160° C.) on steady state conversion of lactose, reaction rates and selectivity, the flow rate was varied according to the temperature settings from a range of 5 ml/min to 35 ml/min and the system pressure was always maintained at a constant range of 88 to 90 psig. To examine the flow rate effects, lactose solution was run through the flow system 10 at several different flow rates, one at time at a constant temperature of 170° C. and a pressure of 100.2 psig throughout each run.

The amount of oxygen supplied to the flow system 10 was another important controllable parameter to give a different product and conversion at a constant temperature, pressure and flow rate. Ideally, according to the estimation using software (HYSYS), for 100% conversion of lactose to lactobionic acid or to carbon dioxide and water, the flow rate of $O_2$ fed into the reactor was estimated according to the temperature and pressure settings, the feed rate and the concentration of reactant fed into the flow system 10. A sample calculation of the level of oxygen needed for a specific concentration and feed rate setting at desired temperature and pressure is provided below.

Concentration of feed (lactose solution)=0.08 mol/L

Feed rate of lactose solution=0.004 L/min

Conversion of Lactose to Lactobionic Acid $$C_{12}H_{22}O_{11} + 0.5O_2 => C_{12}H_{22}O_{12}$$

Lactose      Lactobionic acid

Molar flow rate of lactose = 0.08 mol/L × 0.004 L/min
$$= 3.2 \times 10^{-4} \text{ mol/min}$$

Molar flow rate of oxygen required for 100% conversion $= 0.5 \times 3.2 \times 10^{-4}$ mol/min
$$= 1.6 \times 10^{-4} \text{ mol/min}$$

Using HYSYS, volumetric flow rate (V) of oxygen gas at different temperatures (T) and system pressure ($P_{system}$) was estimated:

At $P_{system}$=85 psig, $T1$=100° C., $V1$=4.324×10$^{-5}$ m$^3$/min $T2$=150° C., $V2$=4.911×10$^{-5}$ m$^3$/min At $P_{system}$=100.2 psig, $T3$=170° C., $V3$=4.464×10$^{-5}$ m$^3$/min At $P_{system}$=90 psig, $T4$=140° C., $V4$ 4.564×10$^{-5}$ m$^3$/min $T5$=60° C., $V5$ 4.788×10$^{-5}$ m$^3$/min

Direct Conversion of Lactose to Carbon Dioxide and Water $$C_{12}H_{22}O_{11} + 12O_2 => 12CO_2 + 11H_2O$$

Lactose      Carbon Dioxide

Molar flow rate of lactose = 0.08 mol/L × 0.004 L/min
$$= 3.2 \times 10^{-4} \text{ mol/min}$$

Molar flow rate of oxygen required for 100% conversion $= 12 \times 3.2 \times 10^{-4}$ mol/min
$$= 0.00384 \text{ mol/min}$$

Using HYSYS, volumetric flow rate (V) of oxygen gas at different temperatures (T) and system pressure ($P_{system}$) was estimated:

At $P_{system}$=85 psig, $T1$=100° C., $V1$=1.038×10$^{-3}$ m$^3$/min $T2$=150° C., $V2$=1.179×10$^{-3}$ m$^3$/min At $P_{system}$=100.2 psig, $T3$=170° C., $V3$=1.071×10$^{-3}$ m$^3$/min At $P_{system}$=90 psig, $T4$=140° C., $V4$=1.095×10$^{-3}$ m$^3$/min $T5$=160° C., $V5$=1.149×10$^{-3}$ m$^3$/min Since the mass flow meter of oxygen was calibrated at atmospheric pressure, to calculate the actual volumetric flow rate of oxygen required at atmospheric pressure, a scale factor (SF) was necessary to convert the values estimated using HYSYS at different temperatures and pressures to the value at atmospheric pressure:

At $T1$, $P_{system}$=85 psig, $SF1$=(85+14.696) psia/14.69595 psia=6.784

At $T2$, $P_{system}$=85 psig, $SF2$=(85+14.696) psia/14.69595 psia=6.784

At $T3$, $P_{system}$=100.2 psig, $SF3$=(100.2+14.696) psia/14.69595 psia=7.818

At $T4$, $P_{system}$=90 psig, $SF4$=(90+14.696) psia/14.69595 psia=7.124

At $T5$, $P_{system}$=90 psig, $SF5$=(90+14.696) psia/14.69595 psia=7.124

Multiplying the volumetric flow rate (V1, V2, V3, V4, V5) of oxygen estimated using HYSYS by the corresponding scale factors (SF) calculated above with respect to different temperature and pressure, the actual volumetric flow rate of oxygen (V) required at atmospheric pressure were obtained in L/min and shown below:

Conversion of Lactose to Lactobionic Acid

At $P_{system}$=85 psig, $T1$=100° C., $V=V1 \times SF1 \times 1000/60$=4.891×10$^{-3}$ L/min $T2$=150° C., $V=V2 \times SF2 \times 1000/60$=5.555×10$^{-3}$ L/min At $P_{system}$=100.2 psig, $T3$=170° C., $V=V3 \times SF3 \times 1000/60$=5.819×10$^{-3}$ L/min At $P_{system}$=90 psig, $T4$=140° C., $V=V4 \times SF4 \times 1000/60$=5.421×10$^{13}$ L/min $T5$=160° C., $V=V5 \times SF5 \times 1000/60$=5.687×10$^{-3}$ L/min

Conversion of Lactose to $CO_2$ and $H_2O$

At $P_{system}$=85 psig, $T1$=100° C., $V=V1 \times SF1 \times 1000/60$=0.117 L/min $T2$=150° C., $V=V2 \times SF2 \times 1000/60$=0.133 L/min At $P_{system}$=100.2 psig, $T3$=170° C., $V=V3 \times SF3 \times 1000/60$=0.140 L/min At $P_{system}$=90 psig, $T4$=140° C., $V=V4 \times SF4 \times 1000/60$=0.130 L/min $T5$=160° C., $V=V5 \times SF5 \times 1000/60$=0.136 L/min Due to several different feed rates at different temperatures and the corresponding desired pressure, the actual volumetric flow rate of oxygen required for 100% conversion of lactose to either lactobionic acid or carbon dioxide and water were estimated as above using HYSYS. Reaction conditions included a feed rate in the range of 0.004 L/min to 0.045 L/min and temperature in the range of 100° C. to 170° C. with respect to the appropriate pressure (85 psig, 90 psig and 100.2 psig). Table 2 indicates the volumetric flow rate of $O_2$ at 1 atm for 100% conversion of lactose to lactobionic acid. Table 3 indicates the volumetric flow rate of $O_2$ at 1 atm for 100% conversion of lactose to $CO_2$ and $H_2O$. The concentration of lactose feed solution is constant at 0.08 mol/L in every experiment.

TABLE 2

| Temperatures | Volumetric flow rate of oxygen (V) at atmospheric pressure (L/min) | |
| --- | --- | --- |
| | Feed rate = 0.004 L/min | Feed rate = 0.045 L/min |
| 100° C. (85 psig) | $4.891 \times 10^{-3}$ | 0.055 |
| 150° C. (85 psig) | $5.555 \times 10^{-3}$ | 0.062 |
| 170° C. (100.2 psig) | $5.819 \times 10^{-3}$ | 0.065 |
| 140° C. (90 psig) | $5.421 \times 10^{-3}$ | 0.061 |
| 150° C. (90 psig) | $5.554 \times 10^{-3}$ | 0.063 |
| 160° C. (90 psig) | $5.687 \times 10^{-3}$ | 0.064 |

TABLE 3

| Temperatures | Volumetric flow rate of oxygen (V) at atmospheric pressure (L/min) | |
| --- | --- | --- |
| | Feed rate = 0.004 L/min | Feed rate = 0.045 L/min |
| 100° C. (85 psig) | 0.117 | 1.314 |
| 150° C. (85 psig) | 0.133 | 1.493 |
| 170° C. (100.2 psig) | 0.140 | 1.564 |
| 140° C. (90 psig) | 0.130 | 1.457 |
| 150° C. (90 psig) | 0.133 | 1.493 |
| 160° C. (90 psig) | 0.136 | 1.529 |

Basically, the reactivity data were obtained individually for all four different types of catalysts at several different temperatures over several different flow rates at a desired system pressure. Different oxygen flow rates were employed to give different products and conversion over different catalysts. Samples of the effluent were collected every 30 minutes in sealed vials for further analysis using a High Performance Liquid Chromatography (HPLC) detected with a Refractive Index (RI) detector and/or a Ultraviolet (UV) detector.

The complete oxidation of lactose yields lactobionic acid or the direct conversion of lactose to carbon dioxide and water according to the following stoichiometric equations respectively.

$$C_{12}H_{22}O_{11} + 0.5O_2 => C_{12}H_{22}O_{12}$$
Lactose     Lactobionic acid $$C_{12}H_{22}O_{11} + 12O_2 => 12CO_2 + 11H_2O$$
Lactose     Carbon Dioxide The conversion ($X_{LAC}$) of lactose is defined mathematically as the number of moles of lactose reacted divided by the number of moles of lactose fed into the flow system 10.

The reaction rates, r, were also determined for reactions over Pt/MnCe catalyst and Pd—Bi/C catalyst, respectively. The reaction rate, r, is obtained by multiplying the concentration of lactose reacted (mol/L) with the flow rate of lactose solution fed (L/min) and dividing with the amount of catalyst used (g). The unit of reaction rate, r, is given as mol/g·min.

Reactants

α-D-Lactose monohydrate, ACS reagent 97% was purchased from Sigma-Aldrich (Saint Louis, Mo.) and the chemical structure is shown below.

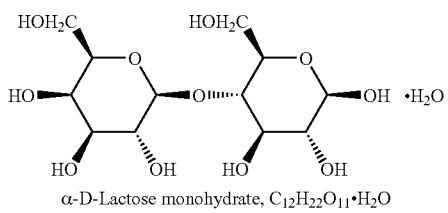

α-D-Lactose monohydrate, $C_{12}H_{22}O_{11} \cdot H_2O$

Pure oxygen gas was supplied to the flow system as an oxidant to react with lactose to form different products.

Catalysts

Manganese cerium catalysts, Mn/Ce, were prepared by coprecipitation from a mixed aqueous solution of manganese(II) nitrate and cerium(III) chloride with known molar ratios followed by calcinations at 350° C. for 3 hours in air.

Platinum aluminum oxide catalysts, $Pt/Al_2O_3$, were prepared by first slurrying aluminum oxide (gamma) in toluene. 0.0026 g of platinum(II) 2,4-pentanedionate was then added in toluene. The mixture was heated to 70° C. for 2 hours while stirring. The toluene was subsequently removed using a rotavap at an operating condition of 60° C. under vacuum and 50% rotation. The catalyst was then dried in the oven at 120° C. overnight.

Platinum promoted manganese cerium catalysts, Pt/MnCe, were prepared similarly to the platinum aluminum oxide catalysts except that manganese/cerium was used instead of aluminum oxide.

5% Pd-on-activated-carbon catalyst as delivered by the manufacturer was used. Bismuth promoted palladium carbon catalysts, Pd—Bi/C, were prepared by first dissolving bismuth(III) nitrate oxide ($BiONO_3$) in concentrated HCl. The α-D-lactose monohydrate was first added to Pd/C solution following by $BiONO_3$ solution, added dropwise, and finally the catalyst was ready for calcination, filtering and washing.

The following chemicals were purchased from Alfa Aesar-A Johnson Matthey Company, Ward Hill, Mass. and used without further purification on catalyst preparations:

Aluminum oxide, gamma, 99.97%, metal basis;
Platinum(II) 2,4-pentanedionate, Pt 49.6%;
Cerium(II) Chloride, Reacton, 99.9% (REO);
Manganese(II) nitrate, 99.98% (metal basis);
Palladium, 5% on activated carbon powder, standard, reduced, nominally 50% water wet; and
Bismuth(III) nitrate oxide.

Flow System Components

Reactions were performed in a flow system 10 at several different temperatures, pressures, feed rate and oxygen flow rates to convert lactose to the desired products. Two pumps were used to regulate the desired system pressure. A primary pump 14, Micropump model 000-605, was used to raise the pressure of fluid before entering a secondary pump 16. A secondary pump 16, Gear Pump Drive model 75210-50, together with a gear pump controller (or dispenser) 18, model 75210-60, were both designed to deliver precise volume of fluids at flow rates up to 2030 ml/min at 0 psi. The primary pump 14 had a higher horsepower of 1/20, 2500/3000 RPM DC motor and was purchased from MagneTek-Universal Electric™ Motor, Concord, Calif. The secondary pump 16 which had a smaller 1/10 horsepower, 3600 RPM precision permanent magnet DC motor, as well as the gear pump controller 18 were all purchased from Cole-Parmer Instrument Company, Vernon Hills, Ill.

There were two pressure transducers 20, 36 in the flow system 10 intended for individual use with two digital transducer indicators. The operating pressure of two transducers (model PX303-100G5V) was from 0 to 100 psig and the two indicators (model DP302-E) were able to display a reading from 0 to 100 psi. Both the transducers 20, 36 and the indicators were purchased from OMEGA Engineering, Inc., Stamford, Conn. A back pressure controller 38 with maximum control of pressure up to 150 psig was purchased from TESCOM, Elk River, Minn. and was used to maintain the desired system pressure during the experiments.

In addition, the temperature of the feed heater was adjusted at a range of 100° C. to 170° C. using a microprocessor-based temperature/process controller purchased from Omega Engineering, Inc., Stamford, Conn. (model CN76000). The reaction occurred in a reactor 26 packed with catalyst. This reactor was built in-house.

The amount of pure oxygen gas could be adjusted to a desired value and kept constant during the reaction using a mass flow meter 30 and a controller 32 both purchased from OMEGA Engineering, Inc., Stamford, Conn. The control unit (model FMA-78P4) is a 4-channel readout/power supply/setpoint control electronic box for use with FMA 700 and 800 Series mass flow meters. This unit features a 000.0 to 102.4% of full scale display and a back-panel blend control switches which selects independent operations for each channel. Since the mass flow meter 30 with model number of FMA-768A-V—He was specially designed for Helium gas, it was then calibrated along with the mass flow controller 32 to be used for pure oxygen gas in our flow system 10.

A Humonics Optiflow 650 digital flow meter was designed to measure the volumetric gas flow rate by connecting the lower inlet to the gas source respectively, using a flexible tubing. A sensor block area was designed to measure the gas flow rate by determining the rate at which bubbles moved past the sensor.

Dissolved oxygen levels were measured using an OMEGA™ PHH-71 portable dissolved oxygen meter. This instrument measured the percentage of air saturated water in % saturation and the amount of oxygen in water directly in mg/L. A calibration procedure was first carried out at a pressure of 85 psig, a flow rate of 20 ml/min and a temperature of 50° C. before used to obtain the true readings in mg/L at different operating conditions. However, this particular calibration failed due to the inappropriate usage of this dissolved oxygen meter which was only designed for use in atmospheric pressure.

To analyze the collected sample from the reaction, a Waters 600E high performance liquid chromatography (HPLC) was used in combination with a Waters 410 Differential Refractometry/Refractive Index (RI) detector and/or an Ultraviolet (UV) detector which were both obtained from Waters, Division of MILLIPORE. The HPLC was used to quantify lactose, lactobionic acid and other organic acids.

Calibrations of Experimental Apparatus

Figure 2:
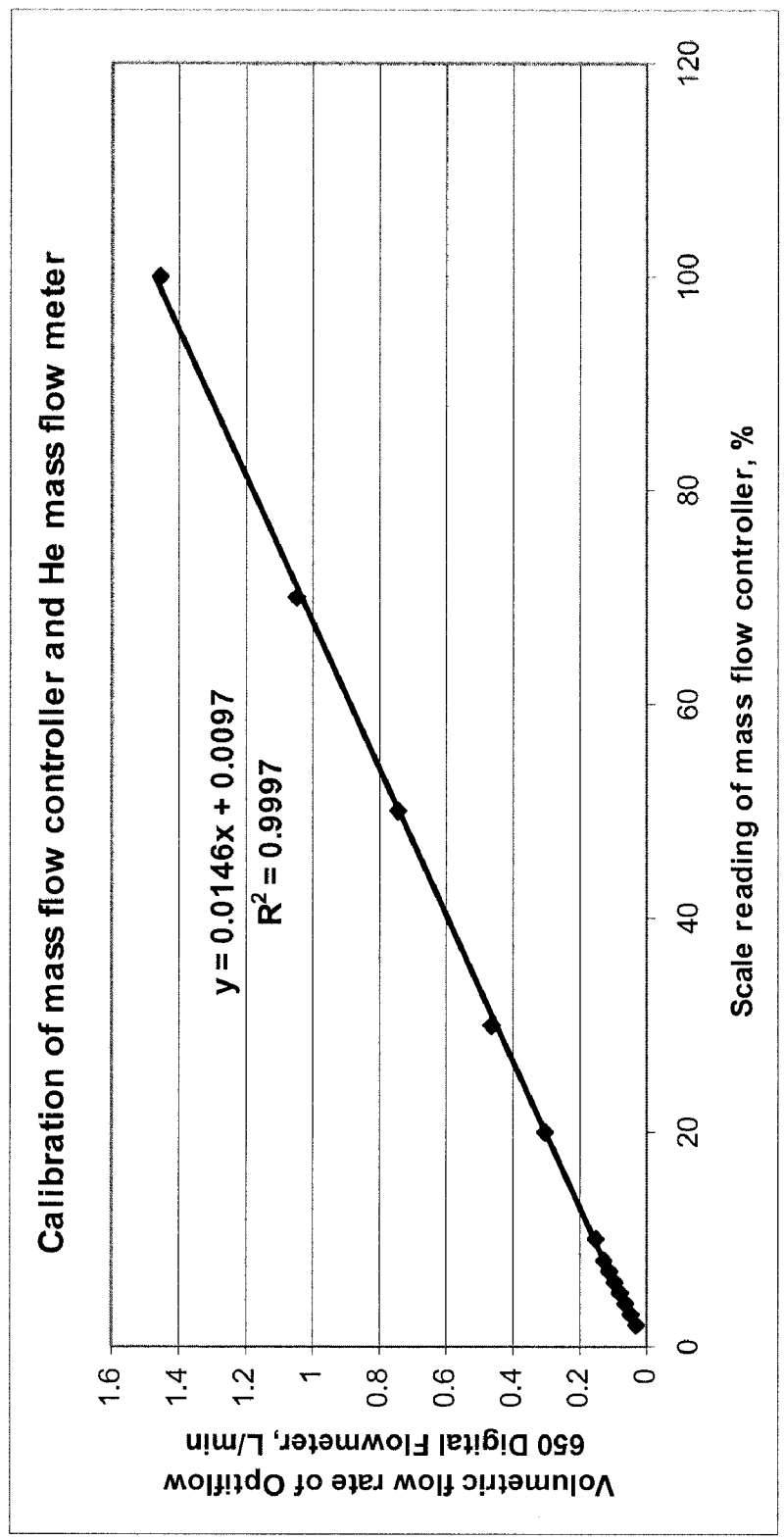
FIG. 2 is a calibration chart illustrating the flow rates of oxygen gas with respect to the corresponding scale display of a mass flow controller.

For this set of reactions, a mass flow meter previously calibrated for Helium gas was first calibrated to be used for oxygen gas using the Optiflow 650 digital flow meter. In addition, to compensate for deviations due to high system pressure, the flow rate was calibrated empirically using the gear pump controller. The system was calibrated for the measured volume (100 ml) and selected pump model (200), replacing the built-in calibration factors. Again, the dissolved oxygen meter would give a true amount of oxygen in water directly in mg/L only if the barometric pressure is 760 mmHg. Finally, a few calibrations for different sample solutions were performed individually in a High Performance Liquid chromatography (HPLC) with a Refractive index (RI) detector to give the actual concentrations of each component in the sample solutions Calibration of Mass Flow Meter and Controller for Oxygen Gas The mass flow meter was originally calibrated for helium gas and when oxygen gas was used, it had to be recalibrated along with the mass flow controller to be able to control the flow rate of oxygen gas at a desired value. To achieve this, an Optiflow 650 digital flow meter was used. This particular device offered the possibility of verifying the mass flow controller settings at a flow range of 5.0 to 5000 ml/min. By connecting the lower inlet of the glass bubble meter with the oxygen gas source from the mass flow controller using a flexible tubing, the bubbles formed in the liquid chamber (at the bottom of the glass bubble meter) were brought up to the sensor block area by the flow of oxygen gas. By setting the mass flow controller at a different scale reading (from 0.0 to 102.4%), the corresponding volumetric flow rates of oxygen gas were then measured by Optiflow 650 and shown in the unit of L/min. FIG. 2 shows the measured flow rates of oxygen gas with respect to the corresponding scale display of mass flow controller.

Calibration of Gear Pump Controller

Calibration factors for most pump models are stored permanently in a system memory and it is not necessary to recalibrate the system if this is satisfactory for individual applications. In this case, a calibration of the pump controller was essential in order to compensate for deviations in flow rates measurements due to high system pressure. This particular gear pump controller was capable of calibrating the system empirically via measured volume and achieving improved flow accuracies at a pressure of 85 psig. The empirical calibration was performed by pumping a measured volume of the application liquid at a desired flow rate. In this particular case, a flow rate of 100 ml/min was chosen. The pump drive delivered the liquid to the system at 85 psig and stopped automatically when one minute was reached. The delivered volume was measured and entered into the controller to make the displayed volume agree with the new measured volume. This refined calibration factor was then entered into memory. Since the pressure was significantly different from the set value of 100 ml per minute, several more calibration cycles were necessary to provide good repeatability Calibration of Dissolved Oxygen Sensor Before calibration, the electrode was cleaned because the probe was not in use for some time. The contamination of the gold cathode can result in erratic readings. In this case, the gold tip was gently repolished using a piece of crocus paper and the deposits from the silver anode were removed using a toothbrush dipped in diluted ammonia. The electrode was rinsed with distilled water and it was ready for calibration.

The OMEGA PHH-71 portable dissolved oxygen meter is a handheld instrument that will measure both oxygen and temperature quickly and accurately only at atmospheric pressure. Thus, a calibration was carried out to obtain true dissolved oxygen readings in mg/L at an experimental condition different from the atmospheric condition. However, since the instrument was to be used at a barometric pressure significantly different from 760 mmHg, in our case, a system pressure at a range of 85 to 100 psig and a temperature up to 170° C., this particular calibration failed.

Calibration for HPLC With RI/UV Detector

Identification and quantification of sugars and/or their oxidation or degradation products accomplished by high performance liquid chromatography (HPLC), enzymatic and gas chromatography (GC) have been previously reported.

GC analyses of sugars require chemical derivatization to produce a volatile molecule. The simplest and most rapid routine for GC analysis of sugars is silylation to produce trimethylsilyl (TMS) derivatives. For simplicity, aqueous solution of sugars and their ionic oxidation or degradation products can also be analyzed without derivatization using liquid chromatography.

The separation and quantitative analysis of neutral sugar and sugar acids have been performed by various HPLC methods using different types of columns. The most commonly used HPLC columns for determination of sugars and/or sugar acids are reverse-phase columns, anion-exchanged resin columns, and cation-exchanged resin columns.

Reversed-phase HPLC has often been used in the separation of carbohydrates and small organic acids (Simms, Peter J., Hicks, Kevin B., Haines, Rebecca M., Hotchkiss, Arland T., and Osman, Stanley F., Separation of lactose, lactobionic acid and lactobionolactome by high performance liquid chromatography, *Journal of Chromatography A* 1994, 667, p. 67-73; McGinnis, G. D., Prince, S., and Lowrimore, J., *J. Carbohydr. Chem.* 1986, 5, p. 83-97; Tsao, C. S., and Young, M., J. Chromatogr. 1985, 330, p. 408-411; Bulusu, S., Mills, G. A., and Walker, V., *J. Liq. Chromatogr.* 1991, 14, p. 1757-1777). Separation of lactose, lactobionic acid and lactobionolactome on a C-18 type reversed-phase column produced optimized separation (Simms, Peter J., Hicks, Kevin B., Haines, Rebecca M., Hotchkiss, Arland T., and Osman, Stanley F., Separation of lactose, lactobionic acid and lactobionolactome by high performance liquid chromatography, *Journal of Chromatography A* 1994, 667, p. 67-73). However, lactobionic acid eluted in the void volume of the column along with unretained sample contaminants which made quantification a problem. HPLC methods using anion exchange columns were also studied (Prabhu, S. V. and Baldwin, R. P., *J. Chromatogr.* 1990, 503, p. 227-235; Doner, L. W., and Hicks, K. B., *Anal. Biochem.* 1981, 115, p. 225-230).

Another column normally used on separation of sugar acids is a cation-exchange column (Verhaar, L. ATh., Hendriks, H. E. J., Groenland, W. P. Th., and Kuster, B. F. M., *J. Chromatogr.* 1991, 549, p. 113-123; Simms, Peter J., Hicks, Kevin B., Haines, Rebecca M., Hotchkiss, Arland T., and Osman, Stanley F., Separation of lactose, lactobionic acid and lactobionolactome by high performance liquid chromatography, *Journal of Chromatography A* 1994, 667, p. 67-73). Calcium-form cation-exchange columns have been used to separate neutral mono- and di-saccharides on both the analytic and the preparative level (Hicks, K. B., Sondey, S. M., and Doner, L. W., *Carbohydr. Res.* 1987, 168, p. 33-45; Hicks, K. B., Symanski, E. V., and Pfeffer, P. E., *Carbohyr. Res.* 1983, 112, p. 37-50). The use of calcium-form cation-exchange resins for separation of lactose, lactobionolactome and lactobionic acid was also investigated (Simms, Peter J., Hicks, Kevin B., Haines, Rebecca M., Hotchkiss, Arland T., and Osman, Stanley F., Separation of lactose, lactobionic acid and lactobionolactome by high performance liquid chromatography, *Journal of Chromatography A* 1994, 667, p. 67-73). However, lactose and lactobionolactome co-eluted by this method and the concentration of each of these compounds could not be determined directly. Thus, if one only wants to determine concentrations of lactose and lactobionate (ionized lactobionie acid) this method is simple, rapid, and practical.

Oligogalacturonic acids have recently been separated by anion-exchange HPLC using either aminopropyl-silica gel or organic polymer-based anion exchange resins (Voragen, A. G. J., Schols, H. A, DeVries, J. A., and Pilnik, W., *J. Chromatogr.* 1982, 244, p. 327-336; Hotchkiss, Jr, A. T., Hicks, K. B., Doner, L. W., and Irwin, P. L., *Carbohydr. Res.* 1991, 215, p. 81-90; Hotchkiss, Jr, A. T., and Hicks, K. B., *Anal. Biochem.* 1990, 184, p. 200-206; Hotehkiss, Jr, A. T., and Hicks, K. B., *Carbohydr. Res.* 1993, 247, p. 1-7). Aminopropyl-silica gel columns are typically used in the normal phase mode (acetonitrile-water mobile phases) for separation of neutral carbohydrates. In order to separate both neutral and acidic carbohydrates, it was necessary for the aminopropyl-silica gel column to function as a weak ion exchanger as well as a normal-phase column. Therefore, a mobile phase of acetonitrile-aqueous buffer was used (, S., Mills, G. A., and Walker, V., *J. Liq. Chromatogr.* 1991, 14, p. 1757-1777). Lactose, lactobionic acid and lactobionolactone were resolved in about 12 min using an acetonitrile-sodium phosphate buffer (50 mM, pH 5.0) (60:40) (Simms, Peter J., Hicks, Kevin B., Haines, Rebecca M., Hotchkiss, Arland T., and Osman, Stanley F., Separation of lactose, lactobionic acid and lactobionolactome by high performance liquid chromatography, *Journal of Chromatography A* 1994, 667, p. 67-73).

In this research, a simple HPLC method was developed for quantitative analysis of lactose and lactobionic acid in the reaction samples. The lactose and lactobionie acid were separated on a Hypersil APS-2 $NH_2$ (250 mm×4.6 mm) column at room temperature. A mobile phase of acetonitrile-sodium phosphate buffer (50 mM, pH 5.0) (60:40) was applied and the flow rate of the mobile phase was set at 1.0 ml/min. Signals given out of a refractive index (RI) detector was shown on chart paper as a chromatogram using chart recorder or stripper.

Figure 3:
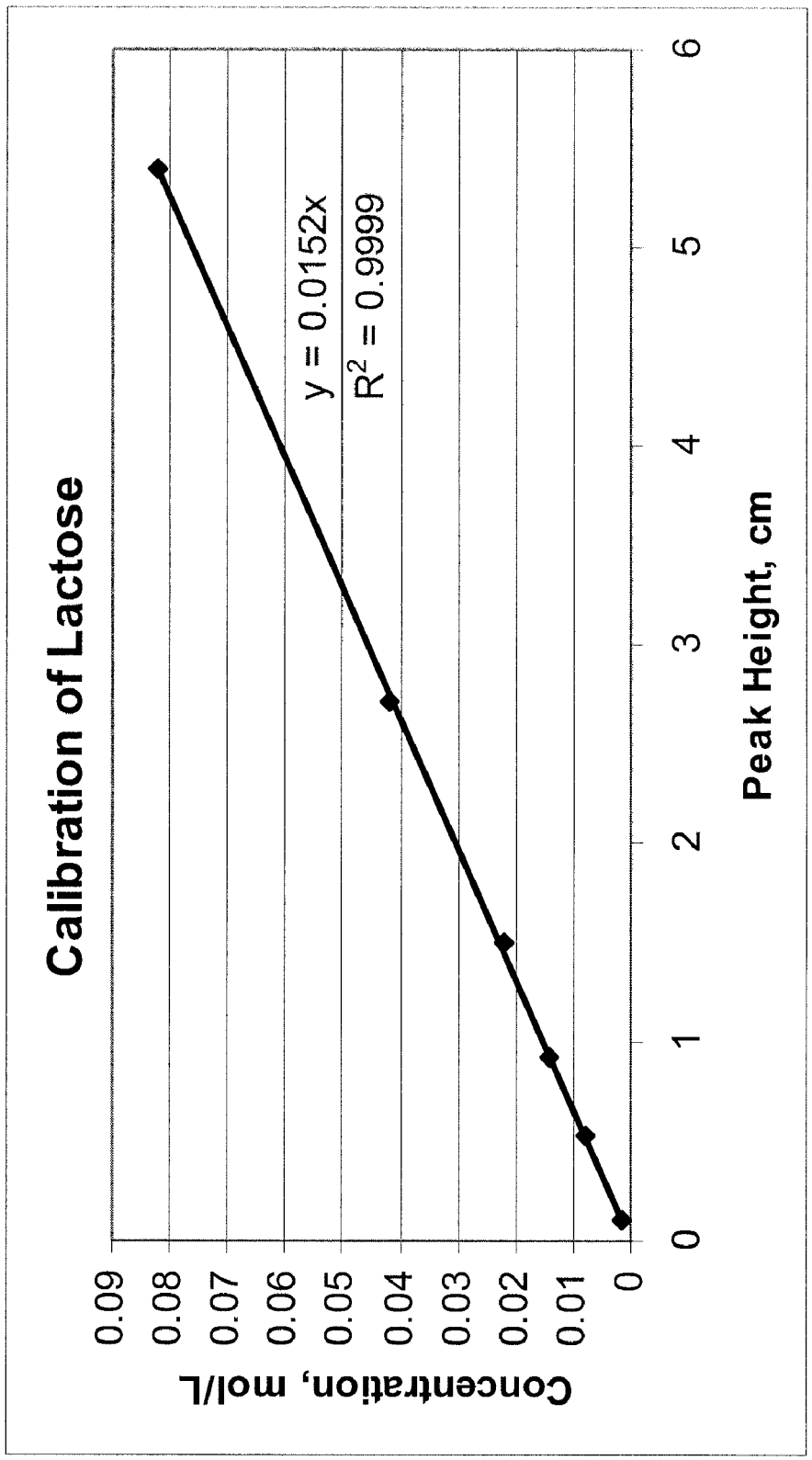
FIG. 3 is a calibration curve of lactose concentration (mol/L) versus peak height (cm) obtained by HPLC analysis.

To obtain a quantitative measure of the reactant (Lactose) and product (Lactobionic acids), the peak heights obtained from the HPLC analysis was calibrated to obtain an instrument response factor. This allowed each peak to be assigned to an individual species and the height for each peak to be related to a concentration (mol/vol). The calibration curves of lactose and lactobionic acid are shown in FIGS. 3 and 4.

Figure 4:
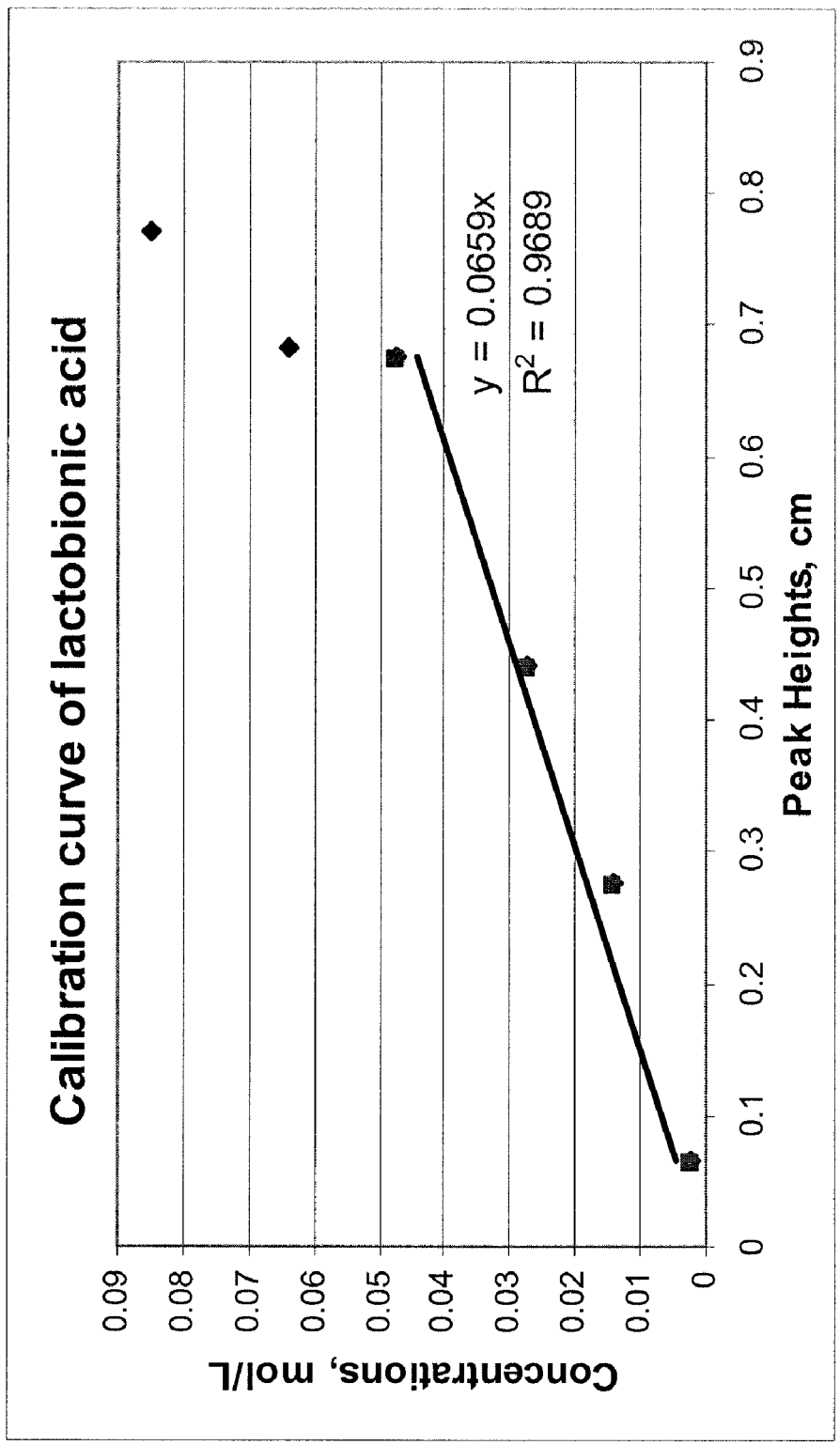
FIG. 4 is a calibration curve of lactobionic acid concentration (mol/L) versus peak height (cm) obtained by HPLC analysis.

Also note that in FIG. 4, to achieve a linear curve that passes through the origin, the first four points were selected to give a linear equation. All the reaction samples were therefore necessary to be diluted with 50% (v/v) distilled water to lower the concentrations of lactobionic acid. In such a way, all the peak heights were able to be fitted into the equation and a more accurate concentration of lactobionic acid was estimated using that equation.

In addition, high performance liquid chromatography is often the method of choice in analyzing for organic acids. Depending on the compounds to be detected, a wide variety of detectors and column combinations have been investigated. Anion exchange chromatography, a special precolumn injector technique, and a differential refractometer detector have been used to quantify 15 commonly occurring food acids in fruit juices (Palmer, J. K. and List, D. M., Determination of organic acids in foods by liquid chromatography, *J. Agr. Food Chem.* 1973, 21(5), p. 903). A simple liquid chromatographic procedure to measure organic acids in foods based on ion exclusion and partition chromatography, effluent monitoring by UV detection, and the use of dilute mineral acid as the mobile phase has been demonstrated (Turkelson, V. T., and Richards, M., Separation of the citric acid cycle acids by liquid chromatography, *Anal. Chem.* 1978, 50(11), p. 1420). An HPLC method using four ion-exclusion columns connected in series, employing water with an 0.1% (v/v) of phosphoric acid as a mobile phase and an UV detector for determination of low molecular weight organic acids in honey, honeydew, and some anatomic structures of honeybees has also been reported (Nozal, M. J., Bernal, J. L., Diego, J. C., Gornex, L. A, and Higes, M., HPLC Determination of Low Molecular Weight Organic Acids in Honey with Series-Coupled Ion-Exclusion Columns, *Journal of Liquid Chromatography & Related Technologies* 2003, 26(8), p. 1231-1253).

Additionally, a recently introduced hydrophilic end-capped C18 column was tested for the analysis of the nonvolatile organic acids in orange juices. Ten carboxylic acids were detected using 20 mM $KH_2PO_4$ as the mobile phase with a flow rate of 0.7 ml/min and UV detection at 214 nm (Shen, JianBo, Zhang, FuSuo, and Mao, DaRu, Determination of Organic Acids in Root Exudates by High Performance Liquid Chromatography: II. Influence of Several Testing Conditions, *Pedosphere* 1999, 9(1), p. 45-52). The separation of organic acids were studied by determining nine low-molecular weight organic acids on reverse-phase C18 column, using HPLC with a UV detector wavelength of 214 nm and a mobile phase of 18 mmol/L $KH_2PO_4$ buffer solution (pH 2.1). The experiment results were also compared with those of the solvent adjusted to pH 2.25 which was previously reported (Shen, JianBo, Zhang, FuSuo, Huang, Q., and Mao, DaRu, Determination of Organic Acids in Root Exudates by High Performance Liquid Chromatography: 1. Development and assessment of chromatographic conditions, *Pedosphere* 1998, 8(2), p. 97-104). In addition, HPLC determination of organic acids using a RP-18 column, a mobile phase of water and acetonitrile at a flow rate of 1 ml/min, and a UV detector set at 265 nm was accomplished (Cunha, S. C., Fernandes, J. O., Faria, M. A., Ferreira, I. M. P. L. V. O., and Ferreira, M. A., Quantification of Organic Acids in Grape Musts and Port Wines, Cienc. Tecnol. Aliment 2002, 3(4), p. 212-216).

Similarly, to determine and separate the organic acids presented in the reaction samples, a reverse-phased HPLC with an ultraviolet (UV) detector at 214 nm on a μBondapak C-18 (300 mm×3.0 mm) column were applied. A mobile phase of 18 mmol/L $KH_2PO_4$ buffer solution adjusted to pH 2.25 with diluted $H_3PO_4$ at a flow rate of 0.3 ml/min was used.

First, to identify smaller organic acids formed in the samples, individual standard organic acid was injected into the HPLC system to obtain their retention time under the same HPLC operating conditions. The retention time measured for malic and succinic acid are at a range of 13.07 to 13.39 minutes and 22.84 to 23.90 minutes, respectively. Every component should only have a specific retention time under the same operating condition. However, a range of values was observed for most of the acids probably because of the inconsistency of the flow rate of the mobile phase.

Figure 5:
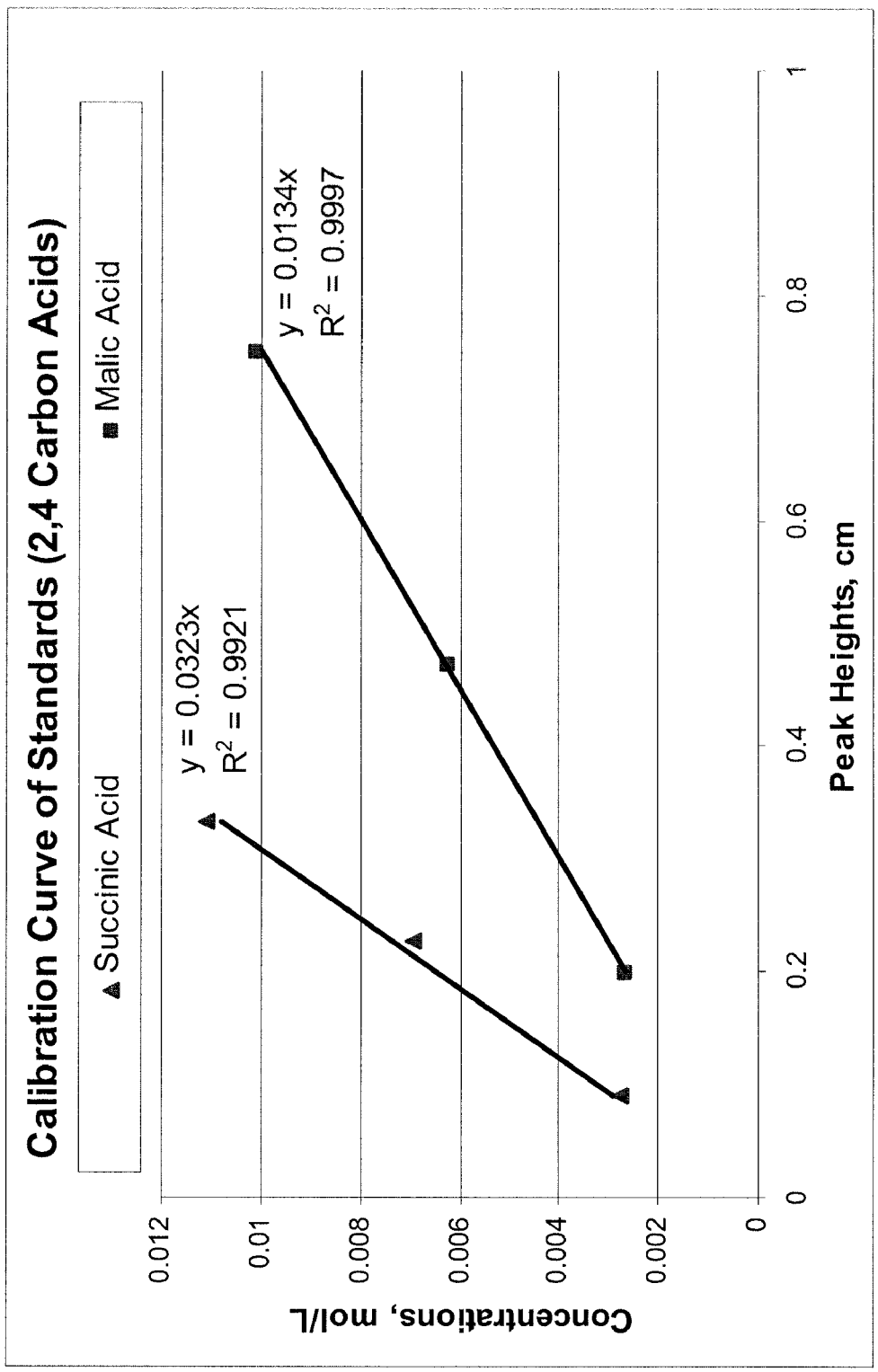
FIG. 5 is a calibration curve of malic acid and succinic acid concentrations (mol/L) versus peak height (cm) obtained by HPLC analysis.

Second, a quantitative measure of some potential organic acids formed in the reaction was then performed. FIG. 5 shows the calibration curves of smaller carbon acids including malic and succinic acid.

Degradation of Lactose to Organic Acids

Literature results have shown that a platinum alumina catalyst ($Pt/Al_2O_3$) is capable of converting glucose to organic acids, which are oxalic, tartaric, malic and succinic acids (Gallezot, Pierre, Selective Oxidation with Air on Metal Catalysts, *P. Catal. Today* 1997, 37, p. 405-418; Patrick, Trent A, and Abraham, Martin A, Evaluation of a Monolith-Supported $Pt/Al_2O_3$ Catalysts for Wet Oxidation of Carbohydrate-Containing Waste Streams, *Environment Science & Technology* 2000, 34, p. 3480-3488). Oxalic acid is a two carbon acid with structure HOOC—COOH and chemical formula of $C_2H_2O_4$. Tartaric, malic and succinic acids are four carbon acids with the chemical structure $HO_2C$—CH(OH)—CH(OH)—$CO_2H$, $HO_2C$—$CH_2$—CH(OH)—$CO_2H$, HOOC—$CH_2$—$CH_2$—COOH and chemical formula of $C_4H_6O_6$, $C_4H_6O_5$, and $C_4H_6O_4$, respectively. Although lactose might be expected to degrade similarly, this has not been shown in the literature. Therefore, the ability of $Pt/Al_2O_3$ to decompose lactose was investigated.

Literature results also suggest that a Mn/Ce composite oxide catalyst would be capable of further degrading the above organic acids to carbon dioxide and water if the organic acids formed were similar to those formed during glucose wet oxidation (Imamura, S., Nakamura, M., Kawabata, N., Yoshida, J. I., and Ishida, S., Wet Oxidation of Poly(ethylene glycol) Catalyzed by Manganese-Cerium Composite Oxide, *Industrial & Engineering Chemistry Product Research and Development* 1986, 25, p. 34-37; Imamura, S., Fukuda, I., Ishida S., Wet Oxidation Catalyzed by Ruthenium Supported on Cerium(IV) Oxides, *Industrial & Engineering Chemistry Research* 1988, 27, p. 718). Therefore, the ability of Mn/Ce catalyst to further degrade organic acids to carbon dioxide and water was investigated and analyzed.

Ideally, a combined system of the platinum and manganese cerium composite oxide catalyst would be preferred to direct conversion of lactose to carbon dioxide and water. Thus, the ability of Mn/Ce supported Pt catalyst for complete lactose degradation was investigated.

A description of the preparations of $Pt/Al_2O_3$ catalyst, Mn/Ce composite oxide catalyst, and Mn/Ce supported Pt catalyst is given. A discussion of results on these three individual catalysts is presented. Reaction rates and several design parameters such as flow and temperature effects were also determined and presented.

Experimental Methods To produce a 5% platinum (Pt) on $Al_2O_3$ catalyst, 0.5693 g of platinum(II) 2,4-pentanedionate was dissolved in 150 ml of toluene. 4.7645 g of aluminum oxide were added to the solution. Another 50 ml of toluene were added to rinse any solid off the round bottom flask edges. The solution was stirred for 2 hours and was pale yellow in color. The solution was then placed in a rotovap at 50% rotation, temperature maintained at 60° C. under vacuum. Once the solvent (toluene) was evaporated, the sample was dried overnight in an oven at 120° C., and calcined in flowing air at 250° C. for 6 hours. After drying and calcination, the catalyst was a grayish color and the net weight of the catalyst produced was 4.919 grams.

The Mn/Ce composite oxide catalyst was prepared by co-precipitation from a mixed aqueous solution of metal salts. In an Erlenmeyer flask, manganese(II) nitrate solution was first prepared by dissolving 23.3487 g of manganese(II) nitrate, $Mn(NO_3)_2$ in 247.5 ml of distilled water. The solution was stirred moderately until all solid dissolved. Then, 13.7808 g of cerium(III) chloride, $CeCl_3$, was added to the aqueous solution of manganese(II) nitrate. All solids dissolved fairly quickly forming a cloudy white (translucent) solution. Meanwhile, 3 M sodium hydroxide solution, NaOH, was prepared by dissolving 60.0024 g of sodium hydroxide in 500 ml of distilled water. The 3 M sodium hydroxide solution was now slowly added to the Mn/Ce solution forming a white and brown precipitate, which was then stirred moderately. About 300 ml of NaOH solution was added until no additional precipitate was formed. This solution was then filtered, washed, dried and calcined. The solution was filtered overnight using a Buchner funnel and aspirator. As filtering completed, all solids turned dark earthy brown. The resultant precipitate was then washed with five 500 ml volumes of distilled water and was dried in an oven at 100° C. overnight, followed by calcination at 350° C. in air for three hours. Finally, 13.565 g of catalyst was produced and crushed to a fine powder before use.

The Pt/Mn/Ce catalyst was synthesized using the Mn/Ce from the procedure just described. Platinum was impregnated on Mn/Ce composite oxide catalyst using an aqueous solution of platinum(II) 2,4-pentanedionate, $Pt(C_5H_7O_2)_2$. First, 3.6434 g of Mn/Ce and 0.3852 g of platinum(II) 2,4-pentanedionate, $Pt(C_5H_7O_2)_2$, was added to a round bottom flask. A volume of 165 ml toluene was then added to the flask and the solution was stirred moderately for about 2 hours. The solution was blackish in color after two hours stirring. The solution was placed in a rotovap at 50% rotation, 65° C. under vacuum. After drying overnight at 100° C. in an oven, the material was calcined at 250° C. for 6 hours. Finally, 3.496 g of catalyst was produced and it was slightly crushed and stored in a storage bottle for later use.

Results on $Pt/Al_2O_3$ Catalysts To achieve 100% conversion of lactose, several catalytic oxidation reactions using 4.27 g of $Pt/Al_2O_3$ catalysts were run under the conditions listed in Table 4.

TABLE 4

| Catalyst Used (4.27 g) | Feed Rate (ml/min) | Oxygen Supplied (L/min) | Temperature (° C.) | System Pressure (psig) |
|---|---|---|---|---|
| Run 1 | $Pt/Al_2O_3$ | 36–40 | 0.7397 | 100 | 85 |
| Run 2 | $Pt/Al_2O_3$ | 39–42 | 0.7397 | 150 | 85 |
| Run 3 | $Pt/Al_2O_3$ | 32–38 | 1.1777 | 150 | 85 |
| Run 4 | $Pt/Al_2O_3$ | 32–45 | 1.1777 | 150 | 85 |
| Run 5 | $Pt/Al_2O_3$ | 5–12 | 1.1777 | 150 | 85 |
| Run 6 | $Pt/Al_2O_3$ | 15–28 | 1.1777 | 170 | 100.2 |

First, two reactions were performed at constant feed rates in the range of 36-42 ml/min, a constant 0.74 ml/min pure oxygen supplied, a constant system pressure of 85 psig but different temperatures of 100° C. and 150° C. The initial concentration of feed solution was 0.08 mol/L for each run. A range of flow rate is given instead of a certain desired value for several reasons. First, the performances of the two pumps were inconsistent in that the inlet pressure as well as the amount of feed solution charged into the system were not constant throughout the run time. Second, the system pressure was so high that a minor pressure change strongly affected the flow rate. Third, different diameters and lengths of the piping result in the inability for pressure to quickly restabilize throughout the flow system.

Figure 6:
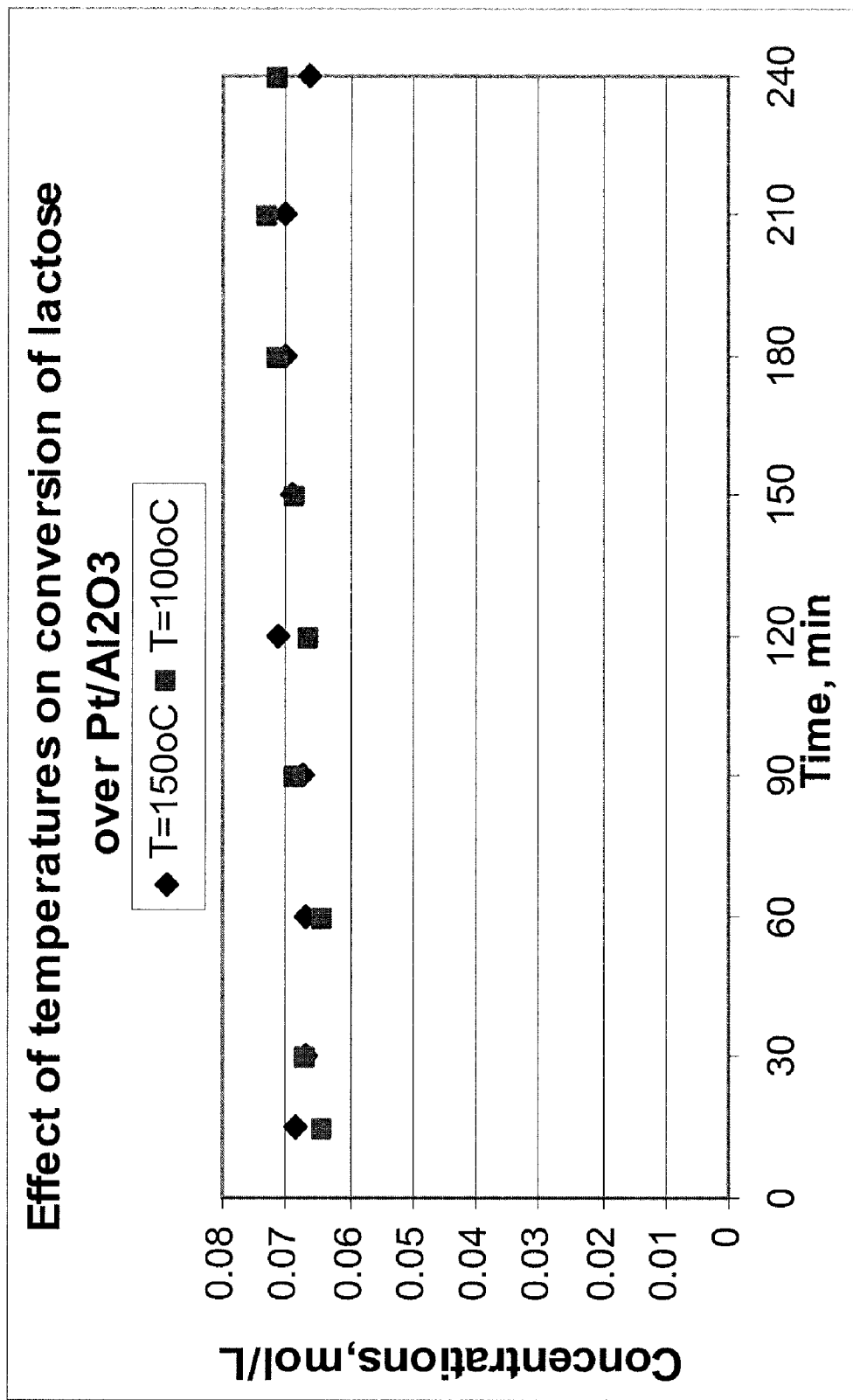
FIG. 6 is a plot of the concentration (mol/L) of lactose versus reaction time (min) for the conversion of lactose over a $Pt/Al_2O_3$ catalyst at 100° C. and 150° C. The initial concentration of lactose is 0.08 mol/L.

The effect of temperature on conversion of lactose over $Pt/Al_2O_3$ was first demonstrated. FIG. 6 shows the concentrations of lactose as a function of time at 100° C. and 150° C. Again, the initial concentration of lactose is 0.08 mol/L in each run.

Figure 7:
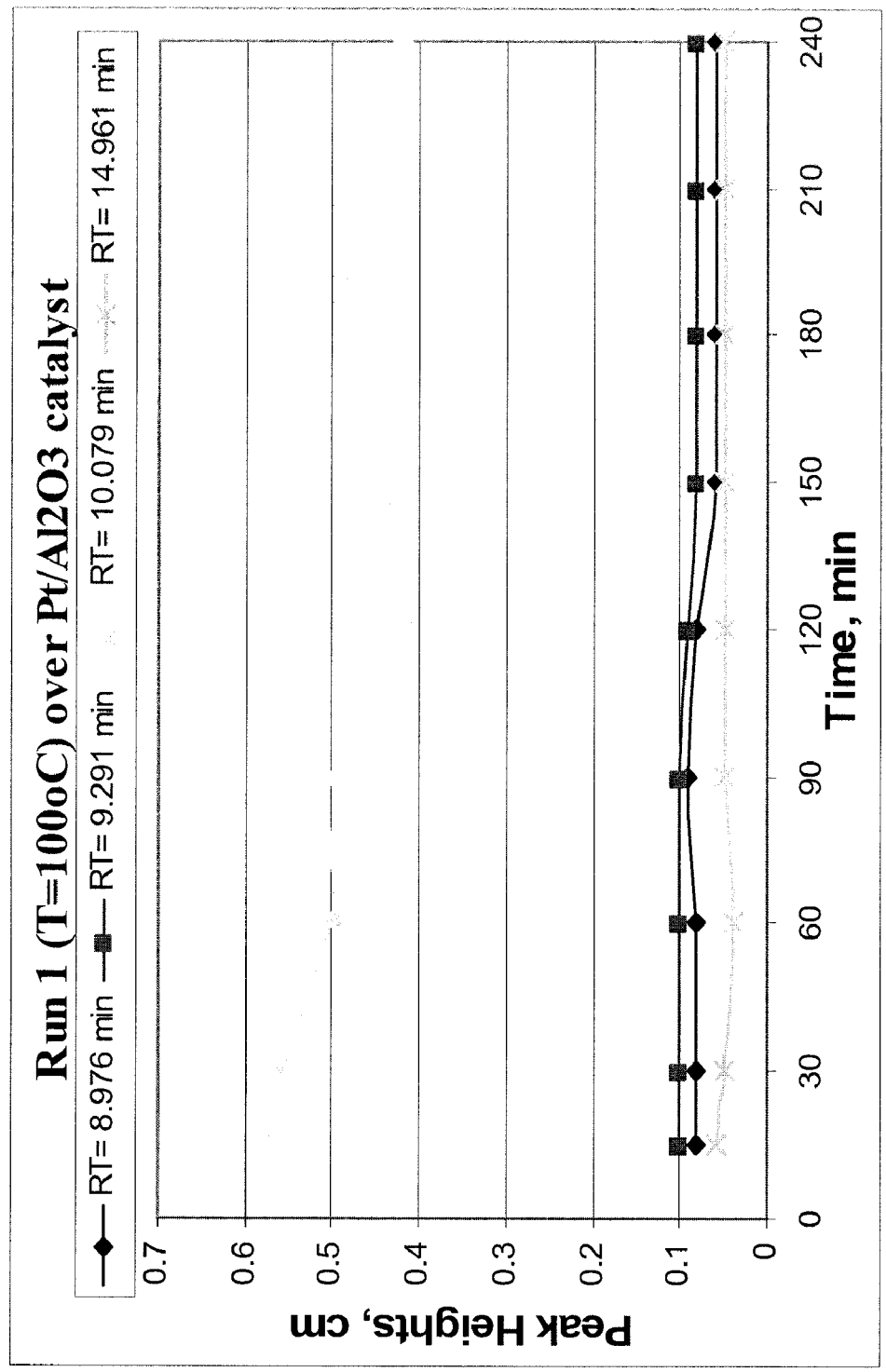
FIG. 7 is a chromatogram obtained from the conversion of lactose over a $Pt/Al_2O_3$ catalyst (T=100° C.; system pressure=85 psig; liquid feed rate=36-40 ml/min; and $O_2$ supply rate=0.7397 L/min).
Figure 8:
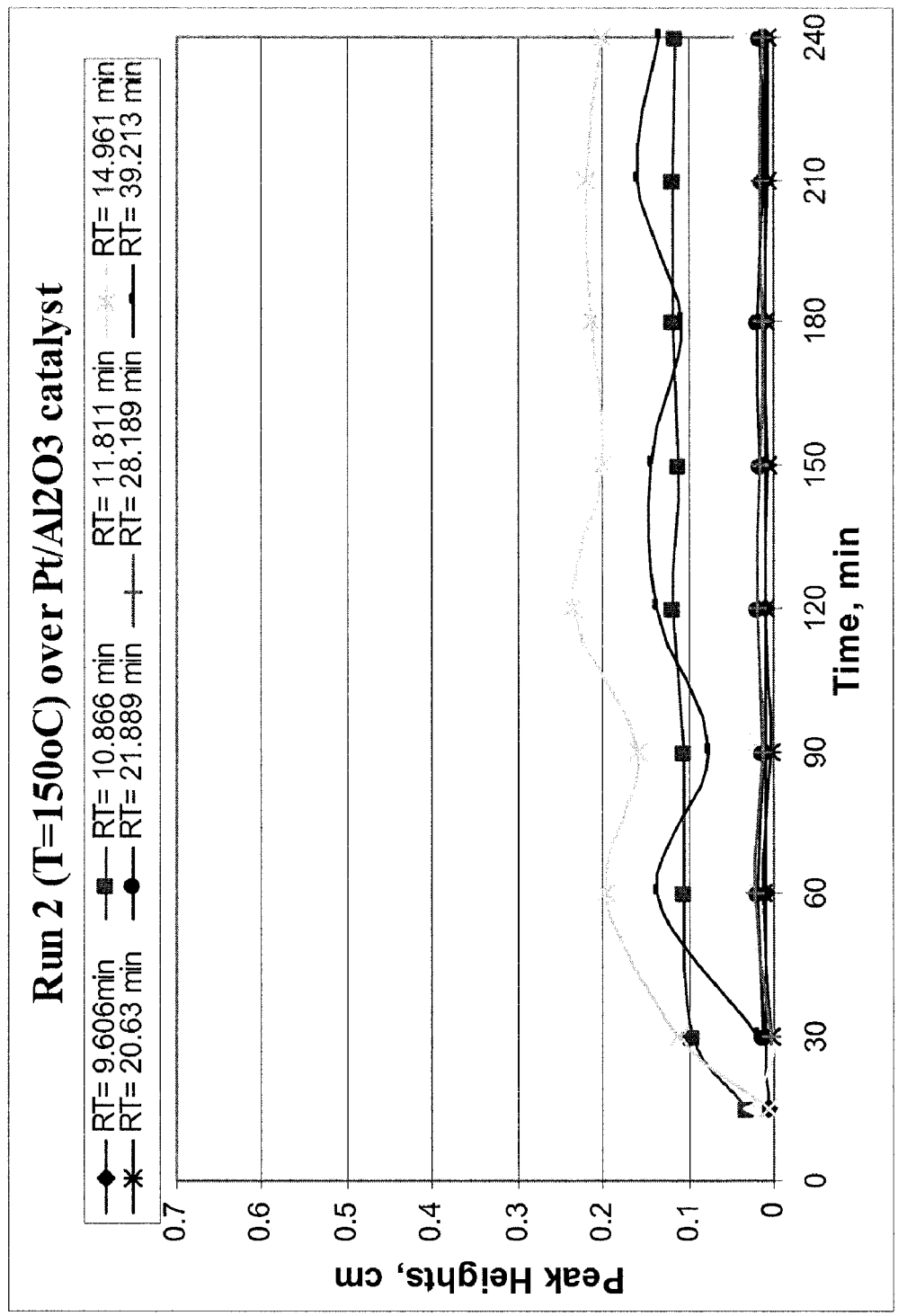
FIG. 8 is a chromatogram obtained from the conversion of lactose over a $Pt/Al_2O_3$ catalyst (T=150° C.; system pressure=85 psig; liquid feed rate=39-42 ml/min; and $O_2$ supply rate=0.7397 L/min).

As shown in FIG. 6, by varying the temperatures from 100 to 150° C., there was little change in the conversion of lactose. At steady state, the lactose conversion for Run 1 (T=100° C.) and Run 2 (T=150° C.) is about 10.0% and 12.9%, respectively. That gives less than 3% difference in lactose conversion. As temperature increased, more products with relatively smaller peak heights were formed in Run 2 than those in Run 1, as shown in FIGS. 7-8.

Figure 9:
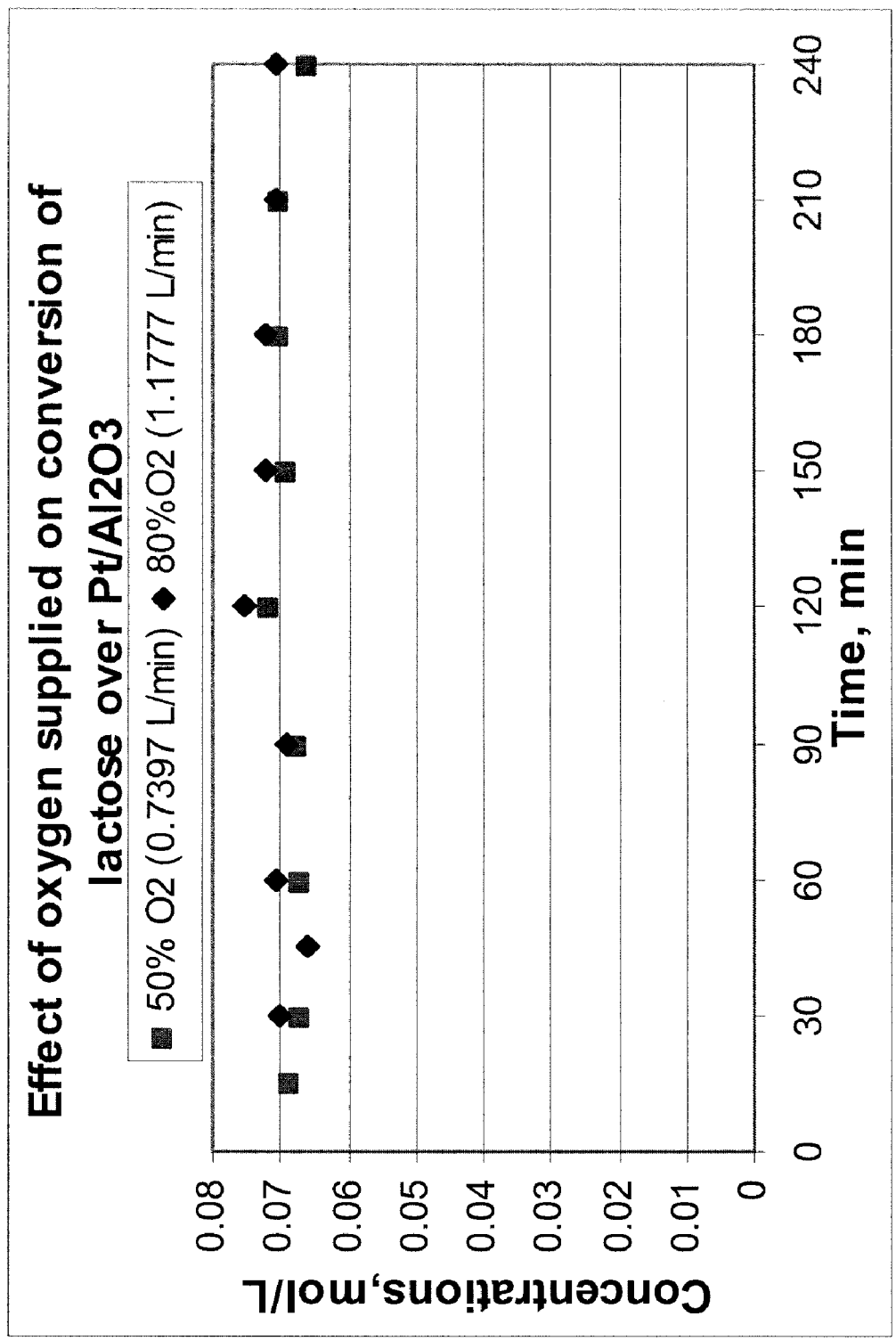
FIG. 9 is a plot of the concentration (mol/L) of lactose versus reaction time (min) for the conversion of lactose over a $Pt/Al_2O_3$ catalyst at $O_2$ flow rates of 0.74 L/min and 1.18 L/min.
Figure 10:
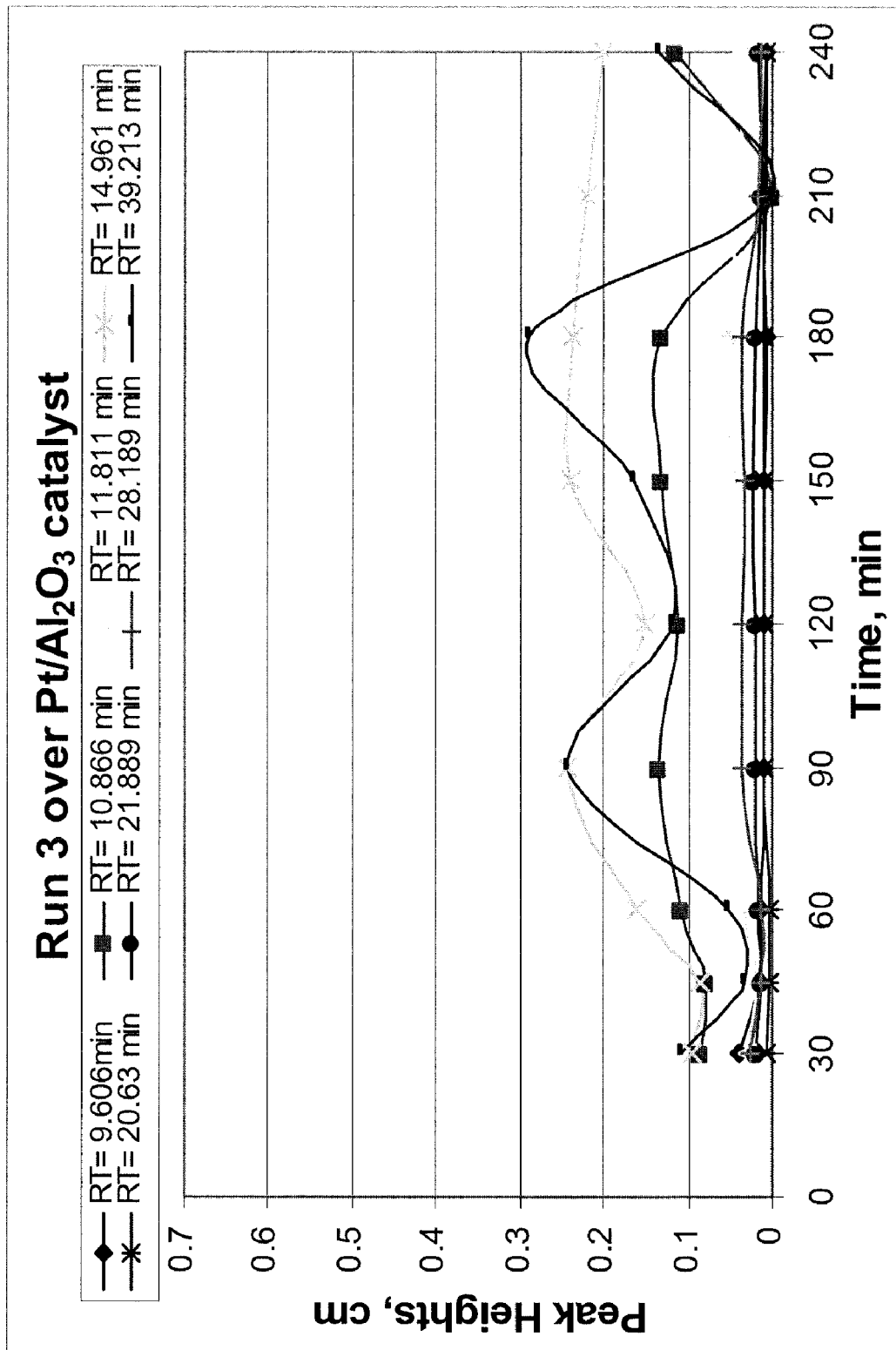
FIG. 10 is a chromatogram obtained from the conversion of lactose over a $Pt/Al_2O_3$ catalyst (T=150° C.; system pressure=85 psig; liquid feed rate=32-38 ml/min; and $O_2$ supply rate=1.1777 L/min).

Second, the effect of oxygen supplied to the reaction was investigated. FIG. 9 shows the results for different amounts of oxygen feed. From FIG. 9, the increase of oxygen flow did not have an effect on the conversion of lactose. At 150° C., the conversion of lactose on Run 3 with an oxygen flow of 1.18 L/min is about 12% at steady state, which is very close to the conversion in Run 2 with a lower oxygen flow of 0.7397 L/min. As shown in FIGS. 8 and 10, the products formed in Run 3 are exactly the same as those formed in Run 2 as the retention times are identical. Also, the peak heights for products formed in Run 3 with retention time of 14.961 minutes and 39.213 minutes, respectively, are slightly higher than those formed in Run 2. The rest of the peak heights remain almost unchanged as shown in FIGS. 8 and 10.

Figure 11:
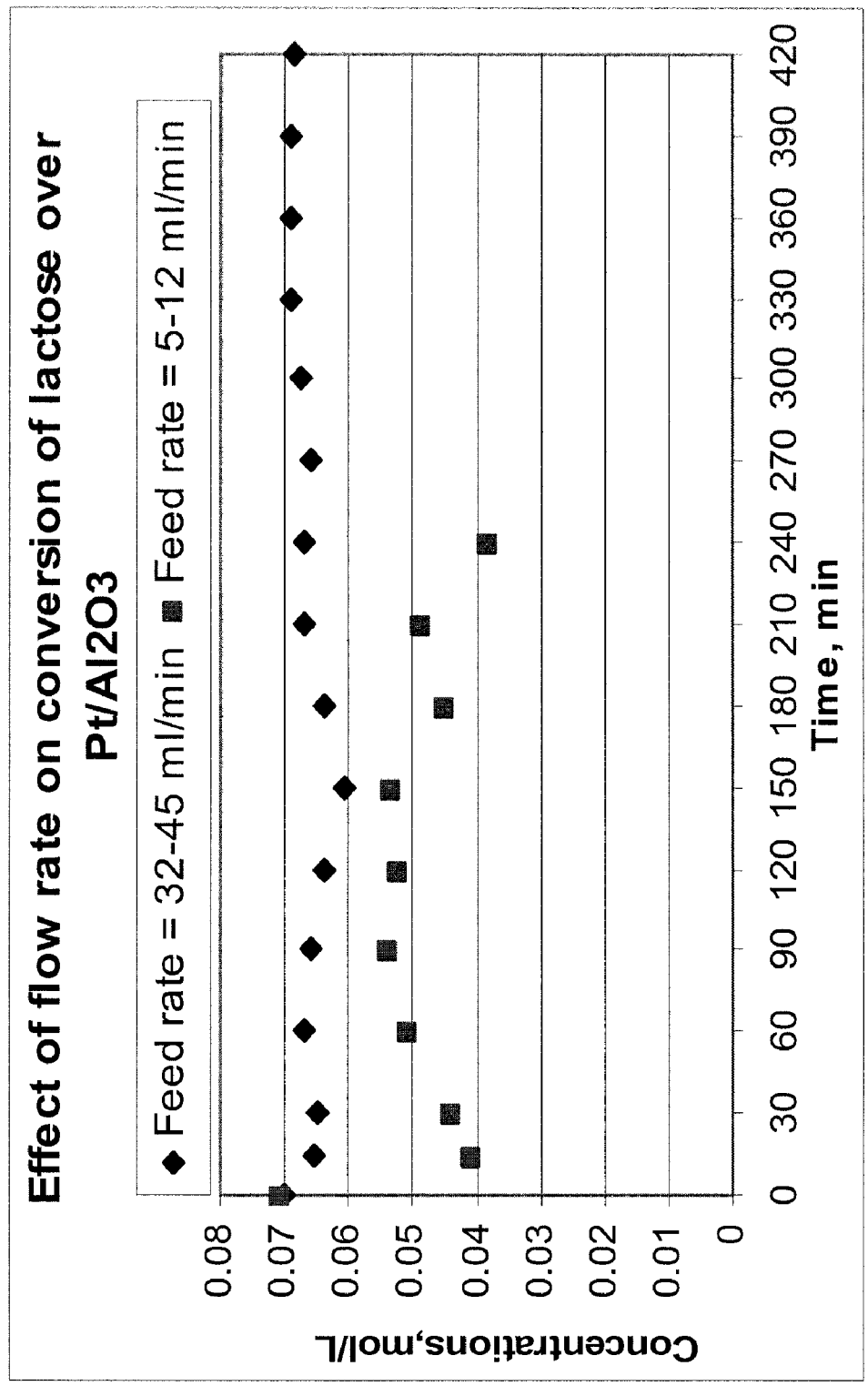
FIG. 11 is a plot of the concentration (mol/L) of lactose versus reaction time (min) for the conversion of lactose over a $Pt/Al_2O_3$ catalyst at feed rates of 32-45 ml/min and 5-12 ml/min.

Finally the effect of flow rate of lactose was then determined by performing two experiments both at the condition of a constant temperature of 150° C., a constant 1.18 L/min $O_2$ supplied, a system pressure of 85 psig and two different ranges of flow rate at 32-45 ml/min and 5-12 ml/min, respectively. FIG. 11 shows the concentrations of lactose over run time at different feed rates of lactose. As shown in FIG. 11, by decreasing the feed rate to a range of 5-12 ml/min, approximately 24% increase in lactose conversion was obtained from an average of 5% in Run 4 to 29% in Run 5 at steady state. While the conversion at an average feed rate of 7 ml/min in Run 4 is 5%, a conversion of 29% (approximately 6 times the conversion in Run 4) in Run 5 is observed at about one-sixth of the average flow rate in Run 4. This result demonstrates the consistency of the change in conversion with the feed rate.

Figure 12:
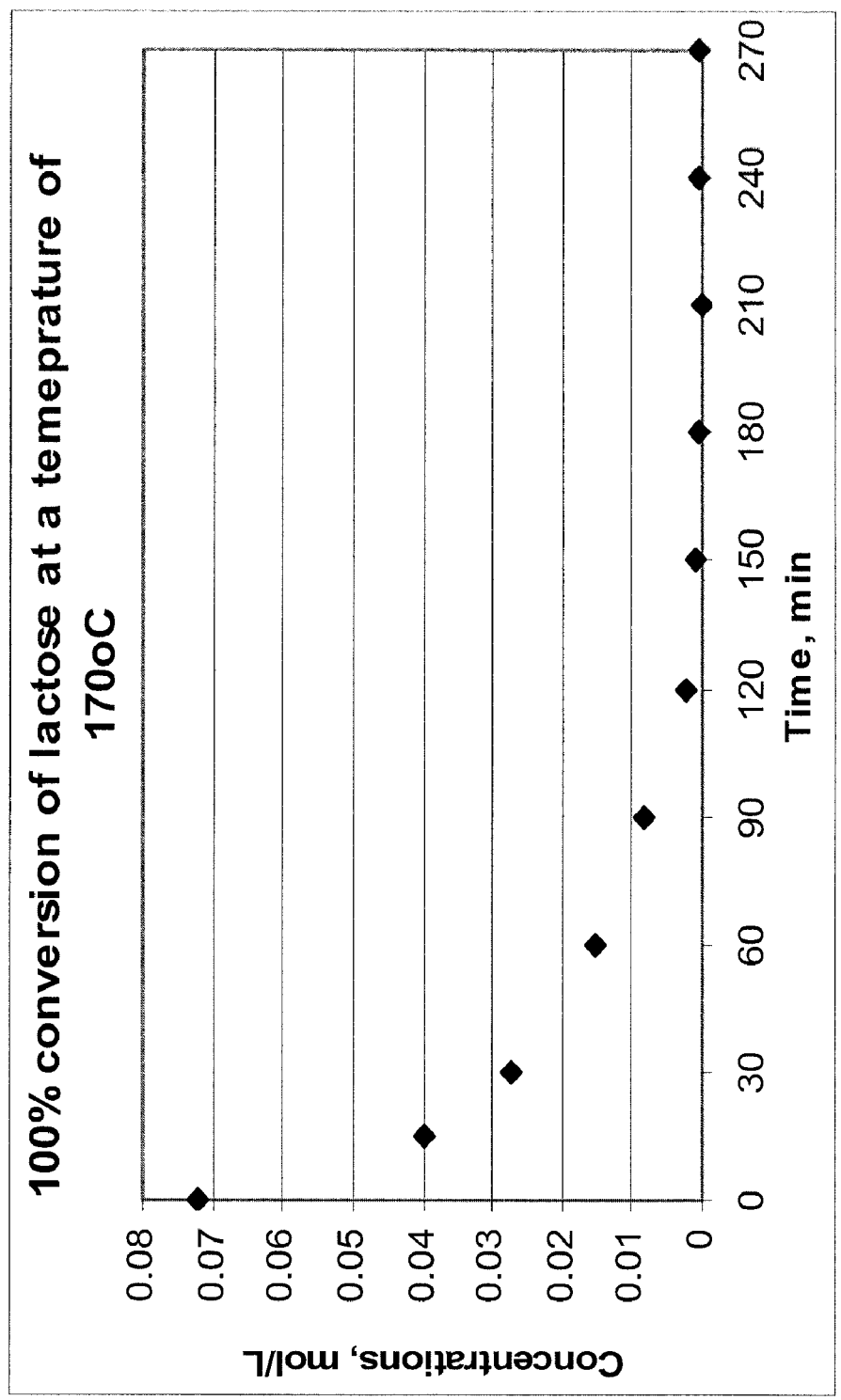
FIG. 12 is a plot of the concentration (mol/L) of lactose versus reaction time (min) for the conversion of lactose over a $Pt/Al_2O_3$ catalyst at 170° C.
Figure 13:
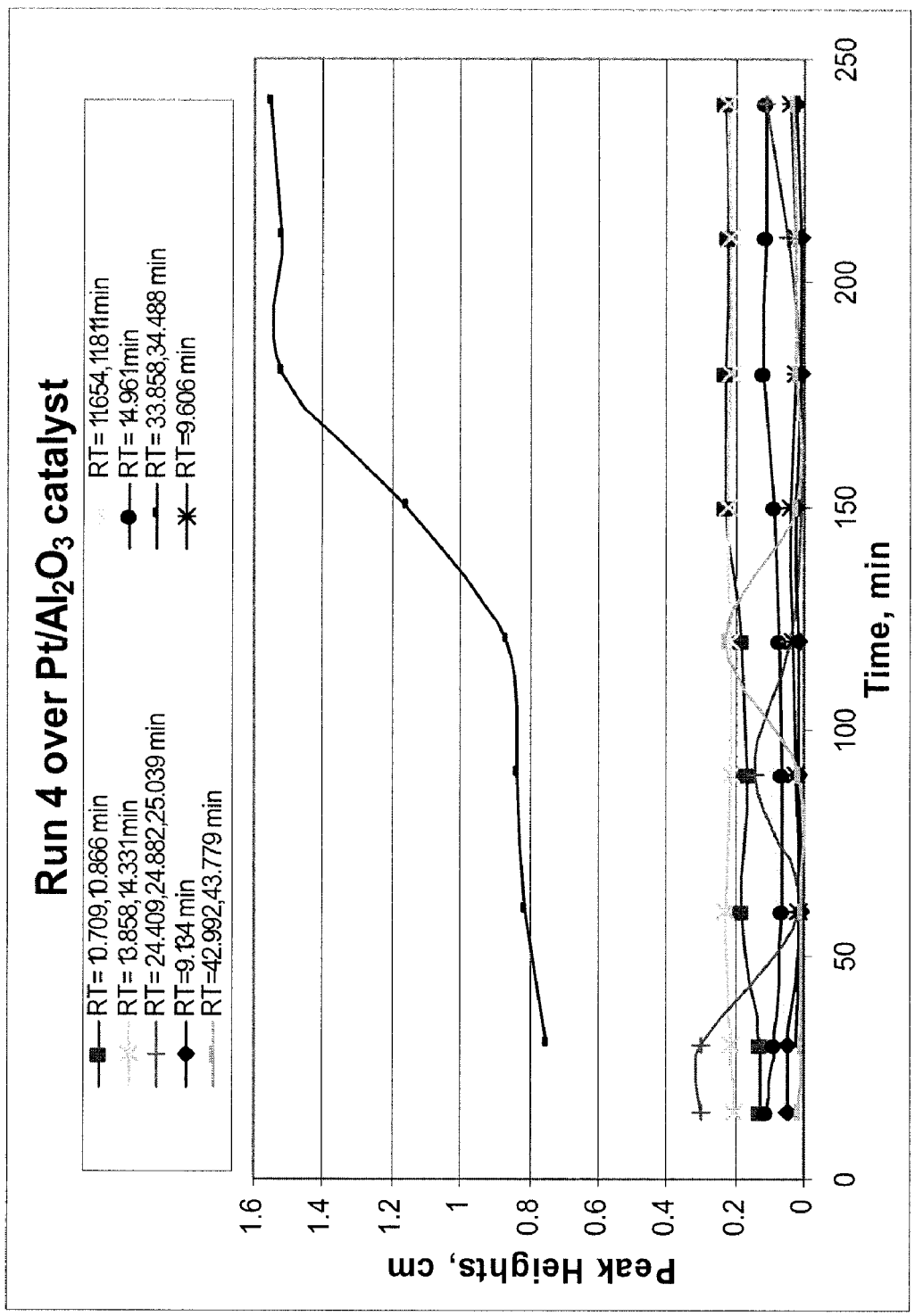
FIG. 13 is a chromatogram obtained from the conversion of lactose over a Pt $Al_2O_3$ catalyst (T=150° C.; system pressure 85 psig; liquid feed rate=32-45 ml/min; and $O_2$ supply rate 1.1777 L/min).
Figure 14:
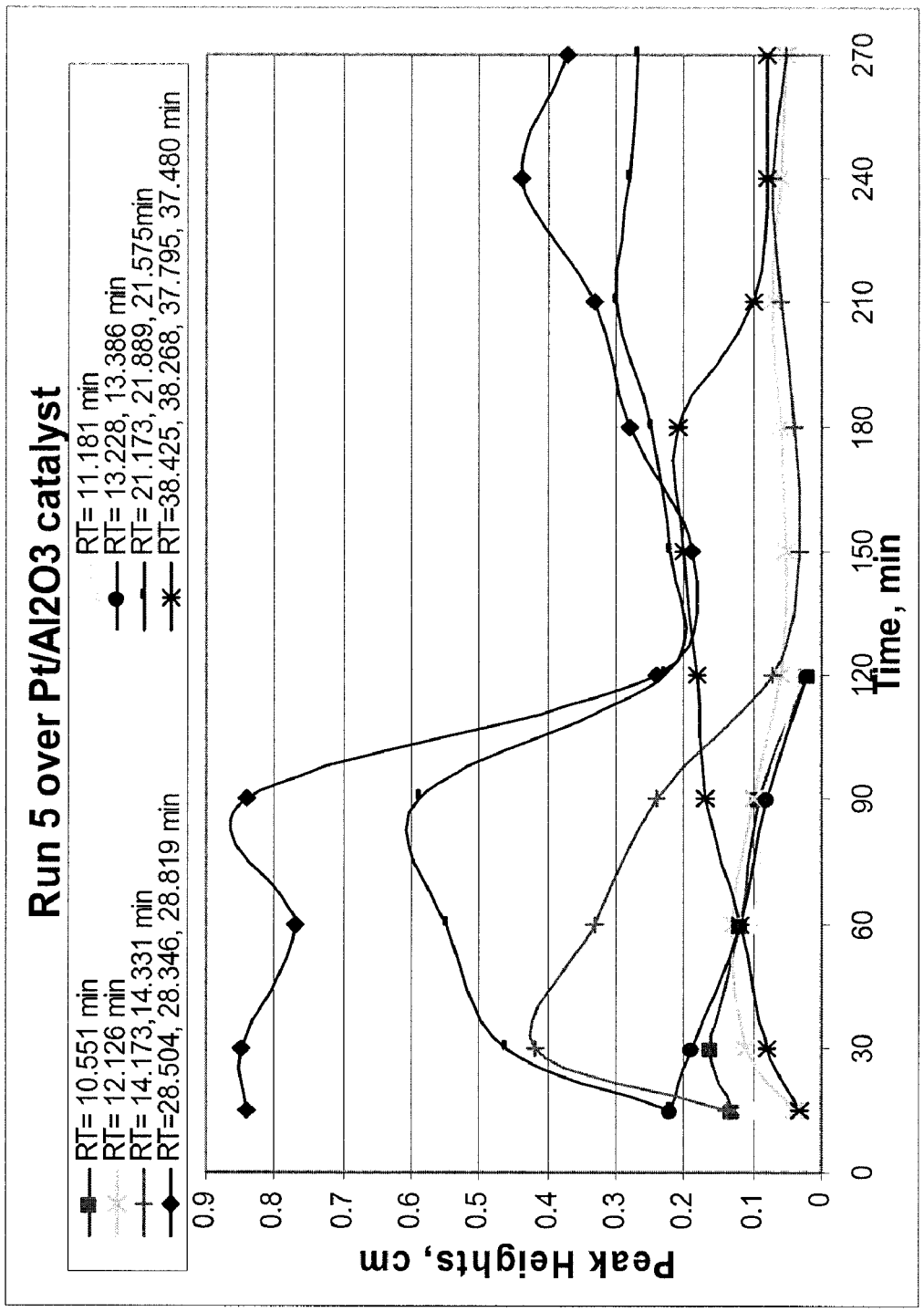
FIG. 14 is a chromatogram obtained from the conversion of lactose over a $Pt/Al_2O_3$ catalyst (T=150° C.; system pressure=85 psig; liquid feed rate=5-12 ml/min; and $O_2$ supply rate 1.1777 L/min).

Preliminary studies suggest that glucose conversion by all mechanisms, including hydrolysis, thermal oxidation, and catalytic oxidation over $Pt/Al_2O_3$ increased with increasing temperature (Patrick, Trent A, and Abraham, Martin A, Evaluation of a Monolith-Supported $Pt/Al_2O_3$ Catalysts for Wet Oxidation of Carbohydrate-Containing Waste Streams, *Environment Science & Technology* 2000, 34, p. 3480-3488). To further increase the conversion of lactose as much as possible, the temperature was then increased to 170° C. with the other design parameters unchanged. FIG. 12 indicates the conversion of lactose at experimental conditions of 170° C., system pressure of 100 psig, feed rate of 15-20 ml/min, and 1.18 L/min oxygen supplied. From this data we see that under these conditions, conversion of lactose was nearly 100% under steady state conditions. In addition, approximately 150 minutes was required for the reaction to reach steady state. The chromatogram results of products formed in Run 4 with a range of flow rate at 32-45 ml/min is shown in FIG. 13. The peak heights of almost all products are less than 0.3 cm except the one with retention time of about 34 minutes. The overall peak heights of products formed in Run 5 with a range of flow rate at 5-12 ml/min is relatively higher than those in FIG. 13 for Run 4, as shown in FIG. 14.

Also, to determine any potential side products, for instance, organic acids, each sample was injected into an HPLC with an ultraviolet (UV) detector. The chart recorder connected with the detector provides the peak heights of any side products present in the sample and since the peak heights were directly proportional to the concentrations, it was able to roughly determine the amount of side products presented.

Figure 15:
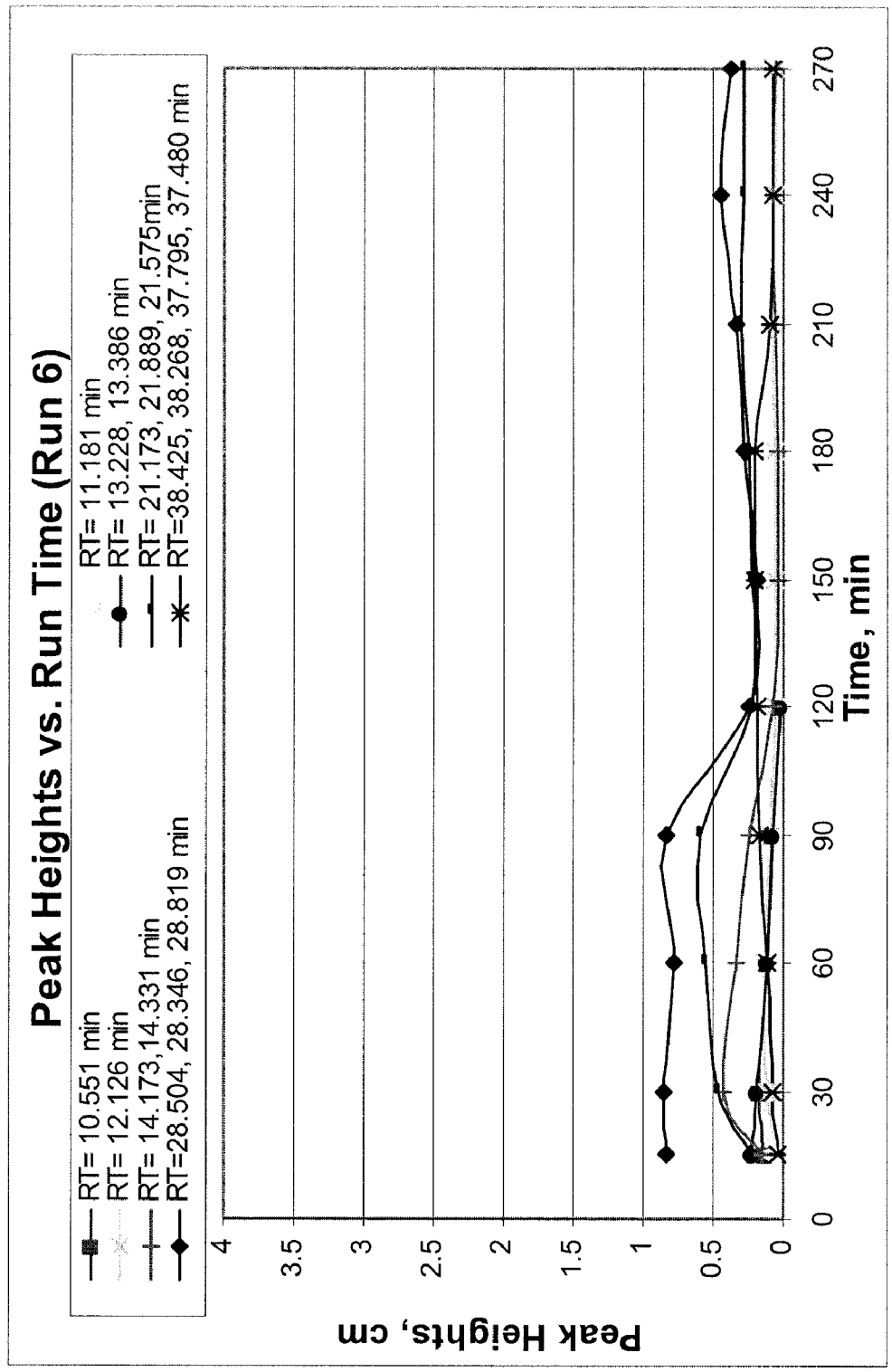
FIG. 15 is a chromatogram obtained from the conversion of lactose over a $Pt/Al_2O_3$ catalyst (T=170° C.; system pressure=100.2 psig; liquid feed rate=15-28 ml/min; and $O_2$ supply rate=1.1777 L/min).

FIG. 15 shows the peak heights at several different retention times in which each peak represents a specific product presented in the samples. Note that from FIG. 14, all the peak heights at 120 minutes decreased to the same low level which was when 100% conversion of lactose was first achieved as shown in FIG. 12. In addition, the HPLC with either RI or UV detector will only detect organic molecules. Complete conversion products such as $CO_2$ are not detected.

In FIG. 15, according to the retention time (RT) of each component with a given peak height, it is possible to identify some of the components present in the samples and quantify them. The component with retention time of 13.386 minutes was identified as malic acid, a four carbon organic acid. The concentration of acid at a single time can then be determined using the equation shown in FIG. 5. The concentration of malic acid at 120 minutes is $2.68 \times 10^{-4}$ mol/L. This steady state concentration is about 0.3% of the initial concentration of lactose of 0.08 mol/L. Due to the large number and low heights of the other peaks, attempts to quantify other species were not attempted. However, assuming response factors similar to malic acid indicates that the total organic acid concentration was only a few percent of the original lactose concentration.

In conclusion, from FIG. 11, the lower the feed rate the higher the conversion of lactose in a flow system. As shown in FIG. 12, a nearly 100% conversion of lactose was achieved by increasing the temperature from 150 to 170° C. Literature results indicate the conversion of glucose by catalytic oxidation over $Pt/Al_2O_3$, increased with increasing temperature (Patrick, Trent A., and Abraham, Martin A., Evaluation of a Monolith-Supported $Pt/Al_2O_3$ Catalysts for Wet Oxidation of Carbohydrate-Containing Waste Streams, *Environment Science & Technology* 2000, 34, p. 3480-3488). Therefore, similar to glucose, the higher the temperature of the reaction, the higher the conversion of lactose in the flow reactor.

A recent review of wet air oxidation of carbohydrate-containing waste streams reveals that glucose conversion is significantly increased in the presence of platinum catalyst at 160° C. (Patrick, Trent A, and Abraham, Martin A, Evaluation of a Monolith-Supported $Pt/Al_2O_3$ Catalysts for Wet Oxidation of Carbohydrate-Containing Waste Streams, *Environment Science & Technology* 2000, 34, p. 3480-3488). A large array of organic acids is produced, including oxalic, malic, lactic, succinic and acetic acids. Therefore, lactose is expected to degrade to smaller organic acids in a manner similar to glucose in the oxidation reaction over $Pt/Al_2O_3$ catalyst at 170° C. because lactose and glucose are both sugars with similar structures.

In addition, as shown in FIG. 15 for Run 6, there are eight products present in the samples, and the peak heights shown in FIG. 15 demonstrate that low amounts of each product were produced in the reaction, even with a nearly 100% conversion of lactose achieved at steady state, as shown in FIG. 12. This indicates a possibility of further degradation of carbon acids to other products, for instance, $CO/CO_2$ and water at a temperature of 170° C.

For a temperature of 162° C. and feed rate of 27.8 ml/min, literature results show about 85% glucose conversion was obtained over $Pt/Al_2O_3$ catalyst in a flow system (Patrick, Trent A., and Abraham, Martin A., Evaluation of a Monolith-Supported $Pt/Al_2O_3$ Catalysts for Wet Oxidation of Carbohydrate-Containing Waste Streams, *Environment Science & Technology* 2000, 34, p. 3480-3488). With an average value of 0.997 g of C product/initial g of glucose and a standard deviation of 0.037, this suggests that all the major products of catalytic oxidation have been identified and most of them are 2 and 4 carbon acids. Obviously, for glucose it can be decomposed to 2 and 4 carbon acids in the presence of Pt. For lactose, when a temperature for decomposition is attained, this temperature is possibly high enough to immediately further degrade 2 and 4 carbon acids to $CO/CO_2$ and water.

Gallezot indicates that at low oxidation temperatures, there is little or no C—C bond breaking of organic molecules on metal catalysts (Gallezot, Pierre, Selective Oxidation with Air on Metal Catalysts, *P. Catal. Today* 1997, 37, p. 405-418). However, as a basis of catalytic wet oxidation for the treatment of organic effluents in water, at higher temperatures, molecules can be increasingly oxidized and ultimately converted to $CO_2$ on platinum catalysts. For instance, from his previous studies, maleic acid was totally converted into $CO_2$ at 130° C. in the presence of platinum (Gallezot, P., Laurain N., and Isnard, P., *Appl. Catal. B* 1996, 9, L11). Thus, the organic molecule, lactose, is most possibly being converted to $CO_2$ and water at a high temperature of 170° C. since a relatively low amount of other products was produced at high conversion.

Results on Mn/Ce Catalysts Since positive results were obtained for conversion of lactose over $Pt/Al_2O_3$ catalyst, the reactions over Mn/Ce catalyst were performed at the same temperature of 170° C. and system pressure of 100 psig. Table 5 indicates the reaction conditions of three different sets of experiments over 4.50 g of Mn/Ce catalysts. The effect of oxygen supplied (1.18 L/min and 1.44 L/min) in Run 1, 2 and the effect of feed rate (15-20 ml/min, 21-35 ml/min) in Run 2, 3 were also investigated and shown in FIG. 16.

TABLE 5

|  | Run 1 | Run 2 | Run 3 |
| --- | --- | --- | --- |
| Catalysts used (4.50 g) | Mn/Ce | Mn/Ce | Mn/Ce |
| Temperature | 170° C. | 170° C. | 170° C. |
| Back Pressure | 99.8–100.9 psig | 98.1–100.7 psig | 99.0–100.3 psig |
| $O_2$ Supplied | 1.18 L/min | 1.18 L/min | 1.44 L/min |
| Feed Rate | 15–21 ml/min | 13–22 ml/min | 21–31 ml/min |

The steady state conversions (greater than 120 min) of lactose from Run 1 and Run 2 were similar as expected since the reaction conditions were also similar. Run 2 demonstrated a long term steady state conversion of about 90%. The data from Run 3 indicates a nearly 100% conversion of lactose when the oxygen flow rate was increased from 1.18 L/min to 1.44 L/min. Also, the addition of increased oxygen flow increased the conversion from 90% in Run 2 to 100% in Run 3. It has another effect on selectivity as shown next.

Figure 17:
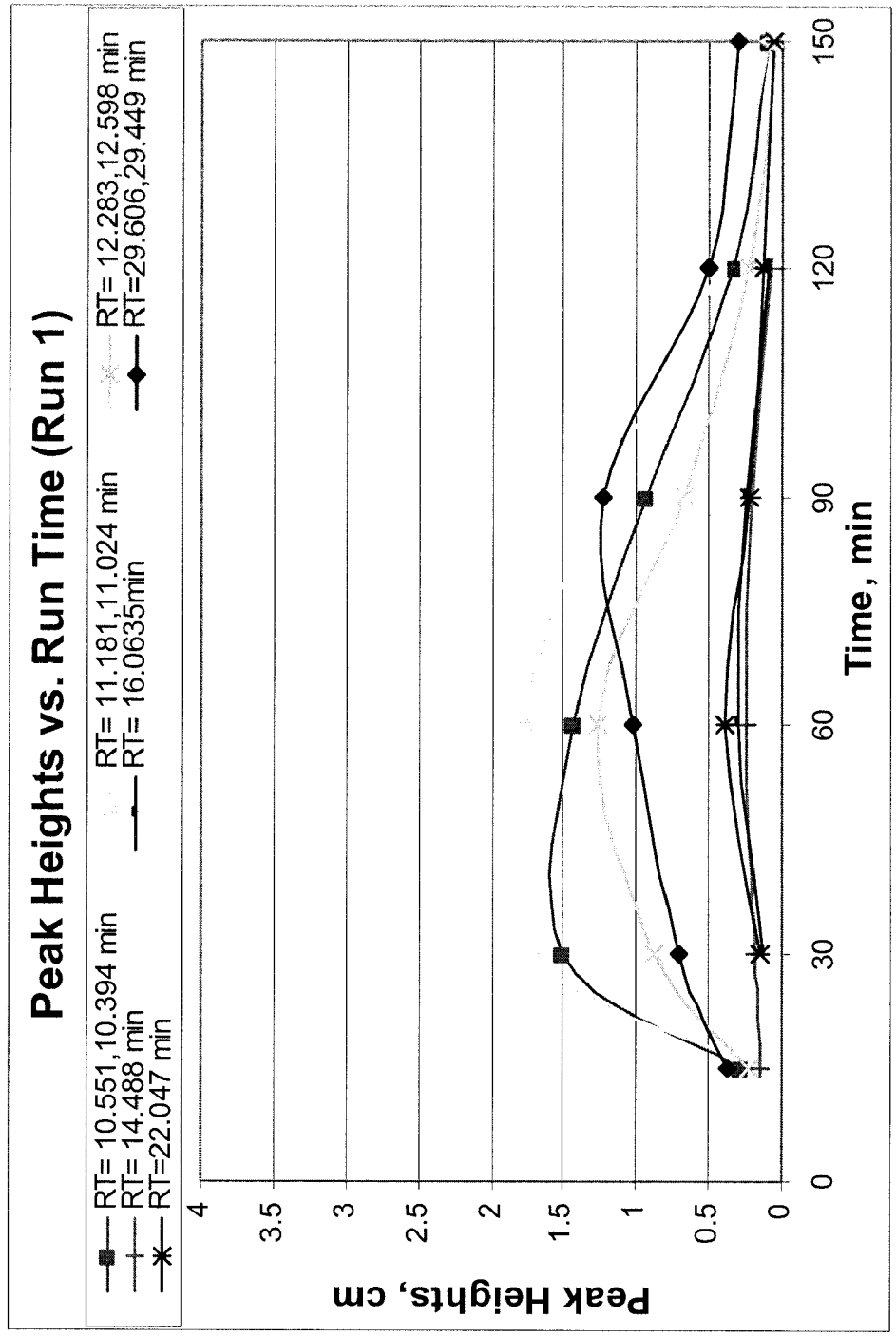
FIG. 17 is a chromatogram obtained from the conversion of lactose over a Mn/Ce catalyst (T=170° C.; back pressure=99.8-100.9 psig; liquid feed rate=15-21 ml/min; and $O_2$ supply rate=1.18 L/min).
Figure 18:
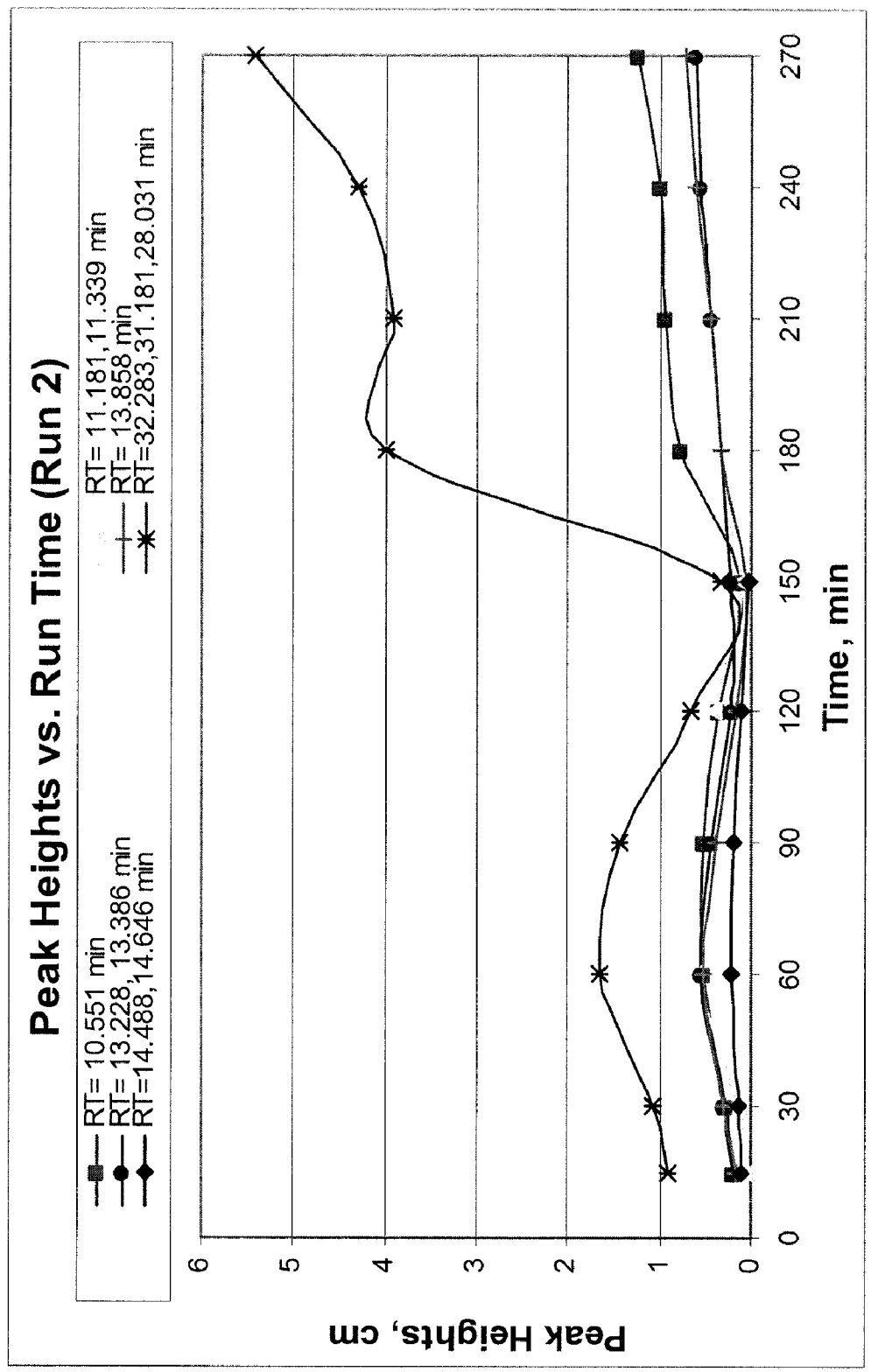
FIG. 18 is a chromatogram obtained from the conversion of lactose over a Mn/Ce catalyst (T=170° C.; back pressure=98.1-100.7 psig; liquid feed rate=13-22 ml/min; and $O_2$ supply rate=1.18 L/min).
Figure 19:
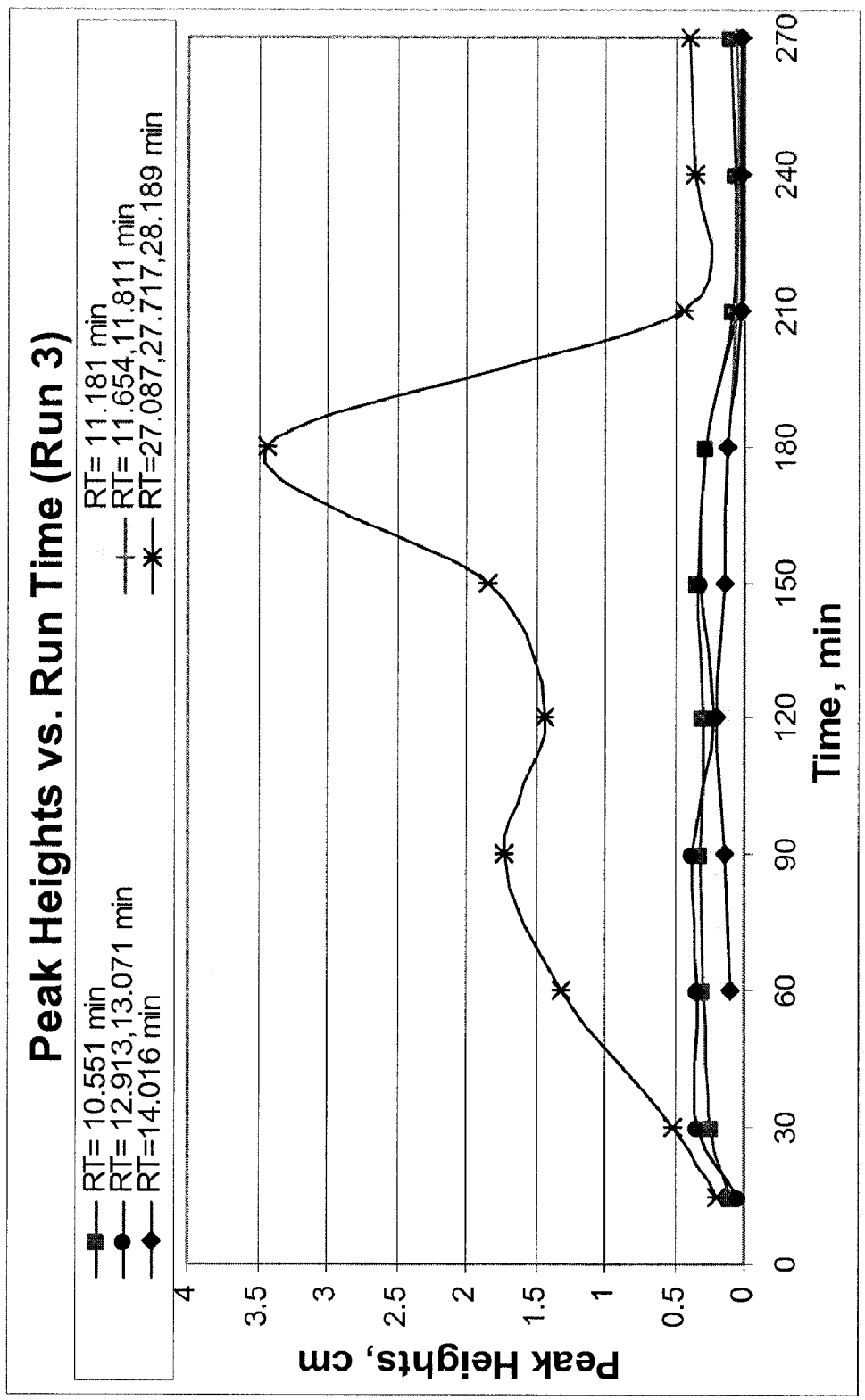
FIG. 19 is a chromatogram obtained from the conversion of lactose over a Mn/Ce catalyst (T=170° C.; back pressure=99.0-100.3 psig; liquid feed rate=21-31 ml/min; and $O_2$ supply rate=1.44 L/min).

To determine any potential side products presented in the samples, chromatogram results for Run 1, 2 and 3 were presented in FIGS. 17, 18 and 19.

Literature results suggest that Mn/Ce composite oxide catalyst would be capable of further degrading the small organic acids to $CO_2$ if only two and four carbon acids were formed, similar to glucose (Imamura, S., Nakamura, M., Kawabata, N., Yoshida, J. I., and Ishida, S., Wet Oxidation of Poly(ethylene glycol) Catalyzed by Manganese-Cerium Composite Oxide, *Industrial & Engineering Chemistry Product Research and Development* 1986, 25, p. 34-37; Imamura, S., Fukuda, I., Ishida S., Wet Oxidation Catalyzed by Ruthenium Supported on Cerium(IV) Oxides, *Industrial & Engineering Chemistry Research* 1988, 27, p. 718). From FIG. 19, malic acid was identified as one of the products formed in Run 3 with a retention time at a range of 12.9 to 13.07 minutes. The concentration of acid was $4.29 \times 10^{-3}$ mol/L at 150 minutes and decreased to about $4.02 \times 10^{-4}$ mol/L at steady state condition, which is about 0.5% of the initial concentration of lactose (0.08 mol/L). Therefore, at steady state, the concentrations of other products with similar peak heights are comparable with that of malic acid. Overall, all the products formed in Run 3 are low in concentration. Due to the large number and low heights of the other peaks, attempts to quantify other species were not attempted. However, assuming response factor similar to malic acid indicates that the total organic acid concentration was only a few percent of the original lactose concentration.

From the three plots shown above for Run 1, 2, and 3, it is obvious that with only 1.18 L/min oxygen supplied in Run 1 and Run 2, the peak heights shown in FIGS. 17 and 18 were larger than that in FIG. 19 where 1.44 L/min oxygen was supplied in Run 3. As discussed above, the exact oxygen flow needed for complete conversion was calculated as a range of 0.442 to 0.631 L/min, 0.379 to 0.663 L/min, and 0.631 to 0.947 L/min for a range of flow rates of 15 to 21 ml/min, 13 to 22 ml/min, and 21-31 ml/min in Run 1, 2, and 3, respectively. Excess oxygen was supplied to all three runs. In addition, as shown in FIG. 19, there was a larger peak at a range of retention time of 27-28 minutes. Although this peak is large at 180 minutes, it decreased dramatically by 210 min. Note that from FIG. 15, this is when conversion of lactose was 100%.

Unexpectedly, Mn/Ce was capable of decomposing lactose almost as well as Pt/Al$_2$O$_3$. In addition, when compared to FIG. 15, the Mn/Ce decomposed more of the acid side products than Pt/Al$_2$O$_3$ catalyst. This was expected based on the previous literature (Imamura, S., Nakamura, M., Kawabata, N., Yoshida, J. I., and Ishida, S., Wet Oxidation of Poly(ethylene glycol) Catalyzed by Manganese-Cerium Composite Oxide, *Industrial & Engineering Chemistry Product Research and Development* 1986, 25, p. 34-37; Imamura, S., Fukuda, I., Ishida S., Wet Oxidation Catalyzed by Ruthenium Supported on Cerium(IV) Oxides, *Industrial & Engineering Chemistry Research* 1988, 27, p. 718). Literature reviews indicate that low molecular weight carboxylic acids in general and acetic acid in particular are quite resistant to wet oxidation (Imamura, S., Nakamura, M., Kawabata, N., Yoshida, J. I., and Ishida, S., Wet Oxidation of Poly(ethylene glycol) Catalyzed by Manganese-Cerium Composite Oxide, *Industrial & Engineering Chemistry Product Research and Development* 1986, 25, p. 34-37; Imamura, S., Catalytic and Noncatalytic Wet Oxidation, *Ind. Eng. Chem. Res.* 1999, 38, p. 1743-1753; Mishra, Vedprakash S., Mahajani, Vijaykumar V., and Joshi, Jyeshtharaj B., Wet Air Oxidation, *Ind. Eng. Chem. Res.* 1995, 34, p. 2-48). However, Imamura revealed that Mn/Ce composite oxide has remarkable activity even in decomposing ammonia and the use of Mn/Ce (1:1) catalyst resulted in complete removal of acetic acid at 200° C. He also indicated that in contrast to Co/Bi catalyst, Mn/Ce catalyst is highly active irrespective of the kind of reactant to be oxidized, which suggests that the catalyst is effective for the treatment of practical wastewaters containing various organic compounds. According to Imamura, the effect of cerium was to produce manganese species with lower valence states (Mn$^{3+}$, Mn$^{2+}$) at the interface of the two oxides, and the combination of Mn$^{4+}$ with Mn$^{3+}$ or Mn$^{2+}$ was assumed to be the cause of the high activity of the catalyst.

Figure 20:
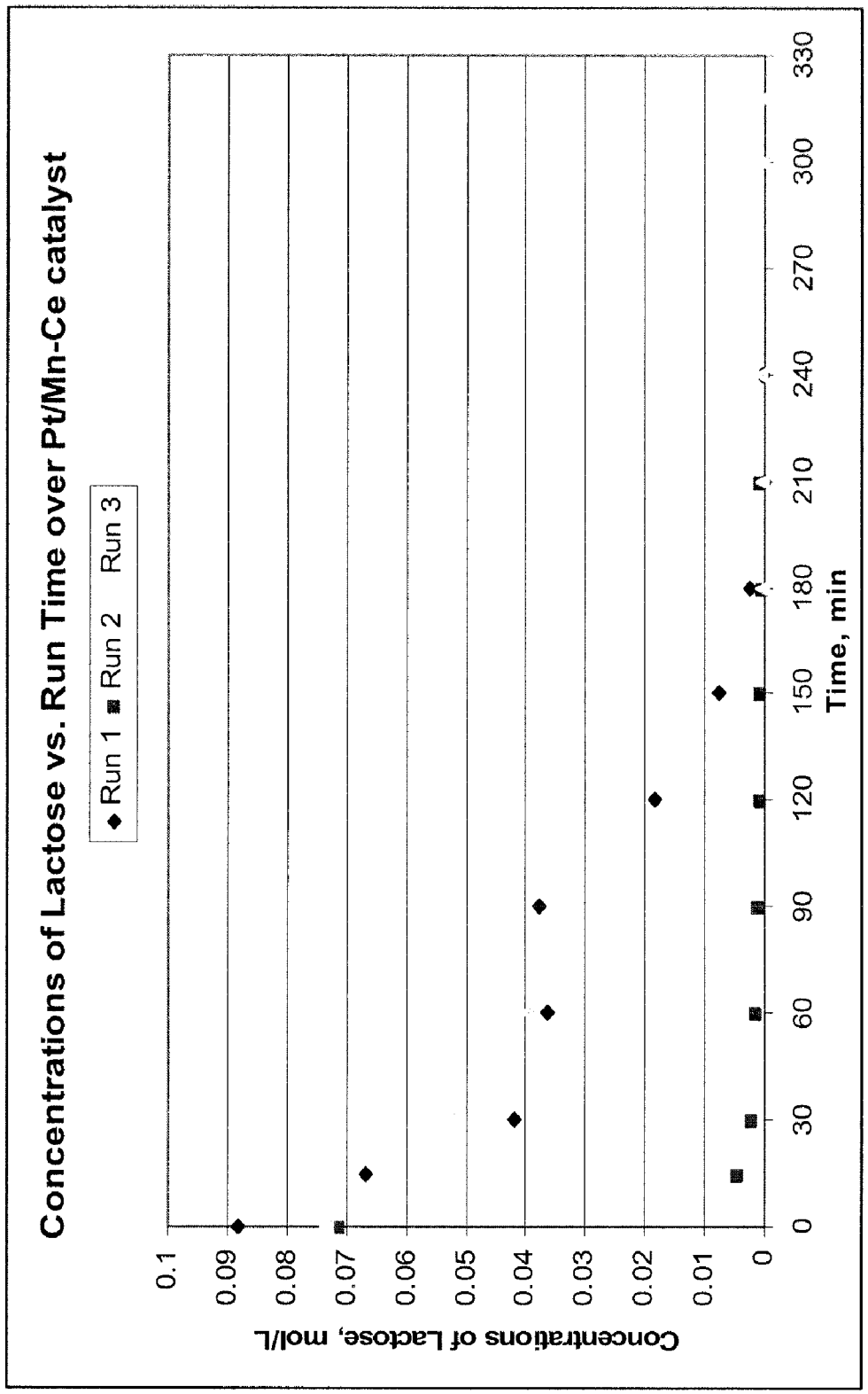
FIG. 20 is a plot of the concentration (mol/L) of lactose versus reaction time (min) for the conversion of lactose over a Pt/Mn—Ce catalyst at 170° C. and feed rates 20-25 ml/min (Run 1), 26-31 ml/min (Run 2) and 20-25 ml/min (Run 3).

Results on Pt/Mn—Ce Catalysts The ability of a Mn/Ce supported Pt catalysts was investigated for the direct conversion of lactose to carbon dioxide/carbon monoxide. Based on previous literature results, it was postulated that this bifunctional catalyst might be required for complete degradation of lactose to CO$_2$ and H$_2$O. To achieve the highest conversion of lactose, experiments were performed under three different conditions, as shown in Table 6. FIG. 20 shows the concentrations of lactose over run time at three different reaction conditions.

TABLE 6

|  | Run 1 | Run 2 | Run 3 |
| --- | --- | --- | --- |
| Catalysts used (3.29 g) | Pt/Mn—Ce | Pt/Mn—Ce | Pt/Mn—Ce |
| Temperature | 170° C. | 170° C. | 170° C. |
| Back Pressure | 99.9–100.7 psig | 98.8–99.3 psig | 99.9–99.4 psig |
| O$_2$ Supplied | 1.18 L/min | 1.18 L/min | 1.44 L/min |
| Feed Rate | 20–25 ml/min | 26–31 ml/min | 20–25 ml/min |

Figure 21:
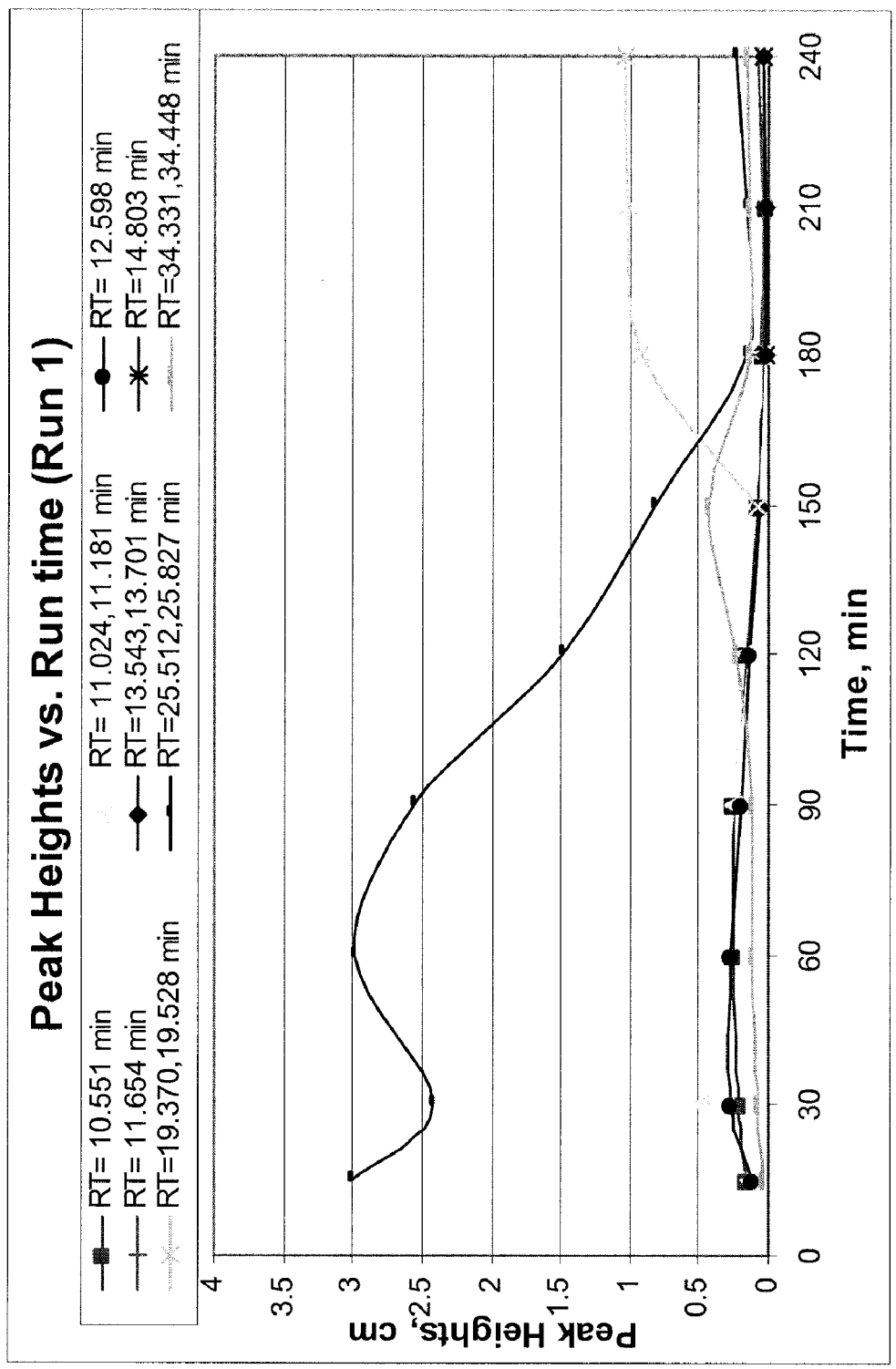
FIG. 21 is a chromatogram obtained from the conversion of lactose over a Pt/Mn—Ce catalyst (T=170° C.; back pressure=99.9-100.7 psig; liquid feed rate=20-25 ml/min; and $O_2$ supply rate=1.18 L/min).
Figure 22:
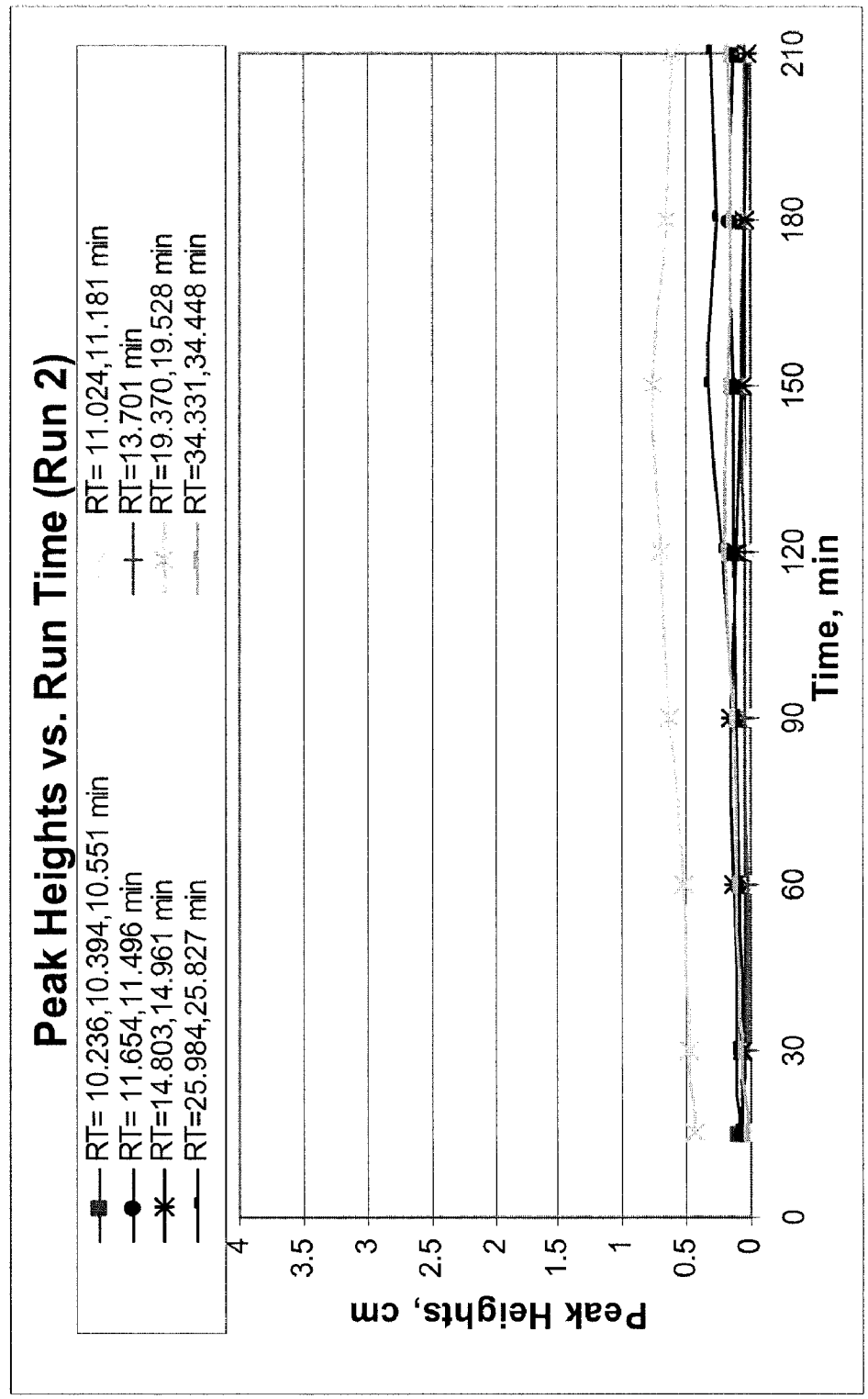
FIG. 22 is a chromatogram obtained from the conversion of lactose over a Pt/Mn—Ce catalyst (T=170° C.; back pressure=98.8-99.3 psig; liquid feed rate=26-31 ml/min; and oxygen supply rate=1.18 L/min).
Figure 23:
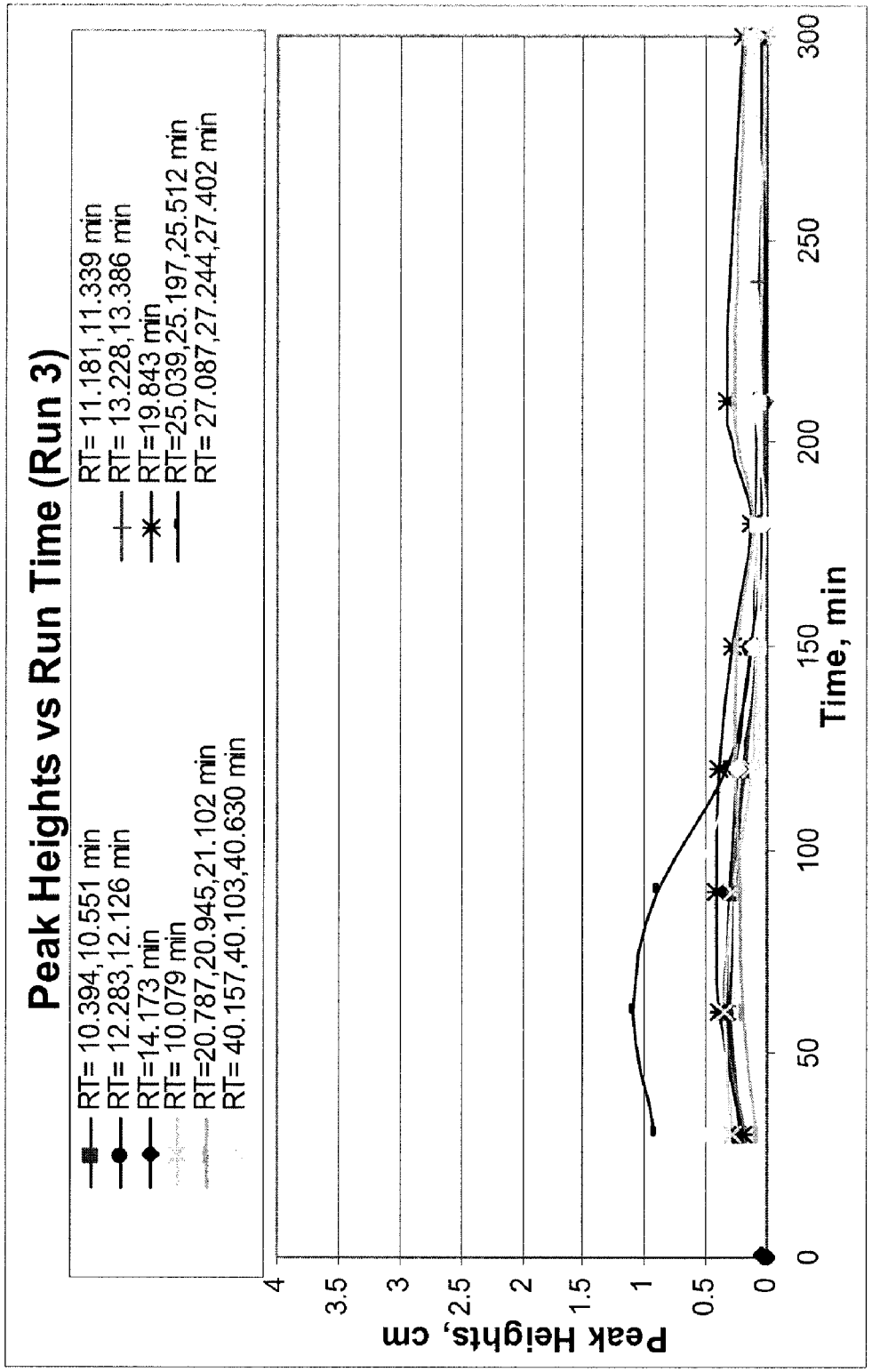
FIG. 23 is a chromatogram obtained from the conversion of lactose over a Pt/Mn—Ce catalyst (T=170° C.; back pressure=99.9-99.4 psig; liquid feed rate=20-25 ml/min; and oxygen supply rate=1.44 L/min).

As shown in Table 6, the feed rate in Run 2 is about 6 ml/min more than that in Run 1 and the oxygen flow rate for Run 3 was increased from 1.18 L/min to 1.44 L/min. The only reaction condition difference between Run 1 and Run 3 is oxygen flow rate. Interestingly, the curve shown in FIG. 20 for Run 2 was very different from the curve for Run 1. With the flow rate in Run 2 being slightly higher, lower conversion would be expected. The most likely reason for this situation is the flow problem as the feed rate for Run 2 is the highest among the rest and thus Run 2 should have the lower conversion. Also, under different reaction conditions, 100% conversion of lactose was still achieved in each run with steady state attained at about 180 minutes. To determine any potential products, for instance organic acids, each sample was injected into HPLC with an UV detector. FIGS. 21, 22 and 23 indicate the chromatogram results of reaction samples from Run 1, 2, and 3 respectively.

FIG. 21 indicates two larger peaks shown in chromatogram at retention times (RT) of about 19 minutes and 25 minutes. Additionally, the product with retention time of about 19 minutes first appeared in the plot at run time of 150 minutes and the corresponding peak height increased to a constant value of about 1 cm at steady state, when 100% conversion of lactose was first achieved at 180 minutes. On the contrary, the peak height of component with retention time of about 25 min was the highest before steady state and at 180 minutes, the peak height decreased significantly from a maximum of 3 cm to less than 0.3 cm at steady state.

FIG. 22 for Run 2 shows several peaks significantly smaller than the peaks shown in FIG. 21 for Run 1. As shown in FIG. 23 for Run 3, a component with a retention time of 13.386 minutes was identified as malic acid and the concentration was $2.01 \times 10^{-4}$ mol/L, which is about 0.25% of the initial concentration of lactose of 0.08 mol/L. In comparison to the other peak heights at steady state, the concentrations of other components with similar peak heights shown in FIG. 23 were assumed to be similar to the low concentration of malic acid. Thus, with an increase of oxygen flow rate in Run 3, the amount of all the products formed in the reaction over Pt/Mn—Ce catalyst were small over a run time of 300 minutes. In addition, with the highest oxygen flow in Run 3, more products with relatively lower peak heights were observed in FIG. 23. This suggests that the selectivity to smaller organic acids was lower in Run 3 than that in Run 1 and Run 2. With more oxygen supplied to the reaction, organic acids are more likely to further degrade to CO$_2$ and water.

Therefore, the Pt/Mn—Ce catalyst successfully converted lactose directly to CO/CO$_2$ and water. By comparing the results obtained using Pt/Mn—Ce catalyst to that of Mn/Ce catalyst, an important result was observed. The chromatogram results shown in FIG. 19 indicate a similarity in the amount of products formed at steady state in the reaction using Mn/Ce catalyst to that in the reaction using platinum supported Mn/Ce catalyst shown in FIG. 23. At steady state, both of these catalysts provide 100% conversion of lactose and the same small peak heights of any potential products presented in the samples, at a similar reaction condition of 170° C., 100 psig, 1.44 L/min oxygen flow rate and a relatively close feed rate at a range of 20-30 ml/min. In other words, the Mn/Ce catalyst is competitive with the Pt/Mn—Ce catalyst for converting lactose to $CO/CO_2$ and $H_2O$ under similar experimental conditions. This was not anticipated based on previous literature results. Therefore, complete conversion of lactose to $CO/CO_2$ and $H_2O$ on a Mn/Ce catalyst is possible and does not appear to require the addition of the costly platinum (Pt) metal.

Figure 24:
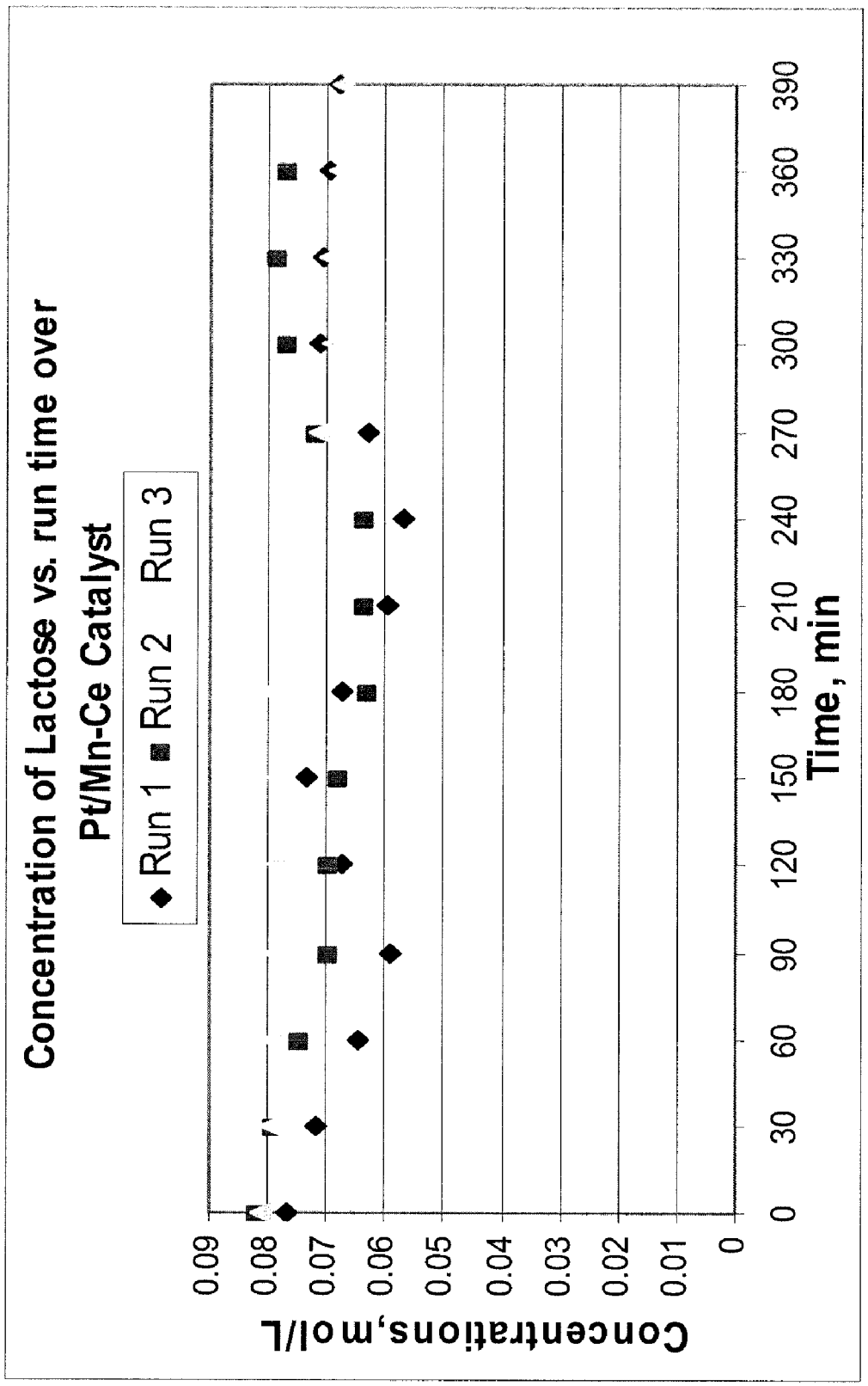
FIG. 24 is a plot of the concentration (mol/L) of lactose versus reaction time (min) for the conversion of lactose over a Pt/Mn—Ce catalyst at 160° C. (Run 1), 150° C. (Run 2) and 140° C. (Run 3).

In addition, to further determine the reaction rate of the catalytic wet oxidation reaction of lactose over Pt/Mn—Ce catalyst, three more experiments were performed to achieve a conversion of lactose less than 15%. Previous runs do not provide a true measure of activity since the reaction rate is limited by the fact that 100% of the reactant is converted. Table 7 and indicates the reaction conditions of three runs with less than 15% conversion of lactose over 3.32 g of Pt/Mn—Ce catalyst. The concentration of lactose over a run time of 390 minutes at three different temperatures is shown in FIG. 24. The conversions of lactose at temperatures of 140° C., 150° C. and 160° C. were calculated to be 14.7%, 5.2% and 8.5%, respectively.

TABLE 7

|  | Run 1 | Run 2 | Run 3 |
|---|---|---|---|
| Catalysts used (3.32 g) | Pt/Mn—Ce | Pt/Mn—Ce | Pt/Mn—Ce |
| Temperature | 160° C. | 150° C. | 140° C. |
| Back Pressure | 89.7–90.4 psig | 90.1–90.9 psig | 89.6–90.0 psig |
| $O_2$ Supplied | 1.44 L/min | 1.44 L/min | 1.44 L/min |
| Feed Rate | 21–26 ml/min | 12–16 ml/min | 4–8 ml/min |

Figure 25:
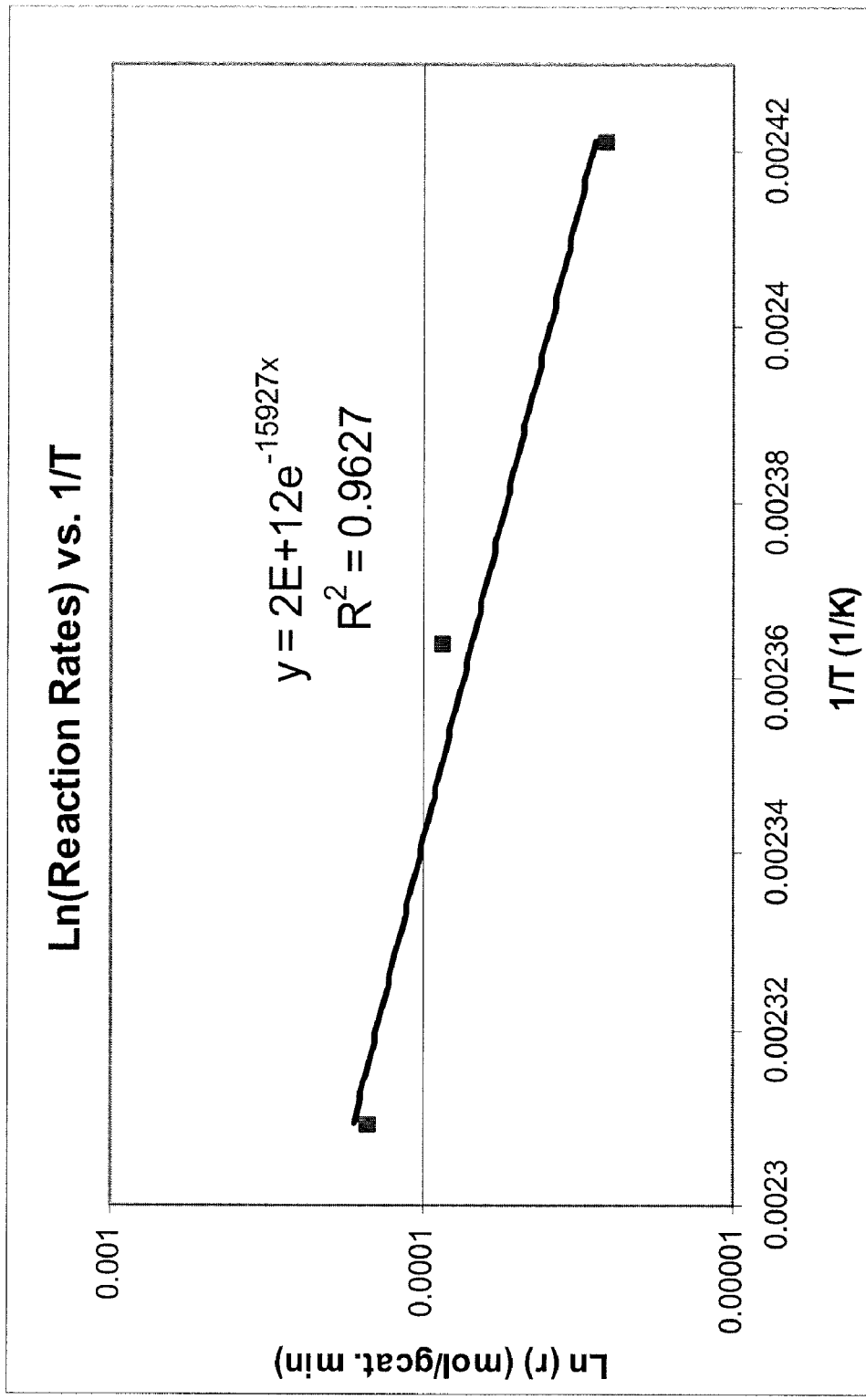
FIG. 25 is a plot of Ln(Reaction Rates) versus 1/T for the conversion of lactose over a Pt/Mn—Ce catalyst at 140° C., 150° C. and 160° C.

The reaction rates obtained and shown in FIG. 25 are true rates and allow for design in the future. The reaction rates, r, in the unit of mol/g catalyst minute, were determined by multiplying the concentration of lactose reacted (mol/L) by the volumetric flow rate of lactose solution fed into the system (L/min) and dividing by the amount of catalyst used (g). Also note that the unit of temperature, T, on X-axis in FIG. 25 is the inverse of degree Kelvin (1/K).

The equation, $y=(1.56*10^{12})*(exp^{\wedge}(-15900x))$, shown in FIG. 25 is a linear equation which relates the temperature with true reaction rates. The x and y correspond to reaction rate (mol/g catalyst minute) and the inverse of absolute temperature (1/K), respectively. The true rates at any temperature higher than 160° C., lower than 140° C. or in between may then be predicted. The reaction rates calculated at 140° C., 150° C. and 160° C. were $2.52\times10^{-5}$ mol/g catalyst minute, $8.47\times10^{-5}$ mol/g catalyst minute, and $1.49\times10^{4}$ mol/g catalyst minute, respectively. In addition, the activation energy, E, was also determined using the equation shown in FIG. 25. Since E/R=15900 where R= gas constant=8.314 J $mol^{-1} \cdot K^{-1}$, the activation energy (E) is estimated as $1.32\times10^{5}$ J/mol.

To make a better comparison between the data of low conversion with the high conversion at 170° C., a reaction rate at 170° C. was predicted as $4.03\times10^{-4}$ mol/g catalyst minute using the equation shown in FIG. 25 for low conversion reactions. The reaction rates at nearly 100% conversion over Pt/Mn—Ce catalyst were $6.61\times10^{-4}$ mol/g catalyst minute, $5.99\times10^{-4}$ mol/g catalyst minute, and $5.09\times10^{4}$ mol/g catalyst minute for Run 1, 2 and 3, respectively. Although the reaction rates for low and high conversion differ somewhat, they are still very similar. Since the reaction rate at high conversion is limited by the lack of reactants, the reaction rate at low conversion provides an upper limit on the maximum activity. Since all values above are similar, this indicates that the catalyst is performing at maximum activity for the high conversion runs. Thus, a further increase in flow rate will likely result in a decrease in lactose conversion.

Conclusions The degradation of lactose to carbon dioxide and water over three different catalysts was investigated above. The ability of $Pt/Al_2O_3$ catalyst was first investigated and the results indicated nearly 100% conversion of lactose was achieved by performing the reactions at higher temperature (170° C.) and lower feed rate (15-28 ml/min). The chromatogram results shown in FIG. 15 clearly indicated the presence of some side products which likely consist of some smaller organic acids based on literature results (Gallezot, Pierre, Selective Oxidation with Air on Metal Catalysts, *P. Catal. Today* 1997, 37, p. 405-418; Patrick, Trent A., and Abraham, Martin A., Evaluation of a Monolith-Supported $Pt/Al_2O_3$ Catalysts for Wet Oxidation of Carbohydrate-Containing Waste Streams, *Environment Science & Technology* 2000, 34, p. 3480-3488).

Figure 16:
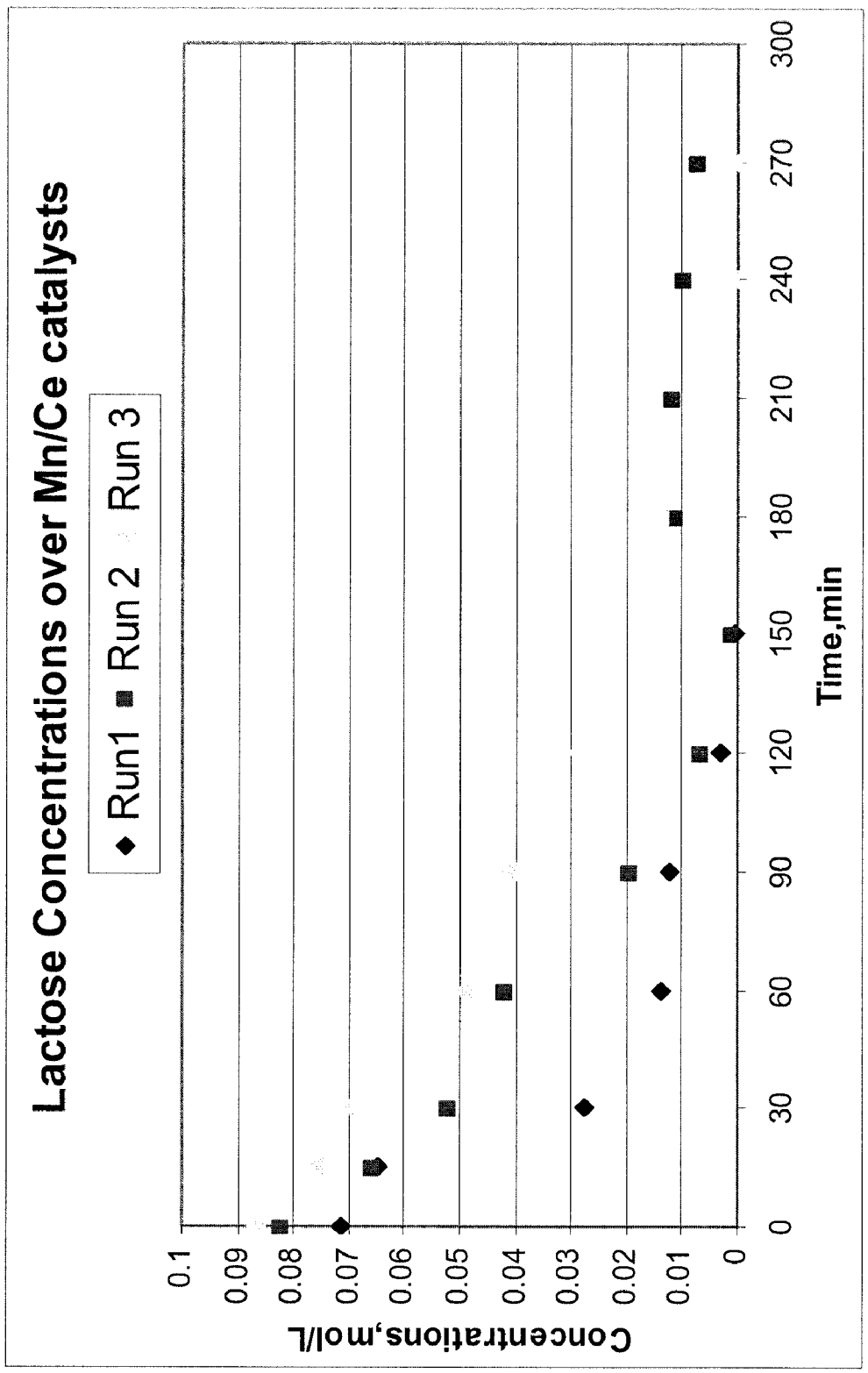
FIG. 16 is a plot of the concentration (mol/L) of lactose versus reaction time (min) for the conversion of lactose over a Mn/Ce catalyst at 170° C. and feed rates of 15-21 ml/min (Run 1), 13-22 ml/min (Run 2) and 21-31 ml/min (Run 3).

In addition, with the formation of some smaller carbon acids over the $Pt/Al_2O_3$ catalyst, the ability of a Mn/Ce composite oxide catalyst to further degrading organic acids formed from lactose to $CO/CO_2$ was then investigated. FIG. 16 showed that nearly 100% conversion of lactose was achieved in Run 3 where 1.44 L/min of oxygen was supplied to the flow system. Also, the chromatogram results shown in FIG. 19 determined the presence of smaller carbon acids with smaller peak heights at steady state and unexpectedly, Mn/Ce was capable of decomposing lactose almost as well as $Pt/Al_2O_3$. In addition, when compared to FIG. 15, the Mn/Ce catalyst appears to decompose more of the acids than $Pt/Al_2O_3$ catalyst.

The ability of a Mn/Ce supported Pt catalysts for direct conversion of lactose to carbon dioxide or carbon monoxide or both was investigated. FIG. 20 showed a nearly 100% conversion of lactose was achieved in two different runs with similar reaction conditions given in Table 6. However, chromatogram results of Run 3 with 1.44 L/min oxygen supplied shown in FIG. 23 indicated the concentrations of all the side products presented in the samples were decreased significantly compared to those shown in FIG. 21 of Run 1 and FIG. 22 of Run 2. Therefore, the excess oxygen supplied promotes the degradation of lactose to $CO/CO_2$ over Pt/Mn—Ce catalyst in a flow reactor. Moreover, the Mn/Ce catalyst is competitive with the Pt/Mn—Ce catalyst in converting lactose to $CO/CO_2$ and $H_2O$ under similar experimental condition. Thus, use of a Mn/Ce only catalyst may provide acceptable performance.

The reaction rate study allows the use of the intrinsic reaction rate data obtained at the bench scale in the design and operation of a commercial scale. This is important because it is not feasible, from a practical as well as economic viewpoint, to build a large scale unit and test all possible scenarios. To allow future designs, the reaction rates were measured at three different temperatures (140° C., 150° C. and 160° C.) with a conversion of lactose less than 15%, as shown in FIG. 24. The true reaction rate as a function of temperature is expressed as equation $y=(1.56*10^{12})*(exp^{\wedge}(-15900x))$, where x and y correspond to reaction rate (mol/g·min) and the inverse of absolute temperature (1/K), respectively. The reaction rates for low conversion reactions calculated at 140° C., 150° C. and 160° C. were $2.52 \times 10^{-5}$ mol/g catalyst minute, $8.47 \times 10^{-5}$ mol/g catalyst minute, and $1.49 \times 10^{-4}$ mol/g catalyst minute, respectively. The reaction rate for low conversion reactions at 170° C. was predicted as $4.03 \times 10^{4}$ mol/g catalyst minute using the equation shown in FIG. 25. This value is similar to the rates for the 100% conversion runs and indicates that the catalyst was performing at capacity in these runs. The activation energy, E, is estimated as $1.32 \times 10^{5}$ J/mol.

Conversion of Lactose to Lactobionic Acid

Besson et al. studied the ability of Pd/C catalyst and Pd/Bi—C catalyst on glucose oxidation and determined that glucose oxidation goes to completion within 130 minutes on Pd/Bi—C catalyst whereas the rate on Pd/C decreases with time and the conversion of glucose reaches a plateau (Besson, M., Lahmer, F., Gallezot, P., Fuertes, P., and Fleche, G., Catalytic Oxidation of Glucose on Bismuth-Promoted Palladium Catalysts, *Journal of Catalysis* 1995, 152, p. 116-121). This was attributed to a poisoning of the small palladium particles by chemisorbed oxygen. Also, the ability of Pd—Bi/C catalysts to convert lactose to lactobionic acid had been shown in the literature (Hendriks, H. E. J., Kuster, B. F. M., and Martin, G. B., The Effect of Bismuth on the Selective oxidation of Lactose on Supported Palladium Catalysts, *Carbohydr. Res.* 1990, 204, p. 121-129; Hendriks, Henricus E. J., Ph. D. Thesis, Selective Catalytic Oxidation of Lactose and Other Carbohydrates, Eindhoven University of Technology, 1991). However, this work was performed in a batch reactor and only limited parameters were determined. In practice, the use of a flow reactor would be desirable to convert lactose to lactobionic acid in order to increase the production rate.

Therefore, a Pd—Bi/C catalyst was prepared and examined for converting lactose to lactobionic acid in a flow reactor. A determination of the effects of some controllable parameters such as temperature, pressure, flow rate, and oxygen flow rate on reactivity in a flow system is discussed in the following section.

Experimental Methods A Pd/C catalyst purchased from Alfa Aesar was first reduced before being used. Reduction was carried out in a glass reactor under flowing hydrogen gas (250 ml/min) by heating at 1 K/min from 298 to 573 K and maintaining this temperature for two hours. The powder was cooled to 300 K under helium gas and then contacted with air diluted with nitrogen.

The bismuth promoted carbon supported palladium catalyst, Pd—Bi/C, was synthesized by mixing 2.9918 g of Pd/C in 300 ml of distilled water. This mixture was heated at 313 K, stirred and de-aerated by bubbling with nitrogen gas for twenty minutes. The desired Bi/Pd ratio is 0.1. Meanwhile, a solution of bismuth(III) nitrate oxide, $BiONO_3$ was prepared by dissolving 0.0208 g $BiONO_3$ in 0.905 ml of concentrated HCl. 500 mmol or 180.02 g of D-lactose monohydrate was then added to the Pd/C suspension and stirred for ten minutes. After that, the $BiONO_3$ solution was added dropwise to the Pd/C solution under continuous stirring. During all these operations, nitrogen gas flow was maintained and the temperature was kept at 313 K. The mixture was then filtered and calcined. The calcination was performed in the same glass reactor with air flowing through the reactor. The catalyst was then stored for future use.

Results and Discussions To achieve 100% conversion of lactose, several experiments were performed over 8.01 g of Pd—Bi/C catalyst at several different experimental conditions as indicated in Table 8. The main difference between these reactions is that the oxygen flow decreased gradually from Run 1 to Run 3.

TABLE 8

|  | Run 1 | Run 2 | Run 3 |
| --- | --- | --- | --- |
| Catalysts used (8.01 g) | Pd—Bi/C | Pd—Bi/C | Pd—Bi/C |
| Temperature | 170° C. | 170° C. | 170° C. |
| Back Pressure | 97.1–99.6 psig | 98.1–98.7 psig | 98.4–99.0 psig |
| $O_2$ Supplied | 1.18 L/min | 0.156 L/min | 0.083 L/min |
| Feed Rate | 25–32 ml/min | 23–29 ml/min | 18–25 ml/min |

Figure 26:
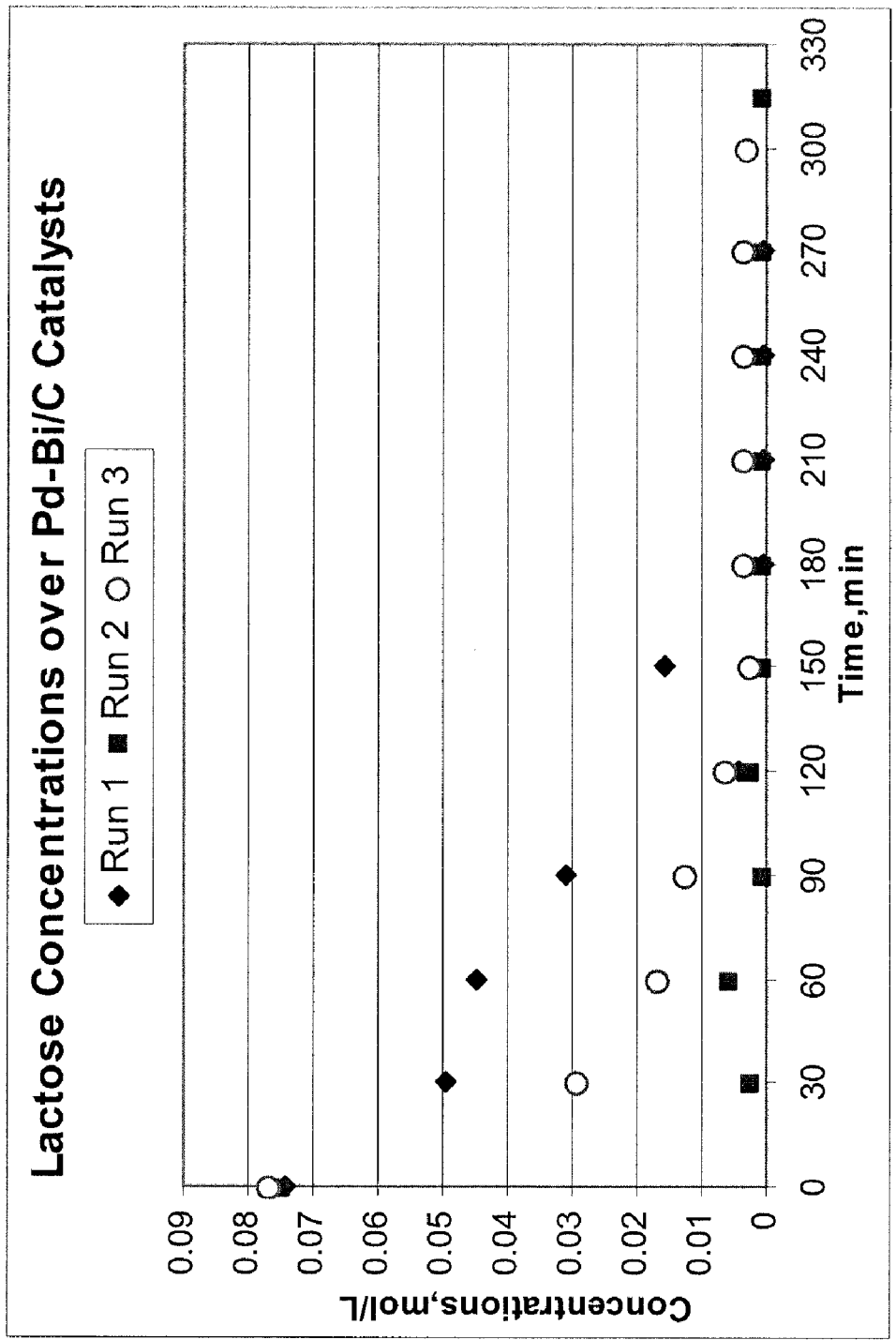
FIG. 26 is a plot of the concentration (mol/L) of lactose versus reaction time (min) for the conversion of lactose over a Pd—Bi/C catalyst at $O_2$ supply rates of 1.18 L/min (Run 1), 0.156 L/min (Run 2) and 0.083 L/min (Run 3).
Figure 27:
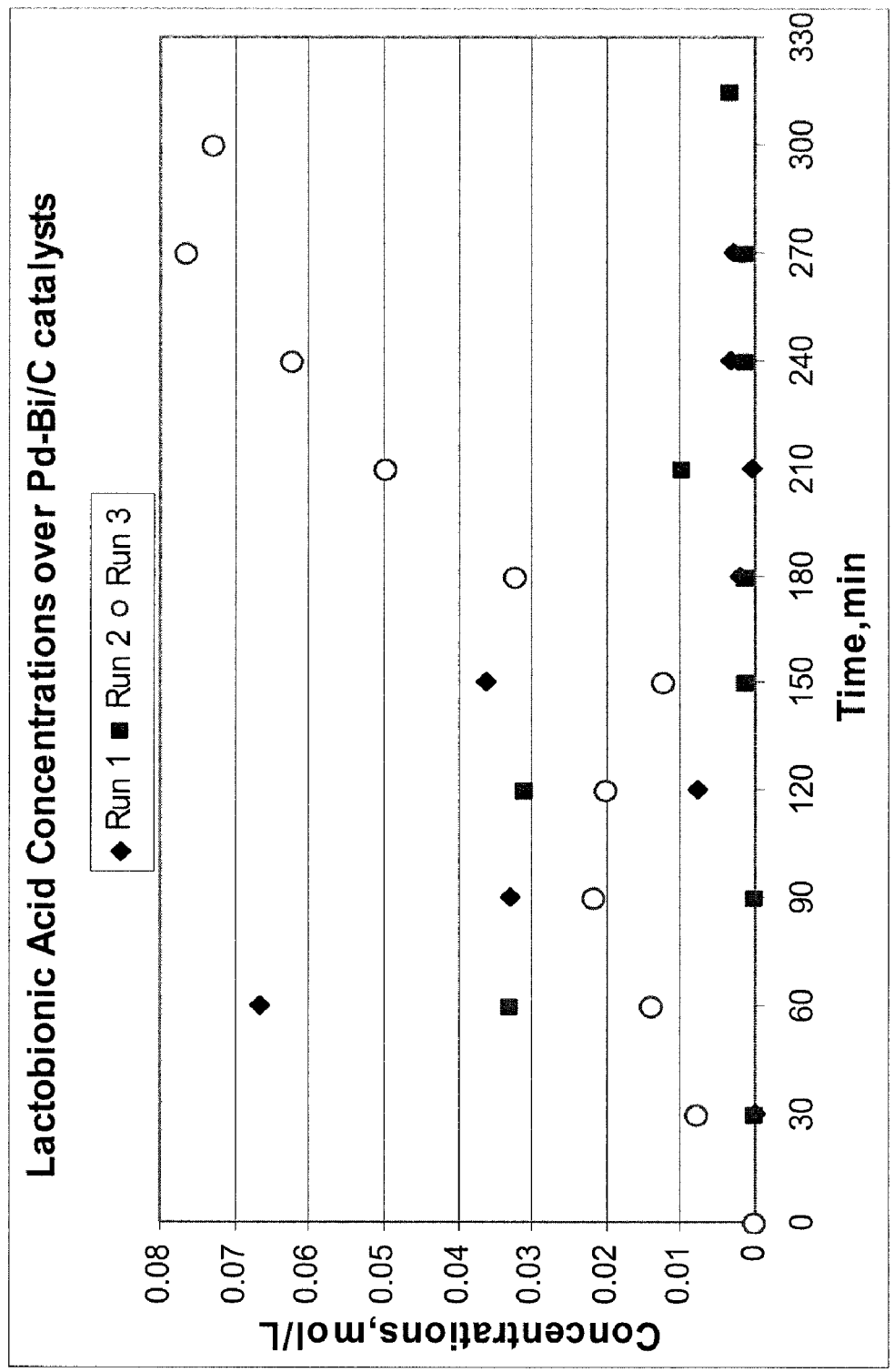
FIG. 27 is a plot of the concentration (mol/L) of lactobionic acid versus reaction time (min) for the conversion of lactose over a Pd—Bi/C catalyst at $O_2$ supply rates of 1.18 L/min (Run 1), 0.156 L/min (Run 2) and 0.083 L/min (Run 3).

FIG. 26 provides the concentrations of lactose as a function of time at the three different reaction conditions presented in Table 8. FIG. 26 does not show if the desired product has been formed. FIG. 27 demonstrates lactobionic acid production for the runs listed in Table 8 and also shown in FIG. 26.

As can be seen from FIG. 26, the conversion of lactose was nearly 100% after 3 hours in all the runs. However, the concentrations of lactobionic acid produced in the reaction were significantly smaller in Run 1 and Run 2 at steady state. This is likely due to the presence of excess oxygen leading to further decomposition of the lactobionic acid. The actual oxygen required for complete conversion to lactobionic in Run 1, 2 and 3 is in a range of 0.032 to 0.04 L/min, 0.029 to 0.037 L/min, and 0.023 to 0.032 L/min, respectively. An excess oxygen flow of 0.083 L/min was used as this is the minimum oxygen flow which will remain stable at the high pressure of about 100 psig. In Run 3, 0.083 L/min of oxygen was supplied to the reaction and the selectivity to lactobionic acid was the highest. This was expected based on preliminary studies of similar organic species including glucose. Besson et al, have studied the production of gluconic acid from glucose by oxidation with air on Pd/Bi—C catalyst (Besson, M., Lahmer, F., Gallezot, P., Fuertes, P., and Fleche, G., Catalytic Oxidation of Glucose on Bismuth-Promoted Palladium Catalysts, *Journal of Catalysis* 1995, 152, p. 116-121). Their results indicate that oxygen poisoning is the main cause of deactivation of platinum metal catalyst and Pd/C catalyst. The bismuth, because of its affinity for oxygen, acts as a co-catalyst preventing the oxygen poisoning of palladium. Thus, gluconate yields as high as 99% are obtained and the highly selective Pd—Bi/C catalyst does not generate highly oxidized products. This further demonstrates the sensitivity of this reaction to the oxygen concentration. Moreover, smaller feed rate setting in Run 3 than that in Run 1 and Run 2 also contributes to the increase in the concentration of lactobionic acid. In summary, a reaction condition with lower oxygen flow rate and lower feed rate promotes the conversion of lactose to lactobionic acid.

Literature results showed that the selectivity of glucose to gluconate is 99.8% at 99.6% conversion in a batch reactor (Besson, M., Lahmer, F., Gallezot, P., Fuertes, P., and Fleche, G., Catalytic Oxidation of Glucose on Bismuth-Promoted Palladium Catalysts, *Journal of Catalysis* 1995, 152, p. 116-121). Hendricks et al. investigated the effect of the Bi to Pd ratio on the selectivity and the studies showed that 100% selectivity and correspondingly high yields are maintained up to 95% of conversion for the Bi—Pd—C (molar ratio of Bi to Pd is 0.50) catalyzed reaction (Hendriks, H. E. J., Kuster, B. F. M., and Martin, G. B., The Effect of Bismuth on the Selective oxidation of Lactose on Supported Palladium Catalysts, *Carbohydr. Res.* 1990, 204, p. 121-129). No side products were detected by HPLC. Similar results were obtained for oxidation of D-maltose, D-glucose, and D-galactose.

Figure 28:
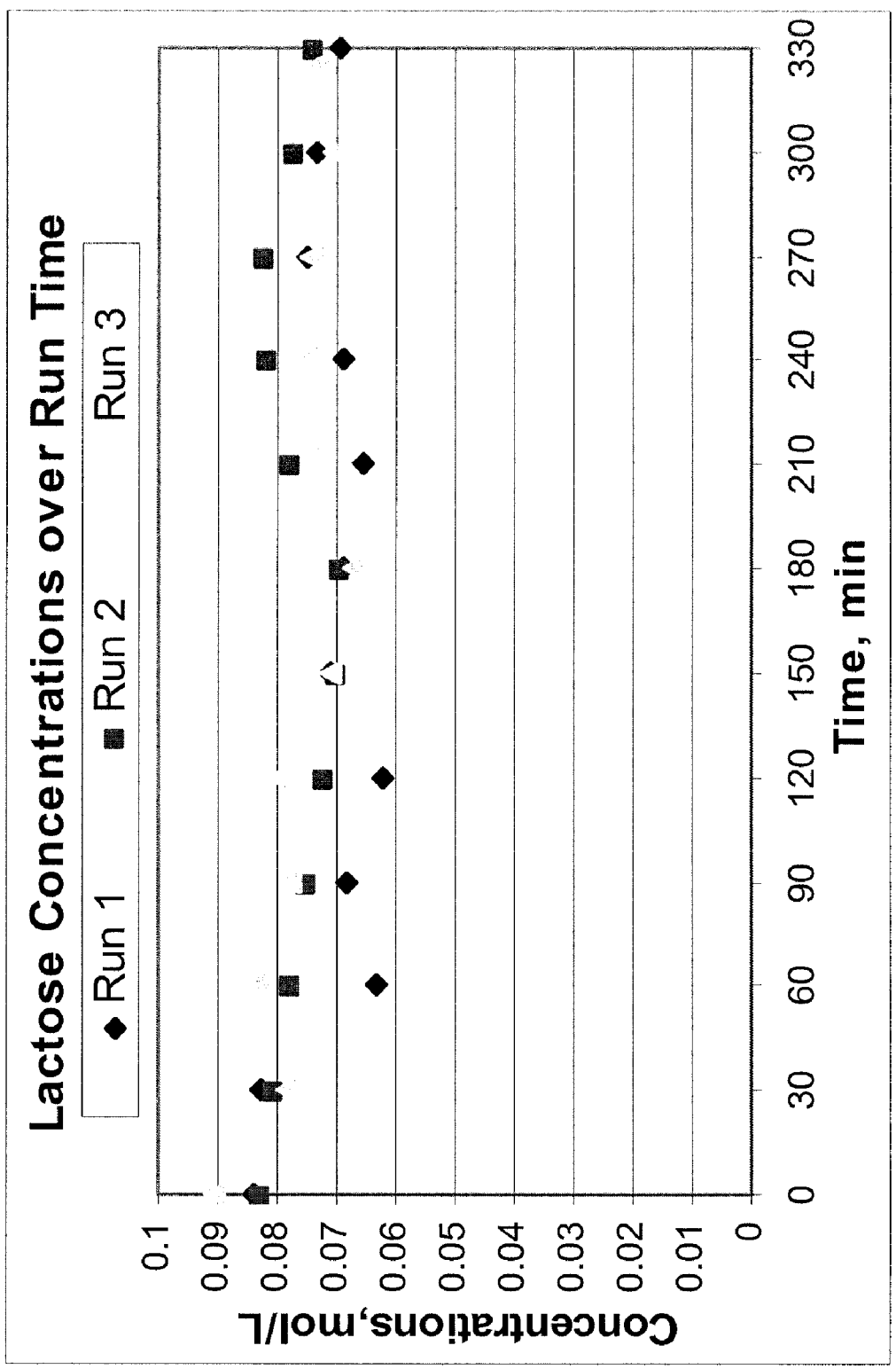
FIG. 28 is a plot of the concentration (mol/L) of lactose versus reaction time (min) for the conversion of lactose over a Pd—Bi/C catalyst at liquid feed rates of 25-32 ml/min (Run 1), 14-18 ml/min (Run 2) and 30-34 ml/min (Run 3).

In addition, to further determine the reaction rate of the catalytic wet oxidation reaction of lactose over Pd—Bi/C catalyst, three experiments were performed to achieve a conversion of lactose less than 19%. Table 9 indicates the reaction conditions of three runs with less than 19% conversion of lactose over 8.135 g of Pd—Bi/C catalyst. The concentration of lactose over a run time of 330 minutes at the two different temperatures is shown in FIG. 28. The conversions for Run 1, Run 2, and Run 3 were calculated to be 14.8%, 6.4% and 18.8% respectively.

TABLE 9

|  | Run 1 | Run 2 | Run 3 |
| --- | --- | --- | --- |
| Catalysts used (8.135 g) | Pd—Bi/C | Pd—Bi/C | Pd—Bi/C |
| Temperature | 160° C. | 150° C. | 160° C. |
| Back Pressure | 88.4–90.2 psig | 89.1–89.5 psig | 88.9–89.1 psig |
| $O_2$ Supplied | 0.0535 L/min | 0.0535 L/min | 0.0535 L/min |
| Feed Rate | 25–32 ml/min | 14–18 ml/min | 30–34 ml/min |

Figure 29:
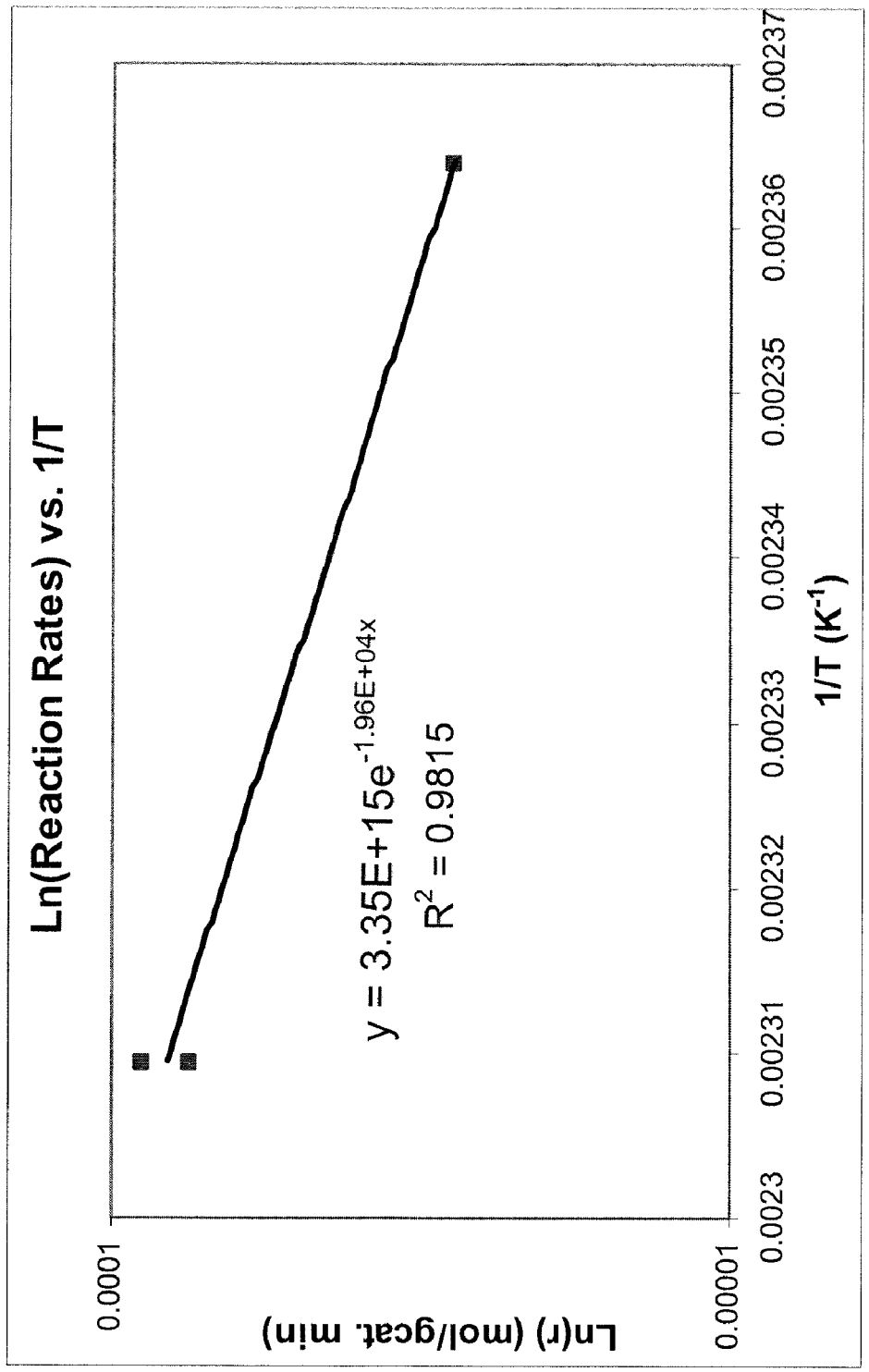
FIG. 29 is a plot of Ln(Reaction Rates) versus 1/T for the conversion of lactose over a Pd—Bi/C catalyst at 150° C. and 160° C.

FIG. 29 shows the reaction rates with respect to two different temperatures, 150° C. and 160° C. The reaction rates obtained and shown in FIG. 29 are true rates and allow for design in the future. Again, the reaction rates, r, in the unit of mol/g of catalyst minute, were determined by multiplying the concentration of lactose reacted (mol/L) by the volumetric flow rate of lactose solution fed into the system (L/min) and dividing by the amount of catalyst used (g). Also, the unit of temperature, T, on X-axis in FIG. 29 is the inverse of degree Kelvin (1/K).

The equation, $y=(3.35*10^{15})*(exp^\wedge(-19600x))$, shown in FIG. 29 is a linear equation which relates the temperature with the true reaction rates. The x and y correspond to reaction rate (mol/g catalyst minute) and the inverse of absolute temperature (1/K) respectively. The reaction rates calculated for Run 1, 2, and 3 were $7.50\times10^{-5}$ mol/g catalyst minutes, $2.81\times10^{-5}$ mol/g catalyst minutes, and $8.88\times10^{-5}$ mol/g catalyst minutes, respectively. In addition, the activation energy, E, was also determined using the equation shown in FIG. 29. Since E/R=19600 where R=gas constant=8.314 J mol$^{-1}$·K$^{-1}$, the activation energy (E) is estimated as $1.63\times10^5$ J/mol.

To make a better comparison between the data of low conversion with the high conversion at 170° C., a reaction rate at 170° C. was predicted as $2.04\times10^{-4}$ mol/g of catalyst minute using the equation shown in FIG. 29 for low conversion reactions. The reaction rates at nearly 100% conversion over Pd—Bi/C catalyst were $2.40\times10^{-4}$ mol/g of catalyst minute, $2.51\times10^{-4}$ mol/g of catalyst minute, and $2.03\times10^{-4}$ mol/g of catalyst minute for Run 1, 2 and 3, respectively. The reaction rates for low and high conversion are very close. Since the reaction rate at high conversion is limited by the lack of reactants, the reaction rate at low conversion provides an upper limit on the maximum activity. Since all values above are very similar, this indicates that the catalyst is performing at maximum activity for the high conversion runs. Thus, a further increase in flow rate will likely result in a decrease in lactose conversion.

Conclusions The studies investigating conversion of lactose to lactobionic acid using Pd—Bi/C catalyst in a batch reactor were shown in the literature (Hendriks, H. E. J., Kuster, B. F. M., and Martin, G. B., The Effect of Bismuth on the Selective oxidation of Lactose on Supported Palladium Catalysts, *Carbohydr. Res.* 1990, 204, p. 121-129). In practice, use of a flow reactor and determination of differential reaction rates would be desirable for design considerations. Therefore, the Pd—Bi system was investigated and FIGS. 26 and 27 showed the best reaction condition of 170° C., a lower oxygen flow rate of 0.083 L/min, and a smaller feed rate of 18-25 ml/min that gives the highest amount of lactobionic acid produced in a flow system, with 100% conversion of lactose.

To determine the reaction rates, three experiments were performed at two different temperatures (150° C. and 160° C.) and a similar conversion of lactose of less than 19% was achieved for each run. The true reaction rate as a function of temperature is expressed as equation $y=(3.35*10^{15})*(exp^\wedge(-19600x))$, where x and y correspond to reaction rate (mol/g·min) and the inverse of absolute temperature (1/K), respectively. The reaction rates at nearly 100% conversion over Pd—Bi/C catalyst were $2.40\times10^{-4}$ mol/g of catalyst minute, $2.51\times10^{-4}$ mol/g of catalyst minute, and $2.03\times10^4$ mol/g of catalyst minute for Run 1, 2 and 3, respectively. As expected, reaction rate predicted for low conversion reaction at 170° C. is $2.04\times10^{-4}$ mol/g of catalyst minute, which is similar to those for high conversion reactions at the same operating temperature. This result demonstrates that the maximum reaction rate was achieved in high conversion reactions before all the lactose was used up in the oxidation reaction. The activation energy, E, is estimated as $1.63\times10^5$ J/mol.

CONCLUSIONS

Catalytic wet oxidation of lactose offers the possibility for conversion of lactose to carbon dioxide or carbon monoxide or to a more value added lactose derivative. Conversion of lactose to $CO/CO_2$ minimizes disposal issues while formation of a value added product allows for re-use of material.

The first approach focused on the degradation of lactose to smaller organic species using three different catalysts, $Pt/Al_2O_3$, Mn/Ce and Pt/Mn—Ce. The ability of these three catalysts for conversion to the desired product were first investigated and the results showed a nearly 100% conversion of lactose was achieved for the presence of each catalyst in the flow reactor. As predicted, the $Pt/Al_2O_3$ catalyst was able to decompose lactose to smaller products. Surprisingly, the Mn/Ce catalyst was also very successful at decomposing lactose to smaller products. This was not an anticipated result. In addition, when platinum (Pt) was combined with the Mn/Ce catalyst to form a Pt/Mn/Ce catalyst, very little additional catalytic benefit was seen. This suggests that lactose can be completely decomposed over the Mn/Ce catalyst.

The second approach was focused on the conversion of lactose to a value added product-lactobionic acid. Several experiments were performed at different experimental conditions and it was shown that a higher conversion of lactose to lactobionic acid was achieved when the reaction was performed at a lower oxygen flow rate (5%) and a lower feed rate (18-25 ml/min).

In addition, all the examples were limited to a maximum pressure of 100 psig due to system design. Systems capable of higher pressure would allow for higher temperatures. Thus, the reaction rates determined here could be further increased by operating under higher temperature and pressure conditions.

Thus, the invention provides, among other things, processes for degrading lactose to $CO_2/CO$ and water and processes for converting lactose to value added products. Various features and advantages of the invention are set forth in the following claims.

What is claimed is:

1. A process for degrading lactose by catalytic wet oxidation, the process comprising:
feeding oxygen gas and an aqueous solution of lactose to a reactor comprising a $Pt/Al_2O_3$ catalyst; and
reacting the lactose with the oxygen gas in the reactor at elevated temperature and pressure to produce at least one of small organic acids, carbon dioxide, carbon monoxide, water and combinations thereof.

2. The process of claim 1 wherein the elevated temperature ranges from about 100° C. to about 170° C.

3. The process of claim 1 wherein the elevated pressure ranges from about 85 psig to about 100 psig.

4. The process of claim 1 wherein the molar ratio between oxygen gas and lactose in the reactor is at least about 12:1.

5. The process of claim 1 wherein the molar ratio between oxygen gas and lactose in the reactor is about 12:1.

6. The process of claim 1 wherein the oxidation of lactose produces small organic acids.

7. The process of claim 6 wherein the small organic acids comprise at least one of oxalic acid, tartaric acid, malic acid, succinic acid and combinations thereof.

8. The process of claim 6 further comprising feeding the small organic acids and oxygen gas into a reactor containing a Mn/Ce catalyst and oxidizing the small organic acids to water and at least one of carbon dioxide, carbon monoxide and combinations thereof.

9. A process for degrading lactose by catalytic wet oxidation, the process comprising:
feeding oxygen gas and an aqueous solution of lactose to a reactor comprising a Mn/Ce catalyst; and
oxidizing the lactose in the reactor at elevated temperature and pressure to produce water and at least one of carbon dioxide, carbon monoxide and combinations thereof.

10. The process of claim 9, wherein the elevated temperature ranges from about 100° C. to about 170° C.

11. The process of claim 9, wherein the elevated temperature ranges from about 140° C. to about 170° C.

12. The process of claim 9, wherein the elevated pressure ranges from about 85 psig to about 100 psig.

13. The process of claim 9 wherein the molar ratio between oxygen gas and lactose in the reactor is at least about 12:1.

14. The process of claim 13 wherein the molar ratio between oxygen gas and lactose in the reactor is about 12:1.

15. A process for degrading lactose by catalytic wet oxidation, the process comprising:
feeding oxygen gas and an aqueous solution of lactose to a reactor comprising a Pt/Mn—Ce catalyst; and
oxidizing the lactose in the reactor at elevated temperature and pressure to produce water and at least one of carbon dioxide, carbon monoxide and combinations thereof.

16. The process of claim 15, wherein the elevated temperature ranges from about 100° C. to about 170° C.

17. The process of claim 15, wherein the elevated temperature ranges from about 140° C. to about 170° C.

18. The process of claim 15, wherein the elevated pressure ranges from about 85 psig to about 100 psig.

19. The process of claim 15, wherein the molar ratio between oxygen gas and lactose in the reactor is at least about 12:1.

20. The process of claim 15, wherein the molar ratio between oxygen gas and lactose in the reactor is about 12:1.

* * * * *